United States Patent
Kawaharada et al.

(10) Patent No.: US 10,240,044 B2
(45) Date of Patent: *Mar. 26, 2019

(54) AQUEOUS PIGMENT DISPERSION AND AQUEOUS INK

(71) Applicant: DIC CORPORATION (TOKYO), Tokyo (JP)

(72) Inventors: Yukihiko Kawaharada, Kita-adachi-gun (JP); Takaaki Nabe, Saitama (JP)

(73) Assignee: DIC CORPORATION (TOKYO), Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/307,500

(22) PCT Filed: Apr. 16, 2015

(86) PCT No.: PCT/JP2015/061672
§ 371 (c)(1),
(2) Date: Oct. 28, 2016

(87) PCT Pub. No.: WO2015/166808
PCT Pub. Date: Nov. 5, 2015

(65) Prior Publication Data
US 2017/0051150 A1 Feb. 23, 2017

(30) Foreign Application Priority Data

Apr. 30, 2014 (JP) ................. 2014-093646
May 13, 2014 (JP) ................. 2014-099491
Jun. 11, 2014 (JP) ................. 2014-120513
Jul. 23, 2014 (JP) ................. 2014-149728

(51) Int. Cl.
| | |
|---|---|
| C09B 67/00 | (2006.01) |
| C09D 17/00 | (2006.01) |
| C09D 101/32 | (2006.01) |
| C09D 125/14 | (2006.01) |
| C09D 175/04 | (2006.01) |
| C09D 11/037 | (2014.01) |
| C09D 11/106 | (2014.01) |
| C09D 11/107 | (2014.01) |
| C09D 11/14 | (2006.01) |
| C09D 11/322 | (2014.01) |
| C09B 67/20 | (2006.01) |
| B41J 2/01 | (2006.01) |
| C08G 18/48 | (2006.01) |
| C08G 18/75 | (2006.01) |
| C08G 18/08 | (2006.01) |
| C08G 18/24 | (2006.01) |
| C08G 18/34 | (2006.01) |

(Continued)

(52) U.S. Cl.
CPC ............. *C09B 67/0066* (2013.01); *B41J 2/01* (2013.01); *C08G 18/0823* (2013.01); *C08G 18/246* (2013.01); *C08G 18/348* (2013.01); *C08G 18/4854* (2013.01); *C08G 18/755* (2013.01); *C09B 67/009* (2013.01); *C09D 11/037* (2013.01); *C09D 11/102* (2013.01); *C09D 11/106* (2013.01); *C09D 11/107* (2013.01); *C09D 11/14* (2013.01); *C09D 11/322* (2013.01); *C09D 11/326* (2013.01); *C09D 17/001* (2013.01); *C09D 101/286* (2013.01); *C09D 101/32* (2013.01); *C09D 105/08* (2013.01); *C09D 125/14* (2013.01); *C09D 175/04* (2013.01)

(58) Field of Classification Search
CPC ... C09D 11/037; C09D 11/106; C09D 11/107; C09D 11/14; C09D 11/322; C09D 17/001; C09D 101/32; C09D 125/14; C09D 175/04; C09B 67/0066
USPC .................. 106/31.69, 31.75, 499, 501.1
See application file for complete search history.

(56) References Cited

U.S. PATENT DOCUMENTS 4,481,076 A * 11/1984 Herrick ................ C08L 1/02
 162/100
6,103,790 A  8/2000 Cavaille et al.
(Continued)

FOREIGN PATENT DOCUMENTS

JP  9-509694 A  9/1997
JP  10-95922 A  4/1998
(Continued)

OTHER PUBLICATIONS

English translation of the Written Opinion of the International Search Authority dated Jul. 21, 2015 for PCT/JP2015/061672; 4 pages.*

(Continued)

*Primary Examiner* — Helene Klemanski
(74) *Attorney, Agent, or Firm* — Westerman, Hattori, Daniels & Adrian, LLP

(57) ABSTRACT

The present invention provides an aqueous pigment dispersion including a pigment, an anionic group-containing organic polymer compound, and bio-nanofibers having an average diameter of 1 nm or more and 100 nm or less and an aspect ratio of 100 or more, and also provides an aqueous ink using the aqueous pigment dispersion. The bio-nanofibers are preferably cellulose nanofibers or chitosan nanofibers. The anionic group-containing organic polymer compound is preferably at least one selected from the group consisting of acrylic resins having anionic groups, polyurethane resins having anionic groups, and polysaccharide derivatives having anionic groups.

3 Claims, No Drawings

(51) Int. Cl.
*C09D 11/102* (2014.01)
*C09D 11/326* (2014.01)
*C09D 101/28* (2006.01)
*C09D 105/08* (2006.01)
*C09B 67/46* (2006.01)

(56) References Cited

U.S. PATENT DOCUMENTS

| | | | | |
|---|---|---|---|---|
| 7,838,666 | B2* | 11/2010 | Yaginuma | A23F 3/40 |
| | | | | 426/658 |
| 8,728,273 | B2* | 5/2014 | Heiskanen | C09D 101/02 |
| | | | | 162/157.6 |
| 10,000,647 | B2* | 6/2018 | Kawaharada | C09D 11/322 |
| 2001/0011516 | A1* | 8/2001 | Cantiani | A61K 8/027 |
| | | | | 106/162.1 |
| 2009/0221812 | A1* | 9/2009 | Ankerfors | D21C 5/005 |
| | | | | 536/56 |
| 2011/0319528 | A1 | 12/2011 | Ifuku et al. | |
| 2013/0047893 | A1 | 2/2013 | Heiskanen et al. | |
| 2014/0203219 | A1* | 7/2014 | Nishijima | C09D 11/037 |
| | | | | 252/510 |
| 2014/0267515 | A1* | 9/2014 | Zhang | C09D 11/322 |
| | | | | 106/31.69 |
| 2016/0264800 | A1* | 9/2016 | Nishijima | C09D 11/14 |
| 2017/0253754 | A1* | 9/2017 | Kawaharada | C09D 11/14 |

FOREIGN PATENT DOCUMENTS

| | | |
|---|---|---|
| JP | 2001-181539 A | 7/2001 |
| JP | 2001-328347 A | 11/2001 |
| JP | 2011-195691 A | 10/2011 |
| JP | 2012-117019 A | 6/2012 |
| JP | 2013-527876 A | 7/2013 |
| JP | 2013-181167 A | 9/2013 |
| WO | 2010/073758 A1 | 7/2010 |
| WO | 2013/156223 A1 | 10/2013 |

OTHER PUBLICATIONS

English translation of JP 2013/181167, Sep. 2013; 27 pages.*
English translation of JP 10/095922, Apr. 1998; 19 pages.*
International Search Report dated Jul. 21, 2015, issued in counterpart International Application No. PCT/JP2015/061672 (2 pages).

* cited by examiner

AQUEOUS PIGMENT DISPERSION AND AQUEOUS INK

TECHNICAL FIELD

The present invention relates to an aqueous pigment dispersion or the like containing bio-nanofibers and a method for producing the same.

BACKGROUND ART

In recent years, an aqueous ink composition (may be referred to as an "aqueous ink" hereinafter) has taken the place of an organic solvent-based ink in a wide range of fields because of its safety and little environmental load, and particularly an odorless aqueous ink has become essential as an ink which can be used even in a closed space such as an office or the like.

The aqueous ink is applied to various printing methods such as an offset printing method, a gravure printing method, an ink jet recording method, and the like. In particular, the ink jet recording method is capable of on-demand printing and is thus currently often investigated for the purpose of replacing an electrophotographic (toner) method used in offices and the like.

The physical properties required for an aqueous ink using an ink jet recording method include both the color development (optical density) and rubfastness of a formed image. For this requirement, there is known a two-liquid reaction system using an image forming ink and a fixing ink (also referred to as a "treatment agent") (for example, refer to Patent Literatures 1 to 3). However, in the case of the two-liquid reaction system, printing is actually performed in two steps using the image forming ink and the fixing ink, and thus it is difficult to realize high-speed printing at a level equal or higher than the electrophotographic (toner) method.

On the other hand, bio-nanofibers are produced by uniformly refining (forming nanofibers) cellulose or chitin/chitosan at a nano-level and, in an industrial application, bio-nanofibers are known to be added for the purpose of improving the drying properties and toughness of coating films by imparting thixotropic viscosity to aqueous emulsion compositions for coat bonding and filling (for example, refer to Patent Literature 4), and added to a pigment composition for the purpose of imparting good rheology characteristics (for example, refer to Patent Literature 5). However, there has not been known an example of use for the purpose of improving the optical density and rubfastness of an aqueous ink.

An aqueous ink for writing implements is known, in which an aqueous ink is mixed with modified cellulose nanofibers characterized by a complex structure in order to secure excellent dispersion stability even of a coloring agent with high specific gravity (for example, refer to Patent Literature 6). The modified cellulose nanofibers described in Patent Literature 6 have a predetermined cellulose crystal structure and are required to be subjected to reduction reaction to adjust a content of carboxyl groups and a total content of aldehyde groups and ketone groups after selective oxidation of hydroxyl groups at specified positions in a cellulose molecule. Therefore, there is the problem of high cost and a large chemical limit of ink composition design.

CITATION LIST

Patent Literature

PTL 1: Japanese Unexamined Patent Application Publication No. 2013-35227

PTL 2: Japanese Unexamined Patent Application Publication No. 2013-35226

PTL 3: Japanese Unexamined Patent Application Publication No. 2011-140213

PTL 4: Japanese Unexamined Patent Application Publication No. 10-95922

PTL 5: Japanese Unexamined Patent Application Publication (Translation of PCT Application) No. 2013-527876

PTL 6: Japanese Unexamined Patent Application Publication No. 2013-181167

SUMMARY OF INVENTION

Technical Problem

An object of the present invention is to provide an aqueous pigment dispersion being excellent in optical density and rubfastness of a resultant image and provide an aqueous ink.

Solution to Problem

As a result of earnest research, the inventors found that the problems described above can be solved by an aqueous pigment dispersion and an aqueous ink each containing, as essential components, bio-nanofibers having a specified average particle diameter and aspect ratio and an anionic group-containing organic polymer compound functioning as a pigment dispersant and a binder.

That is, the present invention provides an aqueous pigment dispersion containing at least a pigment, an anionic group-containing organic polymer compound, and bio-nanofibers having an average diameter (fiber diameter) of 1 nm or more and 100 nm or less and an aspect ratio of 100 or more, and also provides an aqueous ink using the aqueous pigment dispersion.

Further, present invention provides a method for producing the aqueous pigment dispersion and the aqueous ink.

Advantageous Effects of Invention

According to the present invention, it is possible to provide an aqueous pigment dispersion being excellent in optical density and rubfastness of a resultant image and to provide an aqueous ink using the aqueous pigment dispersion.

DESCRIPTION OF EMBODIMENTS (Pigment)

A pigment used in the present invention is at least one pigment selected from known common organic pigments or inorganic pigments. Also, the present invention can use either an untreated pigment or a treated pigment. The treated pigment includes a so-called self-dispersion type pigment. This is because the self-dispersion type pigment is produced by, for example, bonding (grafting) hydrophilic groups on the surfaces of a pigment through physical treatment or chemical treatment of the pigment.

The self-dispersion type pigment represents a pigment which can be dispersed or dissolved in an aqueous medium without a dispersant. The expression "dispersed or dissolved in an aqueous medium without a dispersant" represents a state of being stably present in an aqueous medium due to hydrophilic groups of the surfaces even without using a dispersant for dispersing the pigment. The expression "stably present in an aqueous medium" represents being stable (change in pigment particle diameter within +/−30%) for 90 days in water (25° C., solid content of 10% by mass) without a dispersant.

The hydrophilic group is preferably one or more hydrophilic groups selected from the group consisting of —OM, —COOM, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$, that is, an anionic hydrophilic functional group. In these formulae, M each independently represent a hydrogen atom, an alkali metal, ammonium, a phenyl group or organic ammonium which may have a substituent. In these formulae, R each independently represent an alkyl group having 1 to 12 carbon atoms or a naphthyl group which may have a substituent.

Examples of the self-dispersion type pigment which can be used include pigments treated by methods described in Japanese Unexamined Patent Application Publication No. 8-3498, Japanese Unexamined Patent Application Publication (Translation of PCT Application) No. 2000-513396, Japanese Unexamined Patent Application Publication (Translation of PCT Application) No. 2008-524400, Japanese Unexamined Patent Application Publication (Translation of PCT Application) No. 2009-515007, Japanese Unexamined Patent Application Publication (Translation of PCT Application) No. 2010-537006, and Japanese Unexamined Patent Application Publication (Translation of PCT Application) No. 2012-500866. Either an inorganic pigment or an organic pigment can be used as a raw material of the self-dispersion type pigment.

In printing using plain paper as a recording material, a yellow ink, a cyan ink, a magenta ink, a black ink, and the like are used alone or as an ink set of combination of plural inks. Pigments used for these inks are not particularly limited, and pigments used for usual aqueous inks can be used. Specifically, a known inorganic pigment and organic pigment which can be dispersed in water or a water-soluble organic solvent can be used. Examples of the inorganic pigment include iron oxide, carbon black produced by a known method such as a contact method, a furnace method, a thermal method, or the like, and the like. Examples of the organic pigment which can be used include azo pigments (including azo lake pigments, insoluble azo pigments, condensed azo pigments, chelate azo pigments, and the like), polycyclic pigments (for example, phthalocyanine pigments, perylene pigments, perinone pigments, anthraquinone pigments, quinacridone pigments, dioxazine pigments, thioindigo pigments, isoindolinone pigments, quinophthalone pigments, and the like), dye chelates (for example, basic dye-type chelates, acidic dye-type chelates, and the like), nitro pigments, nitroso pigments, aniline black, and the like.

Examples of pigments used as carbon black for black inks include No. 2300, No. 2200B, No. 900, No. 960, No. 980, No. 33, No. 40, No. 45, No. 45L, No. 52, HCF88, MA7, MA8, MA100, and the like, which are manufactured by Mitsubishi Chemical Corporation); Raven 5750, Raven 5250, Raven 5000, Raven 3500, Raven 1255, Raven 700, and the like, which are manufactured by Columbian Chemicals Company); Regal 400R, Regal 330R, Regal 660R, Mogul L, Mogul 700, Monarch 800, Monarch 880, Monarch 900, Monarch 1000, Monarch 1100, Monarch 1300, Monarch 1400, and the like, which are manufactured by Cabot Corporation; Color Black FW1, FW2, FW2V, FW18, FW200, S150, S160, and S170, Printex 35, U, V, and 1400U, Special Black 6, 5, 4, and 4A, NIPEX 150, NIPEX 160, NIPEX 170, NIPEX 180, and the like, which are manufactured by Degussa Corporation.

Examples of pigments used for yellow inks include C. I. Pigment Yellow 1, 2, 12, 13, 14, 16, 17, 73, 74, 75, 83, 93, 95, 97, 98, 109, 110, 114, 120, 128, 129, 138, 150, 151, 154, 155, 174, 180, 185, and the like.

Examples of pigments used for magenta inks include C. I. Pigment Red 5, 7, 12, 48(Ca), 48(Mn), 57(Ca), 57:1, 112, 122, 123, 146, 168, 176, 184, 185, 202, 209, and the like.

Examples of pigments used for cyan inks include C. I. Pigment Blue 1, 2, 3, 15, 15:3, 15:4, 16, 22, 60, 63, 66, and the like.

For example, a commercial product may be used as the self-dispersion type pigment. Examples of the commercial product include "CAB-O-JET 200", "CAB-O-JET 250C", "CAB-O-JET 260M", "CAB-O-JET 270Y", "CAB-O-JET 300", "CAB-O-JET 400", "CAB-O-JET 450C", "CAB-O-JET 465M", and "CAB-O-JET 470Y", which are manufactured by Cabot Specialty Chemicals, Inc.; "BONJET BLACK CW-2" and "BONJET BLACK CW-3" which are manufactured by Orient Chemical Industries Co., Ltd.; "LIOJET WD BLACK 002C" manufactured by Toyo Ink Mfg. Co., Ltd., and the like. Also, a pigment dispersion produced by dispersing the self-dispersion type pigment in an aqueous medium can be used as a commercial product. Examples thereof include "SENSIJJET Black SDP100", "SENSIJJET Black SDP1000", "SENSIJJET Black SDP2000", "Sensijet Ultra Yellow PY74", "Sensijet Ultra Magenta PR122", "Sensijet Ultra Cyan PB15:4", "Sensijet Ultra K", and the like, which are manufactured by United States, Sensient Colors Inc.

These self-dispersion type pigments may be used alone or in combination of two or more types.

In particular, when an aqueous ink is used for ink jet, the content (mass basis) of a pigment is preferably 0.5% to 30% and more preferably 1.0% to 12% relative to the total amount of the aqueous ink. In order to achieve a sufficient optical density on plain paper, the content is most preferably 3% or more and 12% or less. This is because with the content of less than 3%, a printing density on plain paper cannot be secured, while with the content exceeding 12%, discharge stability of the aqueous ink from an ink jet head is degraded due to an increase in ink viscosity or the like.

The particle diameter of the pigment is preferably 1 μm or less and more preferably 10 nm to 150 nm, and the pigment preferably still more preferably contains particles of 50 nm to 120 nm.

(Bio-Nanofibers)

The bio-nanofibers used in the present invention represent cellulose or chitin/chitosan uniformly refined (nano-fiberized) at a nano-level. Therefore, the bio-nanofibers may be referred to as "biomass-nanofibers" (reference: Japanese Unexamined Patent Application Publication No. 2013-216766, etc.).

Even when the bio-nanofibers used in the present invention contain impurities other than cellulose, chitin, or chitosan, there is no particular hindrance, but cellulose nanofibers or chitosan nanofibers are preferred.

In the specification, the term "nanofibers" represents a fibrous material having a diameter of 1 nm to 100 nm and an aspect ratio (=length/diameter) of 100 or more. Therefore, the "cellulose nanofibers" represents cellulose fibers having a diameter of 1 nm to 100 nm and an aspect ratio (=length/diameter) of 100 or more.

(Cellulose Nanofibers)

The cellulose nanofibers used in the present invention preferably have an average diameter (may be referred to as "fiber diameter") of 1 nm to 100 nm, more preferably 1 nm to 50 nm, still more preferably 3 nm to 30 nm, and even more preferably about 20 nm. The aspect ratio is preferably 100 or more, more preferably 100 to 10000, and still more preferably 100 to 2000. This is because the range can provide a satisfactory effect at low cost. The cellulose nanofibers can be used alone or as a mixture of two or more types.

The average diameter (short diameter) of the cellulose nanofibers of the present invention defines the average diameter and aspect ratio of the cellulose nanofibers under a dry condition. The "aspect ratio" in the present invention represents a ratio (average fiber length/average diameter) of the average fiber length to the average diameter of the cellulose nanofibers. In the present invention, the average diameter and aspect ratio under a dry condition can be measured by a scanning electron microscope (SEM) or a transmission electron microscope (TEM, with electron staining). For example, a dispersion prepared by dispersing cellulose nanofibers is cast on a substrate and observed with SEM, and diameter and length values of 20 or more fibers per image are read. This is performed for images of at least three regions, which are not overlapped with each other, to obtain information of the diameters and lengths of at least 30 fibers, preferably 100 fibers. The average diameter can be calculated from the date of fiber diameters, and the average fiber length can be calculated from the date of lengths. However, the aspect ratio under a dry condition may be calculated by a method other than the method described above unless the value is changed. In the present invention, the dry condition is a condition in which 99% by mass or more of liquid is removed from at least the cellulose nanofibers by a usual known method such as natural drying or reduced-pressure freeze drying.

The cellulose nanofibers used in the present invention can be expressed by the average diameter (short diameter) and aspect ratio calculated based on the results of electron microscope observation as described above. The cellulose nanofibers can be also expressed by a hydrodynamic particle diameter using a commercial electrical/optical particle diameter measuring apparatus. The hydrodynamic particle diameter of the cellulose nanofibers used in the present invention can be measured by, for example, using dynamic light scattering Nanotrac particle size analyzer UPA-150EX (manufactured by Nikkiso Co., Ltd.). The hydrodynamic particle diameter of the cellulose nanofibers described in the specification corresponds to the average particle diameter of a hydrodynamic equivalent spherical model formed when the cellulose nanofibers are dispersed in a solvent. In principle, a certain volume of particles are sorted in order from smaller ones to display a particle diameter distribution. Thus, the mode value corresponds to the maximum value of the particle diameter distribution. The 20% particle diameter is the particle diameter when particles at a 20% volume in the particle diameter distribution are sorted, and the 80% particle diameter is the particle diameter when particles at a 80% volume in the particle diameter distribution are sorted.

The most frequent value (mode value) of the hydrodynamic particle diameter at 0.1% by mass (solvent:water) of the cellulose nanofibers used in the present invention is preferably 100 nm or more and 800 nm or less, more preferably 200 nm or more and 700 nm or less, and still more preferably 250 nm or more and 650 nm or less. In the hydrodynamic particle diameter distribution, a value of the 80% particle diameter to the 20% particle diameter, that is, a value of (80% particle diameter)/(20% particle diameter), is preferably 10 or less, more preferably 8 or less, and still more preferably 6 or less.

With respect to the cellulose nanofibers used in the present invention, a specific surface area (calculated with ultrasonic dispersion treatment: 1 minute, sample refractive index: 1.56 to 0.00i, dispersion medium refractive index: 1.333 to 0.00i) calculated from a particle size distribution (volume-based particle diameter distribution) measured by a light scattering method is preferably 800 $cm^2/cm^3$ or more and 3000 $cm^2/cm^3$ or less, more preferably 1000 $cm^2/cm^3$ or more and 2800 $cm^2/cm^3$ or less, and still more preferably 1200 $cm^2/cm^3$ or more and 2600 $cm^2/cm^3$ or less. The specific surface area is a total ($cm^2$) of surface areas of particles per unit volume ($cm^3$), but it is a value calculated from particle diameter distribution data and thus generally does not agree with a specific surface area measured based on another measurement principle.

In the case of an aqueous ink, the content (mass basis) of the cellulose nanofibers used in the present invention is preferably a cellulose nanofiber/pigment ratio of 1/100 to 1/8, more preferably 1/100 to 15/100, still more preferably 1/100 to 14/100, and even more preferably 1/100 to 13/15. This is because within the range, color development (optical density) and rubfastness of the formed image reach a desired level without degrading the adaptability for various printing methods.

Thus, when the content of the cellulose nanofibers in an aqueous pigment dispersion is a specified amount, desired levels of the color development (optical density) and rubfastness of an image formed with the aqueous ink can be achieved. Although the mechanism of this has not been sufficiently examined, it is supposed as follows.

A glucose unit constituting cellulose takes a chair conformation, and thus hydroxyl groups are arranged in a horizontal direction and only C and H are arranged in a vertical direction with respect to a glucopyranose ring. Therefore, the vertical direction of cellulose is hydrophobic, while the horizontal direction is hydrophilic. This tendency is further enhanced by an increase in surface area due to nano-fiberization. Therefore, in the aqueous ink, in a composite material of pigment particles composed of the cellulose nanofibers with an anionic group-containing organic polymer compound described below, the interfacial tension between the pigment particles and the anionic group-containing organic polymer compound is decreased, and repulsive force is imparted to overcome the Van der Waals force between the pigment particles while controlling the charge on the pigment particle surfaces. It is thus considered that a high degree of balance essential for stable dispersion of the pigment can be achieved.

Therefore, even when printing is performed on plain paper containing various paper components, the pigment particles can be fixed without being unnecessarily penetrated into the paper used as an object to be printed, thereby exhibiting a high optical density, causing no color mixing of color inks adjacent to each other in multicolor-type color printing, and causing excellent rubfastness.

In the case of the aqueous ink, particularly for ink jet", the content of the cellulose nanofibers is preferably in a range of 0.001% to 3%, more preferably 0.01% to 2%, and still more preferably 0.05% to 1% relative to the total ink mass. This is because with the content of less than 0.001%, the optical density and rubfastness cannot be secured, while with the content exceeding 3%, printability is impaired due to an increase in ink viscosity or the like.

The cellulose nanofibers used in the present invention are not particularly limited and a commercial product or a product produced by a known production method can be used. The cellulose nanofibers are generally produced by fibrillating or refining a cellulose fiber-containing material by grinding and/or beating using a refiner, a high-pressure homogenizer, a medium stirring mill, a millstone, a grinder, or the like, and for example, can be produced by a known method such as a method described in Japanese Unexamined Patent Application Publication No. 2005-42283. Also, microorganisms (for example, *acetobacter*) can be used for production. Further, a commercial product can be used. Examples of the cellulose fiber-containing material include known materials derived from origins such as plants (for example, wood, bamboo, cotton, jute, kenaf, agricultural residues, cloth, pulp, regenerated pulp, and wastepaper), animals (for example, sea squirt), algaes, microorganisms (for example, *acetobacter*), microorganism products, and the like. In the present invention, any one of these materials can be used. Among these, cellulose nanofibers derived from plants or microorganisms are preferred, and cellulose nanofibers derived from plants are more preferred.

The cellulose nanofibers used in the present invention need not be so-called modified cellulose nanofibers which are chemically modified in some way as described in Japanese Unexamined Patent Application Publication No. 2013-181167 and Japanese Unexamined Patent Application Publication No. 2010-216021, and so-called unmodified cellulose nanofibers produced by, for example, a method described in Japanese Unexamined Patent Application Publication No. 2011-56456, and an unmodified cellulose nanofiber commercial product can also be used. Examples of the unmodified cellulose nanofiber commercial product include bio-nanofiber "BiNFi-s" series of Sugino Machine Limited, "Celish" series of Daicel FineChem Ltd., and "CNF" series of Chuetsu Pulp & Paper Co., Ltd. These cellulose nanofibers can be used alone or as a mixture of two or more.

In a $^{13}$C-NMR chart of the cellulose nanofibers used in the present invention, it can be confirmed that a peak at 62 ppm corresponding to the C6-position of a primary hydroxyl group of a glucose unit is present. In the case of modified cellulose nanofibers, for example, when hydroxyl groups at the C6-positions of glucose units in a cellulose molecule are partially converted to carboxyl groups by oxidation or the like, the peak at 62 ppm disappears, and a peak at 178 ppm derived from carboxyl groups is present instead.

The cellulose nanofibers used in the present invention are not modified by oxidation or the like as described above. Therefore, hydroxyl groups of cellulose may be slightly substituted with carboxyl groups by treatment in a process of producing and purifying cellulose nanofibers. However, an amount of substituent generally does not exceed 0.1 mmol/g.

The amount of carboxyl groups can be measured by the following method. First, 60 cm$^3$ of a 0.5% by mass slurry (water dispersion) of cellulose nanofibers is prepared and adjusted to pH 2.5 by adding a 0.1 mol/L aqueous hydrochloric acid solution. Then, electric conductivity is measured until the pH becomes 11 by adding dropwise a 0.05 mol/L aqueous sodium hydroxide solution. The amount of carboxyl groups can be calculated by using a formula below from an amount (a) of sodium hydroxide consumed in a weak acid neutralization step in which the electric conductivity is gently changed.

Carboxyl group amount (mmol/g cellulose nanofibers)=$a$ (cm$^3$)×0.05/cellulose nanofiber mass (g) [Math. 1]

The thermal decomposition temperature of the cellulose nanofibers used in the present invention depends on the crystallinity, average degree of polymerization, etc. but is generally about 250° C. to 280° C. In the specification, the thermal decomposition temperature represents a temperature at which the weight starts to decrease due to thermal decomposition when the temperature is increased from room temperature (temperature rising speed: 5° C./min) by a thermogravimeter-differential thermal analyzer (TG-DTA). The temperature at which the weight starts to decrease is defined as a temperature at an intersect of a tangent at the time of large weight decrease and a tangent before weight decrease in a graph in which the weight decrease rate is plotted on the ordinate, and the temperature is plotted on the abscissa.

The degree of crystallization (ratio of cellulose I-type crystal structure) of the cellulose nanofibers used in the present invention is not particularly limited. The degree of crystallization (ratio of cellulose I-type crystal structure) is determined by X-ray diffraction. For example, the degree of crystallization of type I cellulose can be calculated from X-ray diffraction results by using a method of Segal et al. (L. Segal, J. J. Greely et al, Text. Res. J., 29, 786, 1959) and a method of Kamide et al. (K. Kamide et al, Polymer J., 17, 909, 1985). That is, the degree of crystallization can be calculated by a formula below from the diffraction intensity of a 002 plane at 2θ=22.6° and the diffraction intensity of an amorphous portion at 2θ=18.5° using the diffraction intensities at 2θ=4° to 32° as a baseline in a diffraction chart obtained by X-ray diffraction measurement.

$$\chi_c = (I_{002c} - I_a)/I_{002c} \times 100$$ [Math. 2]

(In the formula, $\chi_c$ represents the degree of crystallization of type I cellulose (%), $I_{002c}$ represents the 002 plane diffraction intensity at 2θ=22.6°, and $I_a$ represents the amorphous portion diffraction intensity at 2θ=18.5°.)

The cellulose nanofibers used in the present invention need not be chemically treated by oxidation of cellulose nanofibers and thus need not be improved in resistance to radical an alkali over a long period of time, and it is unnecessary to select cellulose with a high degree of crystallization of type I cellulose (degree of crystallization of about 65% to 85%). That is, the effect of the present invention can be exhibited by using cellulose nanofibers derived from cellulose as a starting material which is produced from wood pulp and which has a degree of crystallization of about 50% to 70% (for example, 55% to 65%).

The crystal form of the cellulose nanofibers used in the present invention is not particularly limited. Both Iα- and Iβ-cellulose can be preferably used as the crystal form of the cellulose nanofibers. Cellulose derived from higher plants such as cotton contains a large amount of Iβ crystal component, while bacterial cellulose contains a large amount of Iα crystal component. Cellulose can be properly selected from an economical viewpoint.

(Chitosan Nanofibers)

The chitosan nanofibers used in the present invention preferably have an average diameter (referred to as a "fiber diameter") of 1 to 100 nm, more preferably 1 to 50 nm, still more preferably 3 to 30 nm, and even more preferably about 20 nm. The aspect ratio is preferably 100 or more, more preferably 100 to 10,000, and still more preferably 100 to 2000. This is because within the range, a satisfactory effect can be obtained at low cost. The chitosan nanofibers are used singly, used as a mixture of two or more types, or used in combination with the cellulose nanofibers.

The average fiber length, average diameter, etc. of the chitosan nanofibers of the present invention are defined as the same as the average diameter and aspect ratio of the cellulose nanofibers and can be calculated as described above.

The most frequent value (mode value) of the hydrodynamic particle diameter at 0.1% by mass (solvent:water) of the chitosan nanofibers used in the present invention is preferably 100 nm or more 800 nm or less, more preferably 200 nm or more and 700 nm or less, and still more preferably 250 nm or more and 650 nm or less. In the hydrodynamic particle diameter distribution, a ratio value of the 80% particle diameter to the 20% particle diameter, that is, a value of (80% particle diameter)/(20% particle diameter), is preferably 10 or less, more preferably 8 or less, and still more preferably 6 or less.

With respect to the chitosan nanofibers used in the present invention, a specific surface area (calculated with ultrasonic dispersion treatment: 1 minute, sample refractive index: 1.56 to 0.00i, dispersion medium refractive index: 1.333 to 0.00i) calculated from a particle size distribution (volume-based particle diameter distribution) measured by a light scattering method is preferably 800 $cm^2/cm^3$ or more and 3,000 $cm^2/cm^3$ or less, more preferably 1,000 $cm^2/cm^3$ or more and 2,800 $cm^2/cm^3$ or less, and still more preferably 1,200 $cm^2/cm^3$ or more and 2,600 $cm^2/cm^3$ or less. The specific surface area is a total ($cm^2$) of surface areas of particles per unit volume ($cm^3$), but it is a value calculated from particle diameter distribution data and thus generally does not agree with a specific surface area measured based on another measurement principle.

The content (mass basis) of the chitosan nanofibers used in the present invention is preferably a chitosan nanofiber/pigment ratio of 1/100 to 1/8, more preferably 1/100 to 15/100, still more preferably 1/100 to 14/100, and even more preferably 1/100 to 13/100. This is because within the range, color development (optical density) and rubfastness of the formed image reach a desired level without degrading the suitability for various printing methods.

Thus, when the content of the chitosan nanofibers in the aqueous pigment dispersion is a specified amount, desired levels of the color development (optical density) and rubfastness of an image formed with the aqueous ink can be achieved. The mechanism of this has not been sufficiently examined but is supposed as follows.

Chitosan is an aminosaccharide obtained by deacetylating chitin ($\beta$-1,4-poly-N-acetyl-D-glucosamine) extracted from crab and shrimp shells and has a structure in which a hydroxyl group at the C2-position of cellulose is substituted by an amino group. Conversion (deacetylation reaction) of chitin to chitosan does not completely proceed, and N-acetylglucosamine is often contained in a portion of a sugar chain. When 70% or more of glucosamine residues are deacetylated, chitin is generally referred to as "chitosan". Therefore, the quality of chitosan is shown by a deacetylation rate (may be denoted by "% DA") measured by NMR spectroscopy, infrared absorption spectroscopy (IR), and a colloidal titration method.

A glucose unit constituting chitosan takes a chair conformation, and thus hydroxyl groups are arranged in a horizontal direction and only C and H are arranged in a vertical direction with respect to a glucopyranose ring. Therefore, like in the cellulose nanofibers, the vertical direction of chitosan is hydrophobic, while the horizontal direction is hydrophilic. This tendency is further enhanced by an increase in surface area due to nano-fiberization. Therefore, in the aqueous ink, in a composite material of pigment particles composed of the chitosan nanofibers with an anionic group-containing organic polymer compound described below, the interfacial tension between the pigment particles and the anionic group-containing organic polymer compound is decreased, and repulsive force is imparted to overcome the Van der Waals force between the pigment particles while controlling the charge on the pigment particle surfaces. It is thus considered that a high degree of balance essential for stable dispersion of the pigment can be achieved. When a polysaccharide derivative, particularly carboxymethyl cellulose ammonium as a polysaccharide derivative, is used as the anionic group-containing organic polymer compound, ammonium ion with high bulkiness is considered to contribute to surface potential stabilization of a complex of the pigment particles composed of chitosan nanofibers and the polysaccharide derivative.

The chitosan nanofibers have the tendency of higher hydrophilicity and cationy than cellulose nanofibers and thus have the tendency to exhibit more desired physical properties in a magenta pigment- or yellow pigment-dispersed system with high polarity.

Therefore, even when printing is performed on plain paper containing various paper components, the pigment particles can be fixed without being unnecessarily penetrated into the paper used as an object to be printed, thereby exhibiting a high optical density, causing no color mixing of color inks adjacent to each other in multicolor-type color printing, and causing excellent rubfastness.

In the case of an aqueous ink, particularly, for ink jet, the content of the chitosan nanofibers is preferably in a range of 0.001% to 3%, more preferably 0.01% to 2%, and still more preferably 0.05% to 1% relative to the total ink mass. This is because with the content of less than 0.001%, the optical density and rubfastness cannot be secured, while with the content exceeding 3%, printability is impaired due to an increase in ink viscosity or the like.

The chitosan nanofibers used in the present invention are not particularly limited, and a commercial product and a product produced by a known production method can be used. Chitosan used as a raw material of the chitosan nanofibers is manufactured and sold by many companies of various countries of the world, and it is known that besides commercial products, chitosan with the same structure can be purified from microorganism bacteria or the like. The deacetylation rate of chitosan is not particularly limited and an optimum value may be properly selected according to application. The raw material used is preferably purified chitosan produced by deacetylating chitin possessed by crustaceans such as crabs, shrimps, and the like and then performing protein removal and decalcification. The chitosan nanofibers are produced by fibrillating or refining the chitosan by grinding and/or beating using a refiner, a high-pressure homogenizer, a medium stirring mill, a millstone, a grinder, or the like, and for example, can be produced by a known method such as a method described in Japanese Unexamined Patent Application Publication No. 2011-56456.

The chitosan nanofibers used in the present invention may be a commercial product. Examples of the commercial product include bio-nanofiber "BiNFi-s" chitosan of Sugino Machine Limited. These chitosan nanofibers can be used alone, used as a mixture of two or more types, or used in combination with the cellulose nanofibers.

(Aqueous Medium)

The aqueous pigment dispersion of the present invention uses an aqueous medium such as a water-soluble solvent and/or water as a solvent. In this case, water may be singly used or a mixed solvent of water and a water-soluble solvent may be used. Examples of the water-soluble solvent include ketones such as acetone, methyl ethyl ketone, methyl butyl ketone, methyl isobutyl ketone, and the like; alcohols such as methanol, ethanol, 2-propanol, 2-methyl-1-propanol, 1-butanol, 2-methoxyethanol, and the like; ethers such as tetrahydrofuran, 1,4-dioxane, 1,2-dimethoxyethane, and the like; amides such as dimethylformamide, N-methylpyrrolidone, and the like. A compound selected from the group consisting of ketones having 3 to 6 carbon atoms and alcohols having 1 to 5 carbon atoms is preferably used.

Besides these, a water-soluble organic solvent capable of aqueous dissolution can also be used. Examples thereof include glycols such as ethylene glycol, diethylene glycol, triethylene glycol, tetraethylene glycol, propylene glycol, polyethylene glycol, polypropylene glycol, and the like; diols such as butanediol, pentanediol, hexanediol, and similar diols, and the like; glycol esters such as propylene glycol laurate and the like; ethers such as diethylene glycol monoethyl, diethylene glycol monobutyl, diethylene glycol monohexyl, and the like; glycol ethers such as propylene glycol ether, dipropylene glycol ether, cellosolve containing triethylene glycol ether, and the like; alcohols such as methanol, ethanol, isopropyl alcohol, 1-propanol, 2-propanol, 1-butanol, 2-butanol, butyl alcohol, pentyl alcohol, similar alcohols, and the like; sulfolane; lactones such as γ-butyrolactone and the like; lactams such as N-(2-hydroxyethyl)pyrrolidone and the like; other various solvents known as water-soluble organic solvents, such as glycerin and derivatives thereof, polyoxyethylene benzyl alcohol ether, and the like. These water-soluble organic solvents can be used alone or as a mixture of two or more.

In particular, polyhydric alcohols such as glycols and diols with high boiling points, low volatility, and high surface tension are preferred, and glycols such as diethylene glycol, triethylene glycol, and the like are particularly preferred.

(Anionic Group-Containing Organic Polymer Compound)

The anionic group-containing organic polymer compound used in the present invention is an organic polymer compound containing, for example, a carboxyl group, a sulfonic acid group, or a phosphoric acid group. Examples of the anionic group-containing organic polymer compound include polyvinyl resins having anionic groups, polyester resins having anionic groups, amino resins having anionic groups, acrylic resins having anionic groups, epoxy resins having anionic groups, polyurethane resins having anionic groups, polyether resins having anionic groups, polyamide resins having anionic groups, unsaturated polyester resins having anionic groups, phenol resins having anionic groups, silicone resins having anionic groups, fluorine-based polymer compounds having anionic groups, polysaccharide derivatives having anionic groups, and the like.

In particular, acrylic resins having anionic groups and polyurethane resins having anionic groups are preferred from the viewpoint of abundant raw materials, ease of design, and excellent pigment dispersion function.

(Acrylic Resin Having Anionic Group)

Specifically, an acrylic resin having an anionic group is, for example, a resin composed of a copolymer of a monomer having an anionic group, such as (meth)acrylic acid or the like, and another ethylenically unsaturated monomer copolymeriable therewith. In the present invention, "(meth)acrylic acid" represents a general name of acrylic acid and methacrylic acid. Various esters of (meth)acrylic acid are interpreted as the same as described above.

From the viewpoint that hydrophobicity of a copolymer can be enhanced at the same acid value comparison, and adsorption of the copolymer on the pigment surfaces can be further strengthened, preferred examples of the other copolymerizable ethylenically unsaturated monomer include alkyl styrene such as styrene, α-methylstyrene, β-methylstyrene, 2,4-dimethylstyrene, α-ethylstyrene, α-butylstyrene, α-hexylstyrene, and the like; halogenated styrene such as 4-chlorostyrene, 3-chlorostyrene, 3-bromostyrene, and the like; styrene-based monomers such as 3-nitrostyrene, 4-methoxstyrene, vinyltoluene, and the like; and (meth)acrylic acid ester-based monomers having benzene rings, such as benzyl (meth)acrylate, phenyl (meth)acrylate, phenylethyl (meth)acrylate, phenylpropyl (meth)acrylate, phenoxyethyl (meth)acrylate, and the like. In particular, styrene monomers such as styrene, α-methylstyrene, tert-butylstyrene, and the like are preferably used.

The copolymer relating to the acrylic resins having anionic groups in the present invention may be a copolymer containing, as essential polymerization units, a (meth)acrylic acid polymerization unit and another copolymerizable ethylenically unsaturated monomer polymerization unit. The copolymer may be either a bipolymer or a terpolymer or higher-order copolymer with a still another copolymerizable ethylenically unsaturated monomer.

Examples of the ethylenically unsaturated monomer include acrylic acid esters and methacrylic acid esters such as methyl acrylate, methyl methacrylate, n-propyl acrylate, isopropyl acrylate, n-butyl acrylate, sec-butyl acrylate, tert-butyl acrylate, 2-ethylbutyl acrylate, 1,3-dimethylbutyl acrylate, hexyl acrylate, 2-ethylhexyl acrylate, octyl acrylate, ethyl methacrylate, n-butyl methacrylate, 2-methylbutyl methacrylate, pentyl methacrylate, heptyl methacrylate, nonyl methacrylate, and the like; acrylic acid ester derivatives and methacrylic acid ester derivatives such as 3-ethoxypropyl acrylate, 3-ethoxybutyl acrylate, dimethylaminoethyl acrylate, 2-hydroxyethyl acrylate, 2-hydroxybutyl acrylate, ethyl-α-(hydroxymethyl) acrylate, dimethylaminoethyl methacrylate, hydroxyethyl methacrylate, hydroxypropyl methacrylate, and the like; acrylic acid aryl esters and acrylic acid aralkyl esters such as phenyl acrylate, benzyl acrylate, phenylethyl acrylate, phenylethyl methacrylate, and the like; polyhydric alcohol monoacrylic acid esters and monomethacrylic acid esters such as diethylene glycol, triethylene glycol, polyethylene glycol, glycerin, bisphenol A, and the like; maleic acid dialkyl esters such as dimethyl maleate, diethyl maleate, and the like; vinyl acetate; and the like. These monomers can be added alone or two or more as a monomer component.

The copolymer relating to the acrylic resins having anionic groups in the present invention may be a linear copolymer composed of only a monoethylenically unsaturated monomer polymerization unit or a copolymer having a crosslinked portion and produced by copolymerizing a small amount of any one of various crosslinkable ethylenically unsaturated monomers.

Examples of the crosslinkable ethylenically unsaturated monomers include glycidyl (meth)acrylate, divinylbenzene, and polyhydric alcohol poly(meth)acrylates such as ethylene glycol di(meth)acrylate, propylene glycol di(meth)acrylate, polyethylene glycol di(meth)acrylate, poly(oxyethyleneoxypropylene) glycol di(meth)acrylate, glycerin alkylene oxide-adduct tri(meth)acrylate, and the like.

In the present invention, the reaction rates or the like of the monomers used are considered to be substantially the same, and thus the feeding ratios of the monomers are considered as content ratios by mass of the monomer polymerization units. The copolymer relating to the acrylic resins having anionic groups in the present invention can be synthesized by any one of various known usual reaction methods such as bulk polymerization, solution polymerization, suspension polymerization, emulsion polymerization, and the like. In this case, known common polymerization initiator, chain transfer agent (polymerization degree adjusting agent), surfactant, and defoaming agent can be also used.

Among the copolymers described above as the copolymer relating to the acrylic resins having anionic groups used in the present invention, a styrene-acrylic acid copolymer containing a styrene monomer and (meth)acrylic acid as raw material monomers is particularly preferred, and examples thereof include a styrene-(meth)acrylic acid copolymer, a styrene-(meth)acrylic acid ester-(meth)acrylic acid copolymer, a (meth)acrylic acid ester-(meth)acyclic acid copolymer, and the like. (In the present invention, "styrene-acrylic acid copolymer" is defined as a "copolymer containing a styrene monomer and (meth)acrylic acid as raw material monomers". Therefore, a general-purpose monomer other than a styrene monomer and (meth)acrylic acid may be copolymerized.)

The styrene-acrylic acid copolymer is produced by copolymerizing a styrene monomer and at least one of an acrylic acid monomer and a methacrylic acid monomer, but both acrylic acid and methacrylic acid are preferably used. The reason for this is that the uniformity of a resin is improved due to improvement in copolymerizability during resin synthesis, resulting in good storage stability and the tendency to produce a pigment dispersion containing finer particles.

During copolymerization, the total amount of a styrene monomer, an acrylic acid monomer, and a methacrylic acid monomer in the styrene-acrylic acid copolymer is preferably 95% by mass or more relative to the whole monomer components.

A usual polymerization method can be used as a method for producing the styrene-acrylic acid copolymer, and examples thereof include methods of performing polymerization reaction in the presence of a polymerization catalyst, such as solution polymerization, suspension polymerization, bulk polymerization, and the like. Examples of the polymerization catalyst include 2,2'-azobis(2,4-dimethylvaleronitrile), 2,2'-azobisisobutyronitrile, 1,1'-azobis(cyclohexane-1-carbonitrile), benzoyl peroxide, dibutyl peroxide, butyl peroxybenzoate, and the like. The amount of use is preferably 0.1 to 10.0% by mass of the monomer components.

The styrene-acrylic acid copolymer may be either a random copolymer or a graft copolymer. The graft copolymer can be exemplified by a graft copolymer in which polystyrene or a copolymer of styrene with a nonionic monomer copolymerizable with styrene serves as a stem or a branch, and a copolymer of acrylic acid, methacrylic acid, and another monomer including styrene serves as a branch or stem. The styrene-acrylic acid copolymer may be a mixture of the graft copolymer and the random copolymer.

In the present invention, the acrylic resins having an anionic group preferably have a weight-average molecular weight within a range of 5,000 to 20,000. For example, when the styrene-acrylic acid copolymer is used, the weight-average molecular weight is preferably within a range of 5,000 to 20,000, and more preferably within a range of 5,000 to 18,000. In particular, the weight-average molecular weight is particularly preferably within a range of 5,500 to 15,000. The weight-average molecular weight is a value measured by GPC (gel permeation chromatography) method and is a value in terms of the molecular weight of polystyrene used as a standard material.

When the anionic group-containing organic polymer compound used in the present invention is the styrene-acrylic acid copolymer, the copolymer has carboxyl groups derived from the acrylic acid monomer and the methacrylic acid monomer and preferably has an acid value of 50 to 220 (mgKOH/g) and more preferably 60 to 200 (mgKOH/g). With the acid value of 220 (mgKOH/g) or less, there is the tendency to produce less aggregation of the pigment.

The acid value is a value measured according to Japanese Industrial Standards "K0070:1992, Test methods for acid value, saponification value, ester value, iodine value hydroxyl value, and unsaponifiable matter of chemical products" and represents an amount (mg) of potassium hydroxide necessary for completely neutralizing 1 g of resin.

With the excessively low acid value, pigment dispersion and storage stability are decreased, and when an aqueous pigment dispersion for ink jet recording described below is prepared, printing stability is undesirably degraded. With the excessively high acid value, the water resistance of a color recorded image is undesirably degraded. In order to bring the acid value of the copolymer within the range, copolymerization may be performed by using (meth)acrylic acid so that the acid value falls within the range.

(Polyurethane Resin Having Anionic Group)

Examples of the polyurethane resins having anionic groups used in the present invention include polyols and polyisocyanates each having an anionic group such as a carboxyl group, a sulfonic acid group, or the like, and urethane resins produced by further reacting general-purpose polyol not having an anionic group and a chain extender according to demand.

Example of the polyol having a carboxyl group used in the present invention include esters produced by reacting polyhydric alcohols with polybasic acid anhydrides, dihydroxyalkanoic acids such as 2,2-dimethylol lactic acid, 2,2-dimethylol propionic acid, 2,2-dimethylol butanoic acid, 2,2-dimethylol valeric acid, and the like. Preferred compounds include 2,2-dimethlylol propionic acid and 2,2-dimethylol butanoic acid. In particular, dimethylol propionic acid or dimethylol butanoic acid is preferred because of its easy availability. Example of the polyol having a sulfonic acid group include polyester polyols produced by reacting a dicarboxylic acid such as 5-sulfoisophthalic acid, sulfoterephthalic acid, 4-sulfophthalic acid, 5[4-sulfophenoxy] isophthalic acid, or the like, a salt thereof, and the low-molecular-weight polyol described above.

Examples of the diisocyanate used in the present invention include aliphatic diisocyanate compounds such as hexamethylene diisocyanate, 2,2,4-trimethylhexamethylene diisocyanate, and the like; alicyclic diisocyanate compounds such as isophorone diisocyanate, hydrogenated xylylene diisocyanate, 4,4-cyclohexylmethane diisocyanate, and the like; araliphatic diisocyanate compounds such as xylylene diisocyanate, tetramethylxylene diisocyanate, and the like; aromatic diisocyanate compounds such as toluylene diisocyanate, phenylmethane diisocyanate, and the like.

Among these, aliphatic diisocyanate compounds or alicyclic diisocyanates are preferred from the viewpoint of little photodiscoloration of a printed image.

Examples of the general-purpose polyol not having an anionic group include polyester polyol, polyether polyol, polyhydroxy polycarbonate, polyhydroxy polyacetal, polyhydroxy polyacrylate, polyhydroxy polyesteramide, polyhydroxy polythioether, and the like. Among these, polyester polyol, polyether polyol, and polyhydroxy polycarbonate are preferred. The polyols may be reacted alone or as a mixture of two or more.

Besides the polyol, a low-molecular-weight diol may be properly combined for the purpose of adjusting the film hardness or the like of a print matter. Examples of the diol include ethylene glycol, diethylene glycol, propylene glycol, dipropylene glycol, 1,2-propanediol, 1,3-propanediol, 1,4-butanediol, and the like.

Examples of the chain extender used in the present invention include diols such as ethylene glycol, propylene glycol, 1,4-butanediol, 1,6-hexanediol, 1,9-nonanediol, 1,4-bis(β-hydroxyethoxy)benzene, 1,4-cyclohexanediol, xylylene glycol, and the like; diamines such as ethylenediamine, propylenediamine, xylylenediamine, isophoronediamine, 4,4'-diaminodiphenylmethane, tolylenediamine, 4,4'-diaminodicyclohexylmethane, and the like. These can be used alone or combination of two or more.

The polyurethane resin can be produced by producing a urethane resin by reacting the polyol and the polyisocyanate without a solvent or in the presence of an organic solvent. Next, the urethane resin having an anionic group formed by neutralization with the basic compound or the like is made aqueous by mixing in an aqueous medium. During the mixing, if required, the chain extender is mixed and reacted.

The reaction of the polyol with the polyisocyanate is performed, for example, under a condition in which the equivalent ratio of isocyanate groups possessed by the polyisocyanate to hydroxyl groups possessed by the polyol is preferably within a range of 0.8 to 2.5 and more preferably within a range of 0.9 to 1.5.

The weight-average molecular weight of the polyurethane resin having an anionic group used in the present invention is preferably within a range of 5,000 to 500,000, more preferably 10,000 to 200,000, and particularly preferably 15,000 to 100,000.

The weight-average molecular weight is a value measured by GPC (gel permeation chromatography) method and is a value in terms of the molecular weight of polystyrene used as a standard material.

Also, the polyurethane resin used preferably has an acid value within a range of 2 to 200 (mgKOH/g) and preferably within a range of 2 to 100 (mgKOH/g) for improving good water dispersion stability or the like of the polyurethane resin.

The acid value is a value measured according to Japanese Industrial Standards "K0070:1992, Test methods for acid value, saponification value, ester value, iodine value hydroxyl value, and unsaponifiable matter of chemical products" and represents an amount (mg) of potassium hydroxide necessary for completely neutralizing 1 g of resin.

With the excessively low acid value, pigment dispersion and storage stability may be decreased, while with the excessively high acid value, the water resistance of a formed image may be degraded. In order to bring the acid value of the copolymer within the range, copolymerization may be performed by using the polyol having a carboxyl group so that the acid value falls within the range.

(Neutralizing Agent for Acryl Resin Having Anionic Group and Polyurethane Resin Having Anionic Group)

In the present invention, the acryl resin having an anionic group and the polyurethane resin having an anionic group are preferably used after neutralized with a basic compound. A known compound can be used as the basic compound, and examples thereof include hydroxides of alkali metals such as potassium, sodium, and the like; carbonates of alkali metals such as potassium, sodium, and the like; carbonates of alkaline-earth metals such as calcium, barium, and the like; inorganic basic compounds such as ammonium hydroxide and the like; organic basic compounds such as aminoalcohols, such as triethanolamine, N,N-dimethanolamine, N-aminoethylethanolamine, dimethylethanolamine, N—N-butyldiethanolamine, and the like; morpholines, such as morpholine, N-methylmorpholine, N-ethylmorpholine, and the like; piperazine such as N-(2-hydroxyethyl)piperazine, piperazine hexahydrate, and the like. Among these, alkali metal hydroxides represented by potassium hydroxide, sodium hydroxide, and lithium hydroxide are preferred in view of contribution to a decrease in viscosity of the aqueous pigment dispersion and discharge stability of an ink for aqueous ink jet recording, and potassium hydroxide is particularly preferred.

The neutralization rate of the anionic group with the basic compound is not particularly limited but is generally frequently within a range of 80% to 120%. In the present invention, the neutralization rate is a value indicating an amount by % of the basic compound added relative to the amount necessary for neutralizing all carboxyl groups in the anionic group-containing organic polymer compound and is calculated by a formula below.

$$\text{Neutralization rate (\%)} = [\{\text{mass (g) of basic compound} \times 56.11 \times 1000\} / \{\text{resin acid value (mgKOH/g)} \times \text{equivalent of basic compound} \times \text{resin amount (g)}\}] \times 100 \quad [\text{Math. 3}]$$

(Polysaccharide Derivative Having Anionic Group)

In the present invention, also, a polysaccharide derivative having an anionic group is preferably mixed with the aqueous pigment dispersion. The polysaccharide derivative having an anionic group is not particularly limited as long as it is a polyanionic polysaccharide. Examples thereof include natural polysaccharides such as hyaluronic acid, alginic acid, pectin, polygalacturonic acid, and the like; carboxyalkyl polysaccharides such as carboxymethylpullulan, carboxymethylchitin, carboxymethylchitosan, carboxymethylmannan, carboxymethyl starch, carboxymethyl dextran, carboxyethyl cellulose, carboxymethyl pullulan, and the like; oxidized polysaccharides such as oxidized cellulose, oxidized starch, and the like; and polysaccharides containing sulfuric acid groups such as chondroitin sulfate, dermatan sulfate, heparin and heparin sulfate, and the like. Among these, carboxymethyl cellulose and hyaluronic acid are preferred, and carboxymethyl cellulose is particularly preferred. The weight-average molecular weight of the polysaccharide as a raw material is not particularly limited but may be selected according to purpose because the viscosity tends to increase as the polymerization degree increases. It suffices to say that for example, the weight-average molecular weight is preferably 50,000 or more and 1,000,000 or less and more preferably 50,000 or more and 500,000 or less.

In the present invention, the polysaccharide derivative having an anionic group preferably forms a salt with cation. Examples of the cation which forms a salt with the polysaccharide derivative having an anionic group include, but are not particularly limited to, proton, and metal ions, specifically metal ions of sodium, potassium, lithium, calcium, magnesium, and the like; and organic cations such as organic ammonium and the like. Among these, carboxymethyl cellulose sodium salt and carboxymethyl cellulose ammonium salt are preferred because they can be easily obtained and the intended purpose can be easily obtained, and the carboxymethyl cellulose ammonium salt is particularly preferred because of the large viscosity decreasing effect. Of course, these polysaccharide derivatives having anionic groups can be used alone or in combination of two or more.

The degree of etherification (also referred to as a "degree of substitution" DS) and the degree of neutralization of the polysaccharide derivative having an anionic group, particularly carboxymethyl cellulose sodium salt or ammonium salt, used in the present invention are not particularly limited but are preferably adjusted so that the viscosity of a 1 mass % aqueous solution measured by a B-type viscometer at a rotor rotational speed of 60 rpm and 25° C. is 300 to 7000 mPa·s and more preferably 500 to 5000 mPa·s. With the viscosity exceeding 7000 mPa·s, uniform pigment dispersion tends to become difficult, and the viscosity of the resultant ink is excessively increased, thereby causing practical disadvantage. On the other hand, with the viscosity of less than 300 mPa·s, significant improvement in adhesion and rubfastness to a medium tends to be hardly recognized, thereby causing disadvantage.

The "degree of etherification" is a value indicating an average number of hydroxyl groups, to which carboxymethyl groups are ether-bonded, among the three hydroxyl groups contained in anhydrous glucose serving as a cellulose constitution unit in carboxymethyl cellulose. Therefore, the value is theoretically between 0 and 3.

The degree of etherification of carboxymethyl cellulose sodium salt or ammonium salt used in the present invention is preferably 0.5 to 2, more preferably 0.6 to 1.6, and still more preferably 0.8 to 1.4. This is because the degree of etherification of 0.8 or more causes salt resistance. The upper limit of the degree of etherification is theoretically 3, and the degree of etherification exceeding 2 causes difficulty in stable production, while the degree of etherification of less than 0.4 causes difficulty in dissolving in an aqueous medium and thus causes low practicality.

The degree of etherification can be determined, for example, according to a CMC Industry Association analytical method (ashing method). First, 1 g of carboxymethyl cellulose is weighed, placed in a magnetic crucible, and ashed at 600° C., and the sodium oxide produced by ashing is titrated with 0.05 mol/L sulfuric acid using phenolphthalein as an indicator. The degree of etherification can be determined by calculation according to a formula below in which a titer A (mL) per g of carboxymethyl cellulose is introduced.

$$\text{Degree of etherification}=(162\times A)/(10{,}000-80\times A) \qquad [\text{Math. 4}]$$

For a commercial product, a value described in a catalogue can be directly used.

The amount of the polysaccharide derivative having an anionic group mixed is not particularly limited and appropriately determined according to the purpose described above. For example, for the purpose of improving the color development (optical density) of the formed image and the rubfastness of the image, the amount of the polysaccharide derivative having an anionic group is preferably 5 parts by mass or less, more preferably 3 parts by mass or less, and most preferably 2 parts by mass or less relative to 1 part by mass of cellulose crystal.

The carboxymethyl cellulose sodium or carboxylmethyl cellulose ammonium used may be a commercial product. Examples thereof include Serogen series sold by DKS Co., Ltd., CMC Daicel series sold by Daicel FineChem Ltd., Sunrose F series sold by Nippon Paper Chemicals Co., Ltd., and the like. Also, DN series sold by Daicel FineChem Ltd. can be used as the carboxymethyl cellulose ammonium.

In the case of the aqueous pigment dispersion, particularly for ink jet, the content (mass basis) of the anionic group-containing organic polymer compound used in the present invention is preferably within a range of 0.1% to 10%, more preferably 0.3% to 5%, and still more preferably 0.5% to 2% relative to the total mass of ink. This is because with the content of less than 0.1%, rubfastness cannot be secured, while with the content exceeding 10%, printability is degraded due to an increase in viscosity or the like.

The anionic group-containing organic polymer compound is mainly used for the purpose of dispersing the pigment, but the compound has the function as a binder because it is a polymer.

Of course, a commercial product can also be used. Examples of the commercial product include Ajisper PB series of Ajinomoto Fine-Techno Co., Inc., DISPERBYK series and BYK series of BYK Co., Ltd., Efka series of BASF Corporation, and the like.

(Method for Producing Aqueous Pigment Dispersion)

A method for producing the aqueous pigment dispersion of the present invention is not particularly limited, and a known method can be used. That is, bio-nanofibers or the like can be mixed with desired timing regardless of before or after medialess dispersion described below. Examples of the method include (1) a method for preparing an aqueous pigment dispersion containing at least the pigment, the bio-nanofibers, etc. of the present invention and, if required, other additives added thereto, by medialess dispersion, (2) a method for preparing an aqueous pigment dispersion by forming a high-concentration pigment aqueous dispersion (pigment paste) in advance, and then diluting the prepared aqueous dispersion with an aqueous medium and, at the same time, adding the bio-nanofibers and, if required, other additives, and the like.

(1) Medialess Dispersion of Aqueous Pigment Dispersion

In the present invention, examples of the medialess dispersion include an ultrasonic dispersion method, and dispersion methods using a high-speed disc impeller, a colloid mill, a roll mill, a high-pressure homogenizer, a nanomizer, an altimizer, or the like. In view of productivity and contamination (mixing and contamination with foreign matter) due to wearing of a medium, the ultrasonic dispersion method is preferred. In the present invention, an example using the ultrasonic dispersion method is described in detail below.

It is preferred to mix and stirrer the pigment and the aqueous medium before ultrasonic dispersion in order to enhance flowability or prevent settling of the pigment, but this is not essential and a mixing-stirring apparatus is not particularly limited.

Also, from the viewpoint of securing flowability, the viscosity is preferably within a range of 0.1 to 100 mPa·s, more preferably 0.5 to 50 mPa·s, still more preferably 0.5 to 30 mPa·s, and most preferably 1.0 to 20 mPa·s. In this case, the pigment concentration is preferably 1% to 30% by mass, more preferably 1% to 25% by mass, still more preferably 3% to 20% by mass, and most preferably 5% to 20% by mass.

Ultrasonic irradiation conditions are not particularly limited, but the irradiation can be preferably performed at an output of 100 to 3000 W and a frequency of 15 to 40 kHz and more preferably at an output of 150 to 2000 W and a frequency of 15 to 30 kHz.

At the output and frequency within the respective ranges described above, a dispersion step by cavitation can be effectively performed, and the number of coarse particles in the aqueous pigment dispersion is decreased, thereby improving chroma (texture) of a color film obtained from the aqueous pigment dispersion and permitting smooth discharge (good discharge stability) in ink jet printing with aqueous ink using the aqueous pigment dispersion. Further, the output and frequency are very preferred for the reasons that the quality of a product is not decreased by settling of the pigment particles or the like, that erosion of an oscillating rod is significantly decreased to decrease the maintenance cost of the device used, and the like.

A time necessary and sufficient for actually uniformly dispersing pigment particles, bio-nanofibers, etc. in the aqueous pigment dispersion may be secured as the time of ultrasonic irradiation. An amount of electric power of 5 to 100 W/g is generally applied to the mass of the pigment contained in the dispersion. Of course, ultrasonic treatment may be performed for a longer time or stopped in a short time. The ultrasonic treatment time is preferably selected within a range in which no trouble occurs in performance such as the dispersed particle diameter, viscosity, image clearness, and the like according to the type of the pigment, and consideration is made to prevent a decrease in productivity with time.

After the ultrasonic irradiation, if required, the aqueous pigment dispersion can be further dispersed. Also, dispersion and ultrasonic irradiation can be repeatedly performed.

Any one of various known system devices can be used as a dispersing device which can be used in the dispersion step, and the dispersing device is not particularly limited. Examples of the device include media dispersion devices such as a sand mill, a beads mill, a pebble mill, a ball mill, a pearl mill, a basket mill, an attritor, a Dyno-mill, a bore mill, a visco-mill, a motor mill, a SC mill, a dry mill, a paint conditioner, and the like; and medialess dispersing devices such as a high-speed disc impeller, a colloid mill, a high-pressure homogenizer, a nanomizer, an altimizer, and the like. However, it should be noted that as described above, unnecessary physical damage may be caused on the pigment surfaces.

The temperature of the aqueous pigment dispersion subjected to ultrasonic irradiation is not particularly limited but the ultrasonic irradiation is preferably performed while the aqueous pigment dispersion is controlled to the freezing point to 70° C. This is because at a temperature equal to or lower than the freezing point, ultrasonic dispersion becomes impossible, while at a temperature 70° C. or higher, an uncertain condition such as an increase in pigment concentration occurs due to water evaporation or the like.

A known method of ice cooling, air cooling, water cooling, or the like can be generally used as a method for cooling the aqueous pigment dispersion during ultrasonic irradiation. Examples of the method include a method of flowing a refrigerant in a jacket of a vessel in which the aqueous pigment dispersion is placed, a method of immersing a vessel containing the aqueous pigment dispersion in a refrigerant, a method of spraying gas wind, a method of cooling by evaporation heat using a refrigerant, such as water, and wind, and the like.

For example, a method using, as a refrigerant, cooling water previously cooled to over 0° C. and 20° C. or lower and preferably over 0° C. and 10° C. or lower is a desired method because it is relatively economical and has an excellent cooling efficiency. In this case, the cooling water can be circulated by a circulating device, and at the same time, cooling can be performed with a cooling device. In this case, it is very preferred to cause freezing-point depression by adding, to the cooling water, ethylene glycol, diethylene glycol, or the like which decreases the freezing temperature, or adding sodium chloride or the like. As a result, even when a satisfactory cooling effect cannot be obtained by cooling water of over 0° C., the cooling water at a temperature lower than this can be produced, and thus ultrasonic irradiation can be performed while the aqueous pigment dispersion is maintained at a lower temperature with the temperature range described above. Even in the case of air cooling, instead of simply spraying wind at an ambient temperature, cold air previously cooled is preferably used.

In relation to cost, the ultrasonic irradiation is preferably performed by using as few devices as possible but, if required, a minimum number of devices can be connected in series or parallel for treatment.

The end point of ultrasonic irradiation may be determined by measuring the particle diameters of the pigment particles and the composite particles using a particle gauge or a commercial particle diameter measuring device, or by measuring physical properties such as viscosity, contact angle, reflected luminous intensity and hue of coating films prepared by various methods, etc. Also, the end point may be determined by direct observation with a microscope or the like.

(2) Method Passing Through High-Concentration Aqueous Pigment Dispersion (Pigment Paste)

A method for previously forming the pigment paste is not particularly limited, and a known dispersion method can be used.

Examples of the method for preparing the pigment paste include methods (i) to (iii) below.

(i) A method of adding a pigment to an aqueous medium containing a pigment dispersant and water and then dispersing the pigment in the aqueous medium by using a stirring/dispersion device to prepare a pigment paste.

(ii) A method of kneading a pigment and a pigment dispersant by using a kneader such as a two-roll, a mixer, or the like, and then adding the resultant kneaded product to an aqueous medium containing water to prepare a pigment paste by using a stirring/dispersion device.

(iii) A method of adding a pigment to a solution prepared by dissolving a pigment dispersant in an organic solvent having compatibility with water, such as methyl ethyl ketone, tetrahydrofuran, or the like, dispersing the pigment in the organic solution by using a stirring/dispersion device, next performing phase-inversion emulsification using an aqueous medium, and then distilling off the organic solvent to prepare a pigment paste.

Examples of the kneader include, but are not particularly limited to, a Henschel Mixer, a pressure kneader, a Banbury mixer, a planetary mixer, and the like.

Examples of the stirring/dispersion device include, but are not particularly limited to, an ultrasonic homogenizer, a high-pressure homogenizer, a paint shaker, a ball mill, a roll mill, a sand mill, a sand grinder, a Dyno-mill, Dispermat, a SC mill, a nanomizer, and the like. These devices may be used alone or in combination of two or more.

The amount of the pigment contained in the pigment paste is preferably 5% to 60% by mass and more preferably 10% to 50% by mass. When the amount of the pigment is less than 5% by mass, there is a tendency that coloring of the aqueous pigment dispersion and aqueous ink prepared by using the pigment paste is unsatisfactory, and a satisfactory image density cannot be obtained. Conversely, when the amount exceeds 60% by mass, the dispersion stability of the pigment in the pigment paste tends to be decreased.

Also, remaining coarse particles cause deterioration in various image characteristic, and thus the coarse particles are preferably properly removed by centrifugal separation or filtration treatment or the like after preparation of an ink.

After the dispersion step, post-treatment may be performed through a step of removing impurities by ion exchange treatment or ultra-treatment. Ionic substances (divalent metal ions and the like) such as cation and anion can be removed by ion exchange treatment, and impurity dissolved materials (residual materials of pigment synthesis, excessive components in the dispersion composition, resins not adsorbed on the organic pigment, mixed foreign matters, etc.) can be removed by ultra-treatment. The ion exchange treatment uses a known ion-exchange resin. The ultra-treatment uses a known ultrafiltration membrane which may be a usual type or two-times capacity-up type.

(Aqueous Ink for Ink Jet Recording)

If required, the aqueous pigment dispersion can be diluted with a water-soluble solvent with any desired timing, or a wetting agent (drying inhibitor), a penetrant, or another additive, that is, a known common additive, can be added. The addition permits use for various applications such as the automobile or construction coating field, the printing ink field of offset inks, gravure inks, flexo inks, silk screen inks, and the like, the field of inks for ink jet printing, and the like. After preparation of an ink, a centrifugal separation or ultrafiltration treatment step can be added for removing coarse particles. Herein, an aqueous ink for ink jet recording is described in detail.

(Wetting Agent)

The wetting agent is added for the purpose of preventing drying of the ink. The content of the wetting agent for the purpose of preventing drying in the ink is preferably 3% to 50% by mass.

The wetting agent used in the present invention is not particularly limited and preferably has miscibility with water and the effect of preventing clogging of a head of an ink jet printer. Examples thereof include glycerin, ethylene glycol, diethylene glycol, triethylene glycol, polyethylene glycol having a molecular weight of 2000 or less, propylene glycol, dipropylene glycol, tripropylene glycol, 1,3-propylene glycol, isopropylene glycol, isobutylene glycol, 1,4-butanediol, 1,3-butanediol, 1,5-pentanediol, 1,6-hexanediol, mesoerythritol, pentaerythritol, and the like. In particular, when propylene glycol or 1,3-butyl glycol is contained, safety and the excellent effect on ion drying properties and discharge performance can be achieved.

(Penetrant)

The penetrant is added for the purpose of improving the penetration into a recording medium and adjusting the dot diameter on a recording medium.

Examples of the penetrant include lower alcohols such as ethanol, isopropyl alcohol, and the like, alkyl alcohol ethylene oxide adducts such as ethylene glycol hexyl ether, diethylene glycol butyl ether, and the like, alkyl alcohol propylene oxide adducts such as propylene glycol propyl ether and the like.

The content of the penetrant in the ink is preferably 0.01% to 10% by mass.

(Surfactant)

The surfactant is added for adjusting ink characteristics such as surface tension and the like. Examples of the surfactant which can be added include, but are not particularly limited to, various anionic surfactants, nonionic surfactants, cationic surfactants, and amphoteric surfactants, and the like. Among these, the anionic surfactants and the nonionic surfactants are preferred.

Examples of the anionic surfactants include alkylbenzenesulfonic acid salts, alkylphenylsulfonic acid salts, alkylnaphthalenesulfonic acid salts, higher fatty acid salts, sulfuric acid ester salts of higher fatty acid esters, sulfonic acid salts of higher fatty acid esters, sulfuric acid ester salts and sulfonic acid salts of higher alcohol ethers, higher alkyl sulfosuccinic acid salts, polyoxyethylene alkyl ether carboxylic acid salts, polyoxyethylene alkyl ether sulfuric acid salts, alkylphosphoric acid salts, polyoxyethylene alkyl ether phosphoric acid salts, and the like. Specific examples thereof include dodecylbenzenesulfonic acid salts, isopropylnaphthalenesulfonic acid salts, monobutylphenylphenol monosulfonic acid salts, monobutylbiphenylsulfonic acid salts, dibutylphenylphenol disulfonic acid salts, and the like.

Examples of the nonionic surfactants include polyoxyethylene alkyl ethers, polyoxyethylene alkyl phenyl ethers, polyoxyethylene fatty acid esters, sorbitan fatty acid esters, polyoxyethylene sorbitan fatty acid esters, polyoxyethylene sorbitol fatty acid esters, glycerin fatty acid esters, polyoxyethylene glycerin fatty acid esters, polyglycerin fatty acid esters, sucrose fatty acid esters, polyoxyethylene alkylamines, polyoxyethylene fatty acid amides, fatty acid alkylolamides, alkylalkanol amides, acetylene glycol, acetylene glycol oxyethylene adduct, polyethylene glycol-polypropylene glycol block copolymers, and the like. Among these, preferred are polyoxyethylene nonyl phenyl ether, polyoxyethylene octyl phenyl ether, polyoxyethylene dodecyl phenyl ether, polyoxyethylene alkyl ethers, polyoxyethylene fatty acid esters, sorbitan fatty acid esters, polyoxyethylene sorbitan fatty acid esters, fatty acid alkylolamides, acetylene glycol, acetylene glycol oxyethylene adduct, and polyethylene glycol-propylene glycol block copolymers.

Other examples of the surfactant which can be used include silicone-based surfactants such as polysiloxane oxyethylene adduct; fluorine-based surfactants such as perfluoroalkylcarboxylic acid salts, perfluoroalkylsulfonic acid salts, and oxyethylene perfluoroalkyl ethers; bio-surfactants such as spiculisporic acid, rhamnolipid, and lysolecithin, and the like.

These surfactants can be used alone or as a mixture of two or more. When the surfactant is added, the adding amount is preferably within a range of 0.001% to 2% by mass, more preferably within a range of 0.001% to 1.5% by mass, and still more preferably within a range of 0.01% to 1% by mass relative to the total mass of ink. When the amount of the surfactant added is less than 0.001% by mass, there is a tendency that the effect of addition of the surfactant cannot be obtained, while when the amount of use exceeds 2% by mass, the problem of image blurring or the like easily occurs.

If required, an antiseptic agent, a viscosity adjuster, a pH adjuster, a chelating agent, a plasticizer, an antioxidant, an ultraviolet absorber, and the like can also be added.

(Recording Media)

The aqueous pigment dispersion of the present invention exhibits a high optical density and rubfastness, particularly, for plain paper. Of course, the aqueous pigment dispersion may be used for other absorbent recording media. Examples of a water absorbent recording medium include plain paper, (fine) coated paper, cloth, paper for exclusive use for ink jet, ink jet glossy paper, corrugated cardboard, wood, and the like.

EXAMPLES

The present invention is described in detail by giving examples below.

In addition, "parts" and "%" are "parts by mass" and "% by mass", respectively, unless otherwise specified.

<Bio-Nanofibers>

The bio-nanofibers shown in Table 1 were used.

TABLE 1

|  | Bio-nanofiber | | |
| --- | --- | --- | --- |
|  | Cellulose nanofiber | Cellulose nanofiber | Chitosan nanofiber |
| Product name | Celish KY100G | BiNFi-s 2% cellulose | BiNFi-s chitosan |
| Maker | Daicel FineChem Ltd. | Sugino Machine Limited | Sugino Machine Limited |

TABLE 1-continued

| | Bio-nanofiber | | |
|---|---|---|---|
| | Cellulose nanofiber | Cellulose nanofiber | Chitosan nanofiber |
| Product name (abbreviation) | CEL-KY | CEL-NF | CHI-NF |
| Aspect ratio | 160 | 270 | 430 |
| Mode diameter | 340 nm | 410 nm | 320 nm |
| 80% particle diameter/ 20% particle diameter | 5.7 | 5.3 | 5.3 |
| Specific surface area | — | 2059 cm$^2$/cm$^3$ | 1959 cm$^2$/cm$^3$ |
| Degree of crystallization | 58% | — | — |
| Amount of carboxyl group | Less than 0.1 mmol/g | Less than 0.1 mmol/g | — |

The average fiber diameter and aspect ratio are calculated from the results of SEM analysis. Specifically, a bio-nanofiber dispersion was cast on a wafer and observed with SEM, and fiber diameter and fiber length values of 20 or more fibers per image are read. This was performed for images of at least three regions which were not overlapped with each other, to obtain information of the fiber diameters and fiber lengths of at least 30 fibers. The average fiber diameter was calculated to two significant figures from the date of fiber diameters. The average fiber length was calculated from the date of fiber lengths, and the aspect ratio was calculated to two significant figures by aspect ratio=average fiber diameter/average fiber length.

The mode diameter and (80% particle diameter/20% particle diameter) were calculated to two significant figures from measurement values (volume basis) of 0.1% by mass of bio-nanofibers (solvent:water, temperature 25° C.) by using dynamic light scattering Nanotrac particle size analyzer UPA-150EX (manufactured by Nikkiso Co., Ltd.).

The specific surface area was calculated from particle size distribution values measured by a light scattering method using laser diffraction/scattering particle size distribution analyzer LA-960 (manufactured by Horiba, Ltd.). The measurement conditions are given below.

Measurement range: 0.01 μm to 3,000 μm, measurement method: wet method, basis of the particle diameter: volume, dispersion medium: pure water Sample refractive index: 1.56 to 0.00i, dispersion medium refractive index: 1.333 to 0.00i Dispersion treatment: built-in ultrasonic waves (30 W) 1 minute, circulation speed: 3, stirring speed: No Transmittance (semiconductor laser beam) and transmittance (LED light): 80% or more The degree of crystallization of cellulose was calculated according to a formula below from the diffraction intensity of a 002 plane at 2θ=22.6° and the diffraction intensity of an amorphous portion at 2θ=18.5° using the diffraction intensity at 2θ=4° to 32° as a baseline in a diffraction chart obtained by measurement of X-ray crystal diffraction (apparatus: RINT-2000 (manufactured by Rigaku Corporation)) at a measurement voltage of 40 kV, a measurement current of 50 mA, and a scan speed of 2°/min.

$$\chi_c = (I_{002c} - I_a)/I_{002c} \times 100 \quad [\text{Math. 5}]$$

(In the formula, $\chi_c$ represents the degree of crystallization of type I cellulose (%), $I_{002c}$ represents the 002 plane diffraction intensity at 2θ=22.6°, and $I_a$ represents the amorphous portion diffraction intensity at 2θ=18.5°.)

<Anionic Group-Containing Organic Polymer Compound>

The following compounds were used as the anionic group-containing organic polymer compound.
(Polysaccharide Derivative Having Anionic Group)

Commercial products were used.

CMC139O (manufactured by Daicel FineChem Ltd.): sodium carboxylmethyl cellulose (etherification degree, 1.0 to 1.5)

DN-800H (manufactured by Daicel FineChem Ltd.): ammonium carboxylmethyl cellulose DN-100L (manufactured by Daicel FineChem Ltd.): ammonium carboxylmethyl cellulose DN-10L (manufactured by Daicel FineChem Ltd.): ammonium carboxylmethyl cellulose
(Acrylic Resin Having Anionic Group)

Production Example 101: Solution (SA-1) of Acrylic Resin Having Anionic Group

A resin A having a monomer composition ratio (styrene/methacrylic acid/acrylic acid) of 77/13/10 (mass ratio), a weight-average molecular weight of 8800, an acid value of 150 mgKOH/g, and a glass transition temperature of 107° C. was produced. Then, 87.4 parts of ion exchange water and 22 g of a 34 mass % aqueous potassium hydroxide (KOH) solution were added to 50 parts of methyl ethyl ketone (abbreviated as "MEK" hereinafter) and 50 parts of the resin A, and the resultant mixture was sufficiently stirred to prepare a resin solution. Then, MEK was removed from the resin solution at a water bath temperature of 45° C. under a reduced pressure condition of 40 hPa, thereby preparing a solution (SA-1) of an acrylic resin having an anionic group with a resin sold content of 20%.
(Polyurethane Resin Having Anionic Group)

Production Example 102: Solution (UR-1) of Polyurethane Resin Having Anionic Group In a vessel replaced with nitrogen and provided with a thermometer, a nitrogen gas inlet tube, and a stirrer, 64.2 parts by mass of methyl ethyl ketone was added, and 18.4 parts by mass of 2,2-dimethylol propionic acid and 33.9 parts by mass of isophorone diisocyanate were mixed in the methyl ethyl ketone, followed by reaction at 80° C. for 4 hours. Four hours after, 38.2 parts by mass of methyl ethyl ketone was further supplied and the resultant mixture was cooled to 60° C. or lower, and 140.1 parts by mass of polyether polyol ("PTMG2000" polytetramethylene glycol manufactured by Mitsubishi Chemical Corporation, number-average molecular weight 1,000) and 0.01 parts by mass of dibutyltin dilaurate (hereinafter "DBTDL") were added and continuously reacted at 80° C.

After it was confirmed that the weight-average molecular weight of the reaction product reached a range of 20,000 to 50,000, the reaction is terminated by adding 1.3 parts by mass of methanol. Next, 41.6 parts by mass of methyl ethyl ketone was added to the reaction product to prepare an organic solvent solution of urethane resin.

The carboxyl groups possessed by the urethane resin were partially or entirely neutralized by adding 15.1 parts by mass of a 50 mass % aqueous potassium hydroxide solution to the urethane resin organic solvent solution. Next, 848.5 parts by mass of water was added and sufficiently stirred to produce a mixture containing the urethane resin, methyl ethyl ketone, and water, the urethane resin being dispersed or dissolved in the water.

Next, after aging of the mixture for about 2 hours, 0.07 parts by mass of Surfynol 440 (manufactured by Air Products and Chemicals, Inc., acetylene glycol ethylene oxide adduct, nonvolatile content 100% by mass) was added to the mixture and stirred for about 20 minutes to produce a mixture, which was then distilled under a reduced pressure condition of about 1 to 50 kPa.

After it was confirmed that 144 parts by mass of methyl ethyl ketone contained in the mixture was removed, 0.03 parts by mass of Surfynol 440 (manufactured by Air Products and Chemicals, Inc.) was added under reduced pressure, and then distillation under reduced pressure was continued. Next, after it was confirmed that 147 parts by mass of water contained in the mixture was removed, the reduced-pressure distillation was terminated.

Next, the nonvolatile content was adjusted by adding water to prepare a solution (UR-1) of a polyurethane resin having an anionic group with a resin sold content of 20% by mass.

<Pigment or the Like>

Commercial products below were used as the pigment or the like.

(Pigment)
960 (manufactured by Mitsubishi Chemical Corporation): carbon black
FASTOGEN Blue TGR (manufactured by DIC Corporation): C.
I. Pigment Blue 15:3
FASTOGEN Super Magenta RY (manufactured by DIC Corporation): C. I. Pigment Red 122
Fast Yellow 7413 (manufactured by Sanyo Color Works, Ltd.): C. I. Pigment Yellow 74

(Self-Dispersion Type Pigment Dispersion)

Pigment dispersions below were used as a self-dispersion type pigment dispersion.
CAB-O-JET 400 Black Colorant (United States Cabot Corporation)
CAB-O-JET 450C Cyan Colorant (United States Cabot Corporation)
CAB-O-JET 465M Magenta Colorant (United States Cabot Corporation)
CAB-O-JET 470Y Yellow Colorant (United States Cabot Corporation)
SENSIJET BLACK SDP100 (manufactured by United States Sensient Colors Inc.)

Production Example 1: Method for Producing Ultrasonic Dispersion (US) Aqueous Black Pigment Dispersion In a metal beaker, 20 parts of "#960" (carbon black manufactured by Mitsubishi Chemical Corporation), 20 parts of the solution (SA-1) of the anionic group-containing organic polymer compound, 5 parts of triethylene glycol, and water were added so that a total amount was 100 parts, and the resultant mixture was manually stirred. Then, ultrasonic dispersion was performed with an ultrasonic disperser (UP200St manufactured by Hielscher Company, operation frequency: 26 KHz, operation output: 160 W) for 10 minutes. After the ultrasonic dispersion treatment, 1.0 part (in terms of solid content) of bio-nanofibers "BiNFi-s 2% cellulose" (manufactured by Sugino Machine Limited, product name (abbreviation): CEL-NF), and pure water were added to 100 parts of the mixture so that a total amount was 250 parts, followed by manual stirring. Then, ultrasonic dispersion treatment was performed with an ultrasonic disperser (UP200St manufactured by Hielscher Company, operation frequency: 26 KHz, operation output: 160 W) for 25 minutes to produce an aqueous black pigment dispersion (corresponding to a pigment concentration of 8%).

Production Examples 2 to 4: Method for Producing Ultrasonic Dispersion (US) Aqueous Cyan Pigment Dispersion An aqueous cyan pigment dispersion was prepared by the same method as described above except that the type of the pigment used, the type of the anionic group-containing organic polymer compound used, and the type and amount of the bio-nanofibers used were changed to those described in each of examples.

Table 2 shows examples of the amount of ultrasonic dispersion (US) aqueous pigment dispersion added. When a self-dispersion type pigment was used as the pigment, bio-nanofibers or the like were added to a dispersion of the self-dispersion type pigment so as to prepare a predetermined composition.

TABLE 2

| | | Production of ultrasonic dispersion (US) aqueous pigment dispersion | | | |
|---|---|---|---|---|---|
| | | Production Example 1 (Black) | Production Example 2 (Cyan) | Production Example 3 (Magenta) | Production Example 4 (Yellow) |
| Pigment | Product name | #960 | FASTOGEN Blue TGR | FASTOGEN Super Magenta RY | Fast Yellow 7413 |
| | (parts) | 20 | 20 | 20 | 20 |

TABLE 2-continued

|  | Production of ultrasonic dispersion (US) aqueous pigment dispersion | | | |
|---|---|---|---|---|
|  | Production Example 1 (Black) | Production Example 2 (Cyan) | Production Example 3 (Magenta) | Production Example 4 (Yellow) |
| Solution of anionic group-containing Organic polymer compound (SA-1) (parts) | 20 | 30 | 30 | 20 |
| Triethylene glycol (parts) | 5 | 20 | 20 | 20 |
| Pure water | Balance | Balance | Balance | Balance |
| Sub-total (parts) | 100 | 100 | 100 | 100 |
| Bio-nanofiber Product name (abbreviation) | CEL-NF | CHI-NF | CHI-NF | CEL-NF |
| (parts) | 1.0 | 0.25 | 0.25 | 1.0 |
| Pure water | Balance | Balance | Balance | Balance |
| Total (parts) | 250 | 250 | 250 | 250 |

Preparation Example 1: Ultrasonic Dispersion (US) Aqueous Black Ink (Type 1)

First, 25 parts of pure water was added to 75 parts of the aqueous pigment dispersion (corresponding to a pigment concentration of 8%) produced in Production Example 1 and stirred by using a magnetic stirrer, and then the resultant mixture was filtered with a 1.2 μm membrane filter to produce an ultrasonic dispersion (US) aqueous black ink (Type 1) of Example 1. The physical properties and the like of the prepared ink are described in tables below.

Preparation Example 2: Ultrasonic Dispersion (US) Aqueous Black Ink (Type 2)

First, 50 parts of separately prepared vehicle (mixing ratio by mass: 2-pyrrolidone/triethylene glycol monobutyl ether/ glycerin/Surfynol 440/pure water=16/16/6/1/61) was added to 50 parts of the aqueous pigment dispersion (corresponding to a pigment concentration of 8%) produced in Production Example 1 and stirred by using a magnetic stirrer, and then the resultant mixture was filtered with a 1.2 μm membrane filter to produce an ultrasonic dispersion (US) aqueous black ink (Type 2) of Example 14. The physical properties and the like of the prepared ink are described in tables below.

An ultrasonic dispersion (US) aqueous cyan ink (Type 1) was prepared according to Preparation Example 1 or the like described above except that the type of the pigment used, the type of the anionic group-containing organic polymer compound used, and the type and amount of the bio-nanofibers used were changed to those described in each of examples. The physical properties and the like of the prepared ink are described in tables below.

Production Example 5: Method for Producing Kneading Method (PLM) Aqueous Black Pigment Dispersion In a planetary mixer (ACM04LVTJ-B, manufactured by Aicohsha Manufacturing Co., Ltd.), a mixture (50 parts of carbon black "#960" (manufactured by Mitsubishi Chemical Corporation), 10 parts of anionic group-containing organic polymer compound (resin A), 4.4 parts of a 34% aqueous potassium hydroxide solution, and 50 parts of triethylene glycol) was added, and the mixture was kneaded for 60 minutes at a jacket temperature of 60° C. and a stirring blade rotational speed of 25 rpm (number of revolutions: 80 rpm). Further, the whole of the resultant kneaded product was placed in a domestic mixer (Healthy Mix manufactured by Zojirushi Corporation), and 218.6 parts of pure water was added. After the mixer was hermetically sealed, the resultant mixture was stirred and dissolved for 20 minutes to produce 333 parts of an aqueous mixture MX. In a metal beaker, 53.33 parts of the aqueous mixture MX, 0.3 parts (in terms of solid content) of bio-nanofibers "BiNFi-s Chitosan" (manufactured by Sugino Machine Limited, product name (abbreviation): CHI-NF), and pure water were added so that a total amount was 100 parts, stirred and mixed by a homogenizer (Rotor/Stator manufactured by Silverson Machines Ltd.) at 8000 rpm for 11 minutes, and further diluted with pure water to prepare a kneading method (PLM) aqueous black pigment dispersion (corresponding to a pigment concentration of 8%).

Production Examples 6 to 8: Method for Producing Kneading Method (PLM) Aqueous Cyan Pigment Dispersion A kneading method (PLM) aqueous cyan pigment dispersion was prepared according to the production method described above except that the type of the pigment used, the type of the anionic group-containing organic polymer compound used, and the type and amount of the bio-nanofibers used were changed to those described in each of examples. Table 3 shows examples of the amount of kneading method (PLM) aqueous pigment dispersion added.

TABLE 3

| | | Production of kneading method (PLM) aqueous pigment dispersion | | | |
|---|---|---|---|---|---|
| | | Production Example 5 (Black) | Production Example 6 (Cyan) | Production Example 7 (Magenta) | Production Example 8 (Yellow) |
| Pigment | Product name | #960 | FASTOGEN Blue TGR | FASTOGEN Super Magenta RY | Fast Yellow 7413 |
| | (parts) | 50 | 50 | 50 | 50 |
| Anionic group-containing organic polymer compound | Resin A (parts) | 10 | 15 | 10 | 15 |
| Triethylene glycol (parts) | | 50 | 18.75 | 33.5 | 27.5 |
| 34% aqueous potassium hydroxide solution | | 4.4 | 6.6 | 4.4 | 6.6 |
| Pure water | | Balance | Balance | Balance | Balance |
| Aqueous mixture MX (parts) | | 333 | 333 | 333 | 333 |
| | | ↓ | ↓ | ↓ | ↓ |
| Aqueous mixture MX (parts) | | 53.33 | 53.33 | 53.33 | 53.33 |
| Bio-nanofiber | Product name (abbreviation) | CHI-NF | CHI-NF | CEL-KY | CHI-NF |
| | (parts) | 0.3 | 0.3 | 0.2 | 0.1 |
| Anionic group-containing organic polymer compound | Product name | — | DN-800H | — | — |
| | (parts) | — | 0.4 | — | — |
| Pure water | | Balance | Balance | Balance | Balance |
| Total (parts) | | 100 | 100 | 100 | 100 |

Preparation Example 3: Kneading Method (PLM) Aqueous Black Ink (Type 1)

First, 12.5 parts of pure water was added to 37.5 parts of the aqueous pigment dispersion (corresponding to a pigment concentration of 8%) produced in Production Example 5 and stirred by using a magnetic stirrer, and then the resultant mixture was filtered with a 1.2 μm membrane filter to produce a kneading method (PLM) aqueous black ink (Type 1) of Example 11. The physical properties and the like of the prepared ink are described in tables below.

Preparation Example 4: Kneading Method (PLM) Aqueous Black Ink (Type 2)

First, 25 parts of separately prepared vehicle (mixing ratio by mass: 2-pyrrolidone/triethylene glycol monobutyl ether/glycerin/Surfynol 440/pure water=16/16/6/1/61) was added to 25 parts of the aqueous pigment dispersion (corresponding to a pigment concentration of 8%) produced in Production Example 5 and stirred by using a magnetic stirrer, and then the resultant mixture was filtered with a 1.2 μm membrane filter to produce a kneading method (PLM) aqueous black ink (Type 2) of Example 47. The physical properties and the like of the prepared ink are described in tables below.

A kneading method (PLM) aqueous cyan ink (Type 1) or the like was prepared according to Preparation Example 3 or the like described above except that the type of the pigment used, the type of the anionic group-containing organic polymer compound used, and the type and amount of the bio-nanofibers used were changed to those described in each of examples. The physical properties and the like of the prepared ink are described in tables below.

<Measurement of Ink Physical Properties>
(pH Measurement Method)

Measurement (ink temperature of 25° C.) was performed by using MM-60R (manufactured by DKK-TOA Corporation).

(Viscosity Measurement Method)

Measurement (ink temperature of 25° C.) was performed by using Viscometer TV-20 (manufactured by Toki Sangyo Co., Ltd.).

(Measurement Method for Average Particle Diameter)

Measurement (ink temperature of 25° C.) was performed by using a dynamic light scattering Nanotrac particle size analyzer UPA-150EX (manufactured by Nikkiso Co., Ltd.). A volume-based (Mv) median diameter ($D_{50}$) was used as an average particle diameter.

<Evaluation of Printed Matter>
(Measurement of Optical Density (O. D.) Value)

The prepared ink was applied to PPC paper by using wire bar #3. After natural drying for 24 hours, the optical density (O. D.) of a coated product was measured. Measurement was performed by using "Gretag Macbeth Spectro Scan Transmission" (United States X-Rite Inc.), and an average value obtained by measurement of a total 9 points of a 3 by 3 matrix was used as the optical density (O. D.) value of the coated product.

In addition, with respect to improvement in the optical density, the optical density (O. D.) was calculated by a formula below and evaluated based on evaluation criteria below.

$$\text{(Optical density (O.D.) of sample ink)/(Optical density (O.D.) of reference ink)} \times 100(\%) \qquad \text{[Math. 6]}$$

(Determination Criteria)
G: Improvement of 3% or more in optical density
N: No improvement of 3% or more in optical density (Rubfastness Test)

The prepared ink was applied to glossy paper by using wire bar #3. After natural drying for 24 hours, the coated surface was rubbed with a 45R friction block on which PPC paper for friction was wound using a Gakushin-type rubbing tester (manufactured by Daiei Kagaku Seiki Mfg. Co., Ltd.) under the conditions including a load of 200 g and a number of times of friction of 10. Then, the state of the coated surface was visually observed by three panelists and evaluated according to criteria below.

G: Three panelists evaluated that no damage occurred

N: One or more panelists evaluated that damage occurred (Marker Resistance Test)

The prepared ink was applied to PPC paper by using wire bar #3. After natural drying for 24 hours, a boundary between an ink coated surface and an uncoated surface on the coated product was traced with a commercial fluorescent pen (Text Liner manufactured by FABER-CASTELL Company). A degree of dirt was visually observed and evaluated according to criteria below (three panelists).

G: By tracing with a fluorescent pen, no staining such as trailing or the like occurred or trailing occurred at a level with no practical problem.

N: By tracing with a fluorescent pen, significant trailing occurred and heavy staining was observed.

<Adaptability for Ink Jet (IJ)>

With respect to discharge properties and printability, an ink jet recording apparatus (ENVY4500 manufactured by Hewlett-Packard Company) having a thermal-type ink jet nozzle was filled with an aqueous ink in a constant-temperature constant-humidity chamber (room temperature 25° C., humidity 50%). Then, printing was continuously performed for 10 minutes on PPC paper as a recording material using a test print pattern (having a character part, a ruled-line part, and a solid part). After continuous printing for 10 minutes, the paper surface was visually observed by three panelists and omission or blurring of the print pattern was evaluated according to criteria below.

G: Neither omission nor blurring in the print pattern was recognized by the three panelists.

M: Omission or blurring in the print pattern was recognized by only one panelist (neither omission nor blurring in the print pattern was recognized by the other two panelists).

N: Omission or blurring in the print pattern was recognized by two or more panelists.

The ink compositions and the ink evaluation results are shown in tables below.

TABLE 4

| Aqueous black ink (Type1) | | | Production Example 1 US dispersion | Example 1 | Example 2 | Example 3 | Example 4 | Example 5 | Comparative Example 1 |
|---|---|---|---|---|---|---|---|---|---|
| Dispersion method (US: ultrasonic dispersion method PLM: kneading method) | | | US | US | US | US | US | US | US |
| Composition | Black pigment | Product name | #960 | #960 | #960 | #960 | #960 | #960 | #960 |
| | | (parts) (solid content) | 8 | 6 | 6 | 6 | 6 | 6 | 6 |
| | Anionic group-containing organic polymer compound | Name/Product name | SA-1 | SA-1 | SA-1 | SA-1 | SA-1 | SA-1 | SA-1 |
| | | (parts) (solid content) | 1.6 | 1.2 | 1.2 | 1.2 | 1.2 | 1.2 | 1.2 |
| | | Name/Product name | — | — | — | — | — | DN-800H | — |
| | | (parts) (solid content) | — | — | — | — | — | 0.15 | — |
| | Bio-nanofiber | Product name (abbreviation) | CEL-NF | CEL-NF | CEL-NF | CEL-KY | CEL-KY | CHI-NF | CHI-NF | — |
| | | (parts) | 0.4 | 0.3 | 0.075 | 0.6 | 0.225 | 0.6 | — |
| | Triethylene glycol (parts) | | 2 | 1.5 | 1.5 | 1.5 | 1.5 | 1.5 | 1.5 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 10.4 | 10.3 | 10.2 | 10.4 | 10.2 | 10.3 | 10.3 |
| | Average particle diameter D50/nm | | 85 | 78 | 79 | 78 | 81 | 83 | 81 |
| | Initial viscosity (mPa · s) | | — | 19.9 | 6.3 | 63.2 | 15.5 | 89.2 | 1.7 |
| | Optical density | Measured value | — | 1.43 | 1.38 | 1.44 | 1.42 | 1.44 | 1.34 |
| | | Improvement rate | — | 107% | 103% | 107% | 106% | 107% | (reference) |
| | | Determination | — | G | G | G | G | G | — |
| | Rubfastness | | — | G | G | G | G | G | N |

TABLE 5

| Aqueous black ink (Type1) | | | Example 6 | Example 7 | Example 8 | Example 9 | Example 10 | Comparative Example 2 |
|---|---|---|---|---|---|---|---|---|
| Dispersion method (US: ultrasonic dispersion method PLM: kneading method) | | | US | US | US | US | US | US |
| Composition | Black pigment | Product name | #960 | #960 | #960 | #960 | #960 | #960 |
| | | (parts) (solid content) | 6 | 6 | 6 | 6 | 6 | 6 |

TABLE 5-continued

| Aqueous black ink (Type1) | | | Example 6 | Example 7 | Example 8 | Example 9 | Example 10 | Comparative Example 2 |
|---|---|---|---|---|---|---|---|---|
| | Anionic group-containing organic polymer compound | Name/Product name | UR-1 | UR-1 | UR-1 | UR-1 | UR-1 | UR-1 |
| | | (parts) (solid content) | 1.2 | 1.2 | 1.2 | 1.2 | 1.2 | 1.2 |
| | | Name/Product name | — | CMC 1390 | DN-100L | — | CMC 1390 | — |
| | | (parts) (solid content) | — | 0.1 | 0.3 | — | 0.2 | — |
| | Bio-nanofiber | Product name (abbreviation) | CHI-NF | CHI-NF | CHI-NF | CEL-NF | CEL-KY | — |
| | | (parts) | 0.075 | 0.3 | 0.3 | 0.3 | 0.3 | — |
| | Triethylene glycol (parts) | | 1.5 | 1.5 | 1.5 | 1.5 | 1.5 | 1.5 |
| | Pure water | | Balance | Balance | Balance | Balance | Balance | Balance |
| | Total (parts) | | 100 | 100 | 100 | 100 | 100 | 100 |
| Physical properties | pH | | 9.4 | 9.5 | 9.5 | 8.9 | 8.9 | 8.9 |
| | Average particle diameter D50/nm | | 124 | 123 | 123 | 110 | 122 | 125 |
| | Initial viscosity (mPa · s) | | 8.2 | 18.2 | 11.6 | 29.5 | 9.8 | 2.3 |
| | Optical density | Measured value | 1.38 | 1.42 | 1.42 | 1.41 | 1.43 | 1.33 |
| | | Improvement rate | 103% | 107% | 107% | 106% | 107% | (reference) |
| | | Determination | G | G | G | G | G | — |
| | Rubfastness | | G | G | G | G | G | N |

TABLE 6

| Aqueous black ink (Type1) | | | Production Example 5 PLM Dispersion | Example 11 | Example 12 | Example 13 | Comparative Example 3 |
|---|---|---|---|---|---|---|---|
| Dispersion method (US: ultrasonic dispersion method PLM: kneading method) | | | PLM | PLM | PLM | PLM | PLM |
| Composition | Black pigment | Product name | #960 | #960 | #960 | #960 | #960 |
| | | (parts) (solid content) | 8 | 6 | 6 | 6 | 6 |
| | Anionic group-containing organic polymer compound | Name/Product name | Resin A | Resin A | Resin A | Resin A | Resin A |
| | | (parts) (solid content) | 1.6 | 1.2 | 1.2 | 1.2 | 1.2 |
| | | Name/Product name | — | — | DN-800H | — | — |
| | | (parts) (solid content) | — | — | 0.15 | — | — |
| | Bio-nanofiber | Product name (abbreviation) | CHI-NF | CHI-NF | CHI-NF | CEL-KY | — |
| | | (parts) | 0.3 | 0.225 | 0.225 | 0.6 | — |
| | Triethylene glycol (parts) | | 8 | 6 | 6 | 6 | 6 |
| | Pure water | | Balance | Balance | Balance | Balance | Balance |
| | Total (parts) | | 100 | 100 | 100 | 100 | 100 |
| Physical properties | pH | | 9.8 | 9.6 | 10.0 | 10.1 | 10.1 |
| | Average particle diameter D50/nm | | 108 | 104 | 106 | 111 | 116 |
| | Initial viscosity (mPa · s) | | — | 10.2 | 10.2 | 52.2 | 1.9 |
| | Optical density | Measured value | — | 1.27 | 1.29 | 1.34 | 1.19 |
| | | Improvement rate | — | 107% | 108% | 113% | (reference) |
| | | Determination | — | G | G | G | — |
| | Rubfastness | | — | G | G | G | N |

TABLE 7

| Aqueous black ink (Type2) | | | Production Example 1 US dispersion | Example 14 | Example 15 | Example 16 | Example 17 | Example 18 |
|---|---|---|---|---|---|---|---|---|
| | Dispersion method (US: ultrasonic dispersion method PLM: kneading method) | | US | US | US | US | US | US |
| Composition | Black pigment | Product name | #960 | #960 | #960 | #960 | #960 | #960 |
| | | (parts) (solid content) | 8 | 4 | 4 | 4 | 4 | 4 |
| | Anionic group-containing organic polymer compound | Name/Product name | SA-1 | SA-1 | SA-1 | SA-1 | SA-1 | SA-1 |
| | | (parts) (solid content) | 1.6 | 0.8 | 0.8 | 0.8 | 0.8 | 0.8 |
| | | Name/Product name | — | — | — | — | — | — |
| | | (parts) (solid content) | — | — | — | — | — | — |
| | Bio-nanofiber | Product name (abbreviation) | CEL-NF | CEL-NF | CEL-KY | CEL-KY | CEL-KY | CEL-KY |
| | | (parts) | 0.4 | 0.2 | 0.2 | 0.1 | 0.05 | 0.3 |
| | 2-pyrrolidone (parts) | | — | 8 | 8 | 8 | 8 | 8 |
| | Triethylene glycol | | — | 8 | 8 | 8 | 8 | 8 |
| | Glycerin (parts) | | — | 3 | 3 | 3 | 3 | 3 |
| | Triethylene glycol (parts) | | 2 | 1 | 1 | 1 | 1 | 1 |
| | Surfynol 440(parts) | | — | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 10.4 | 9.3 | 9.3 | 9.3 | 9.2 | 9.3 |
| | Average particle diameter D50/nm | | 85 | 81 | 82 | 82 | 83 | 81 |
| | Initial viscosity (mPa · s) | | — | 3.7 | 16.8 | 8.8 | 4.5 | 28.1 |
| | Optical density | Measured value | — | 1.11 | 1.07 | 1.05 | 1.04 | 1.11 |
| | | Improvement rate | — | 112% | 108% | 106% | 105% | 112% |
| | | Determination | — | G | G | G | G | G |
| | Rubfastness | | — | G | G | G | G | G |
| | Maker resistance | | — | G | G | G | G | G |
| | Ink jet adaptability | | — | G | G | G | G | M |

| Aqueous black ink (Type2) | | | Example 19 | Example 20 | Example 21 | Example 22 | Example 23 | Example 24 |
|---|---|---|---|---|---|---|---|---|
| | Dispersion method (US: ultrasonic dispersion method PLM: kneading method) | | US | US | US | US | US | US |
| Composition | Black pigment | Product name | #960 | #960 | #960 | #960 | #960 | #960 |
| | | (parts) (solid content) | 4 | 4 | 4 | 4 | 4 | 4 |
| | Anionic group-containing organic polymer compound | Name/Product name | SA-1 | SA-1 | SA-1 | SA-1 | SA-1 | SA-1 |
| | | (parts) (solid content) | 0.8 | 0.8 | 0.8 | 0.8 | 0.8 | 0.8 |
| | | Name/Product name | — | CMC 1390 | DN-800H | CMC 1240 | — | — |
| | | (parts) (solid content) | — | 0.2 | 0.2 | 0.2 | — | — |
| | Bio-nanofiber | Product name (abbreviation) | CEL-KY | CEL-KY | CEL-KY | CEL-KY | CHI-NF | CHI-NF |
| | | (parts) | 0.4 | 0.2 | 0.2 | 0.2 | 0.05 | 0.15 |
| | 2-pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 1 | 1 | 1 | 1 | 1 | 1 |
| | Surfynol 440(parts) | | 0.5 | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 9.4 | 9.2 | 9.1 | 9.3 | 9.2 | 9.2 |
| | Average particle diameter D50/nm | | 81 | 84 | 83 | 85 | 88 | 88 |
| | Initial viscosity (mPa · s) | | 41.3 | 13.7 | 12.0 | 9.6 | 4.8 | 20.1 |
| | Optical density | Measured value | 1.15 | 1.08 | 1.07 | 1.06 | 1.07 | 1.12 |
| | | Improvement rate | 116% | 109% | 108% | 107% | 108% | 113% |
| | | Determination | G | G | G | G | G | G |
| | Rubfastness | | G | G | G | G | G | G |
| | Maker resistance | | G | G | G | G | G | G |
| | Ink jet adaptability | | M | G | G | G | G | M |

TABLE 8

| Aqueous black ink (Type2) | | | Example 25 | Example 26 | Example 27 | Example 28 | Example 29 | Example 30 | Example 31 |
|---|---|---|---|---|---|---|---|---|---|
| Dispersion method (US: ultrasonic dispersion method PLM: kneading method) | | | US | US | US | US | US | US | US |
| Composition | Black pigment | Product name | #960 | #960 | #960 | #960 | #960 | #960 | #960 |
| | | (parts) (solid content) | 4 | 4 | 4 | 4 | 4 | 4 | 4 |
| | Anionic group-containing organic polymer compound | Name/Product name | SA-1 | SA-1 | SA-1 | SA-1 | SA-1 | SA-1 | SA-1 |
| | | (parts) (solid content) | 0.8 | 0.8 | 0.8 | 0.8 | 0.8 | 0.8 | 0.8 |
| | | Name/Product name | DN-800H | DN-100L | DN-10L | CMC 1390 | DN-100L | DN-10L | DN-800H |
| | | (parts) (solid content) | 0.15 | 0.15 | 0.15 | 0.1 | 0.2 | 0.1 | 0.3 |
| | Bio-nanofiber | Product name (abbreviation) | CHI-NF | CHI-NF | CHI-NF | CHI-NF | CHI-NF | CHI-NF | CHI-NF |
| | | (parts) | 0.15 | 0.15 | 0.15 | 0.1 | 0.1 | 0.2 | 0.15 |
| | 2-Pyrrolidone (parts) | | 8 | 8 | 8 | 8 | 8 | 8 | 8 |
| | Triethylene glycol | | 8 | 8 | 8 | 8 | 8 | 8 | 8 |
| | Glycerin (parts) | | 3 | 3 | 3 | 3 | 3 | 3 | 3 |
| | Triethylene glycol (parts) | | 1 | 1 | 1 | 1 | 1 | 1 | 1 |
| | Surfynol 440 (parts) | | 0.5 | 0.5 | 0.5 | 0.5 | 0.5 | 0.5 | 0.5 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 9.4 | 9.5 | 9.4 | 9.2 | 9.2 | 9.2 | 7.8 |
| | Average particle diameter D50/nm | | 89 | 86 | 85 | 88 | 91 | 88 | 132 |
| | Initial viscosity (mPa · s) | | 5.9 | 5.5 | 4.6 | 8.4 | 5.7 | 6.9 | 4.8 |
| | Optical density | Measured value | 1.09 | 1.07 | 1.04 | 1.10 | 1.09 | 1.10 | 1.07 |
| | | Improvement rate | 110% | 108% | 105% | 111% | 110% | 111% | 108% |
| | | Determination | G | G | G | G | G | G | G |
| | Rubfastness | | G | G | G | G | G | G | G |
| | Marker resistance | | G | G | G | G | G | G | G |
| | Ink jet adaptability | | G | G | G | G | G | G | G |

| Aqueous black ink (Type2) | | | Example 32 | Example 33 | Comparative Example 4 | Comparative Example 5 | Comparative Example 6 |
|---|---|---|---|---|---|---|---|
| Dispersion method (US: ultrasonic dispersion method PLM: kneading method) | | | US | US | US | US | US |
| Composition | Black pigment | Product name | #960 | #960 | #960 | #960 | #960 |
| | | (parts) (solid content) | 4 | 4 | 4 | 4 | 4 |
| | Anionic group-containing organic polymer compound | Name/Product name | SA-1 | SA-1 | SA-1 | SA-1 | SA-1 |
| | | (parts) (solid content) | 0.8 | 0.8 | 0.8 | 0.8 | 0.8 |
| | | Name/Product name | DN-800H | DN-800H | CMC 1390 | DN-800H | — |
| | | (parts) (solid content) | 0.15 | 0.15 | 0.2 | 0.2 | — |
| | Bio-nanofiber | Product name (abbreviation) | CHI-NF | CHI-NF | — | — | — |
| | | (parts) | 0.3 | 0.4 | — | — | — |
| | 2-Pyrrolidone (parts) | | 8 | 8 | 8 | 8 | 8 |
| | Triethylene glycol | | 8 | 8 | 8 | 8 | 8 |
| | Glycerin (parts) | | 3 | 3 | 3 | 3 | 3 |
| | Triethylene glycol (parts) | | 1 | 1 | 1 | 1 | 1 |
| | Surfynol 440 (parts) | | 0.5 | 0.5 | 0.5 | 0.5 | 0.5 |
| | Pure water | | Balance | Balance | Balance | Balance | Balance |
| | Total (parts) | | 100 | 100 | 100 | 100 | 100 |
| Physical properties | pH | | 9.4 | 9.3 | 9.4 | 9.2 | 9.3 |
| | Average particle diameter D50/nm | | 89 | 90 | 88 | 97 | 88 |
| | Initial viscosity (mPa · s) | | 14.2 | 18.8 | 6.7 | 5.1 | 2.3 |
| | Optical density | Measured value | 1.14 | 1.16 | 1.02 | 1.01 | 0.99 |
| | | Improvement rate | 115% | 117% | 103% | 102% | (Reference) |
| | | Determination | G | G | G | N | — |
| | Rubfastness | | G | G | N | N | N |
| | Marker resistance | | G | G | N | N | N |
| | Ink jet adaptability | | G | M | G | G | G |

TABLE 9

| Aqueous black ink (Type2) | | | Example 34 | Example 35 | Example 36 | Example 37 | Example 38 | Example 39 |
|---|---|---|---|---|---|---|---|---|
| Dispersion method (US: ultrasonic dispersion method PLM: kneading method) | | | US | US | US | US | US | US |
| Composition | Black pigment | Product name | #960 | #960 | #960 | #960 | #960 | #960 |
| | | (parts) (solid content) | 4 | 4 | 4 | 4 | 4 | 4 |
| | Anionic group-containing organic polymer compound | Name/Product name | UR-1 | UR-1 | UR-1 | UR-1 | UR-1 | UR-1 |
| | | (parts) (solid content) | 0.8 | 0.8 | 0.8 | 0.8 | 0.8 | 0.8 |
| | | Name/Product name | — | — | — | — | CMC 1390 | — |
| | | (parts) (solid content) | — | — | — | — | 0.2 | — |
| | Bio-nanofiber | Product name (abbreviation) | CEL-KY | CEL-KY | CEL-KY | CEL-NF | CEL-KY | CHI-NF |
| | | (parts) | 0.2 | 0.1 | 0.05 | 0.2 | 0.2 | 0.05 |
| | 2-Pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 1 | 1 | 1 | 1 | 1 | 1 |
| | Surfynol 440 (parts) | | 0.5 | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 7.5 | 7.4 | 7.5 | 7.4 | 7.4 | 7.8 |
| | Average particle diameter D50/nm | | 119 | 124 | 128 | 117 | 130 | 132 |
| | Initial viscosity (mPa · s) | | 17.3 | 10.2 | 5.1 | 4.0 | 3.6 | 4.1 |
| | Optical density | Measured value | 1.03 | 1.01 | 0.99 | 1.04 | 1.05 | 1.00 |
| | | Improvement rate | 110% | 107% | 105% | 111% | 112% | 106% |
| | | Determination | G | G | G | G | G | G |
| | Rubfastness | | G | G | G | G | G | G |
| | Maker resistance | | G | G | G | G | G | G |
| | Ink jet adaptability | | G | G | G | G | G | G |

| Aqueous black ink (Type2) | | | Example 40 | Example 41 | Example 42 | Example 43 | Example 44 | Example 45 |
|---|---|---|---|---|---|---|---|---|
| Dispersion method (US: ultrasonic dispersion method PLM: kneading method) | | | US | US | US | US | US | US |
| Composition | Black pigment | Product name | #960 | #960 | #960 | #960 | #960 | #960 |
| | | (parts) (solid content) | 4 | 4 | 4 | 4 | 4 | 4 |
| | Anionic group-containing organic polymer compound | Name/Product name | UR-1 | UR-1 | UR-1 | UR-1 | UR-1 | UR-1 |
| | | (parts) (solid content) | 0.8 | 0.8 | 0.8 | 0.8 | 0.8 | 0.8 |
| | | Name/Product name | — | DN-800H | DN-100L | DN-10L | CMC 1390 | DN-100L |
| | | (parts) (solid content) | — | 0.15 | 0.15 | 0.15 | 0.1 | 0.3 |
| | Bio-nanofiber | Product name (abbreviation) | CHI-NF | CHI-NF | CHI-NF | CHI-NF | CHI-NF | CHI-NF |
| | | (parts) | 0.15 | 0.15 | 0.15 | 0.15 | 0.2 | 0.2 |
| | 2-Pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 1 | 1 | 1 | 1 | 1 | 1 |
| | Surfynol 440 (parts) | | 0.5 | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 7.8 | 7.9 | 7.8 | 7.9 | 7.9 | 7.9 |
| | Average particle diameter D50/nm | | 132 | 132 | 133 | 130 | 131 | 131 |
| | Initial viscosity (mPa · s) | | 20.2 | 5.9 | 5.6 | 4.7 | 15.4 | 9.3 |
| | Optical density | Measured value | 1.03 | 1.06 | 1.07 | 1.02 | 1.08 | 1.08 |
| | | Improvement rate | 110% | 113% | 114% | 109% | 115% | 115% |
| | | Determination | G | G | G | G | G | G |
| | Rubfastness | | G | G | G | G | G | G |
| | Maker resistance | | G | G | G | G | G | G |
| | Ink jet adaptability | | M | G | G | G | M | G |

TABLE 10

| Aqueous black ink (Type2) | | Example 46 | Comparative Example 7 | Comparative Example 8 | Production Example 5 PLM Dispersion | Example 47 | Example 48 |
|---|---|---|---|---|---|---|---|
| Dispersion method (US: ultrasonic dispersion method PLM: kneading method) | | US | US | US | PLM | PLM | PLM |
| Composition | Black pigment Product name | #960 | #960 | #960 | #960 | #960 | #960 |
| | (parts) (solid content) | 4 | 4 | 4 | 8 | 4 | 4 |
| | Anionic group- Name/Product name | UR-1 | UR-1 | UR-1 | Resin A | Resin A | Resin A |
| | (parts) (solid content) | 0.8 | 0.8 | 0.8 | 1.6 | 0.8 | 0.8 |
| | containing organic Name/Product name | DN-800H | CMC 1390 | — | — | — | — |
| | polymer compound (parts) (solid content) | 0.15 | 0.2 | — | — | — | — |
| | Bio-nanofiber Product name-abbreviation | CHI-NF | — | — | CHI-NF | CHI-NF | CEL-KY |
| | (parts) | 0.4 | — | — | 0.3 | 0.15 | 0.2 |
| | 2-Pyrrolidone (parts) | 8 | 8 | 8 | — | 8 | 8 |
| | Triethylene glycol | 8 | 8 | 8 | — | 8 | 8 |
| | Glycerin (parts) | 3 | 3 | 3 | — | 3 | 3 |
| | Triethylene glycol (parts) | 1 | 1 | 1 | 8 | 4 | 4 |
| | Surfynol 440(parts) | 0.5 | 0.5 | 0.5 | — | 0.5 | 0.5 |
| | Pure water | Balance | Balance | Balance | Balance | Balance | Balance |
| | Total (parts) | 100 | 100 | 100 | 100 | 100 | 100 |
| Physical properties | pH | 8.0 | 7.3 | 7.4 | 9.8 | 9.0 | 9.5 |
| | Average particle diameter D50/nm | 138 | 91 | 133 | 108 | 87 | 96 |
| | Initial viscosity (mPa · s) | 18.5 | 4.2 | 14.5 | — | 20.2 | 7.3 |
| Optical density | Measured value | 1.09 | 0.96 | 0.94 | — | 1.05 | 1.01 |
| | Improvement rate | 116% | 102% | (Reference) | — | 112% | 107% |
| | Determination | G | N | — | — | G | G |
| | Rubfastness | G | N | N | — | G | G |
| | Maker resistance | G | N | N | — | G | G |
| | Ink jet adaptability | M | G | G | — | M | G |

| Aqueous black ink (Type2) | | Example 49 | Example 50 | Example 51 | Example 52 | Example 53 | Example 54 |
|---|---|---|---|---|---|---|---|
| Dispersion method (US: ultrasonic dispersion method PLM: kneading method) | | PLM | PLM | PLM | PLM | PLM | PLM |
| Composition | Black pigment Product name | #960 | #960 | #960 | #960 | #960 | #960 |
| | (parts) (solid content) | 4 | 4 | 4 | 4 | 4 | 4 |
| | Anionic group- Name/Product name | Resin A | Resin A | Resin A | Resin A | Resin A | Resin A |
| | (parts) (solid content) | 0.8 | 0.8 | 0.8 | 0.8 | 0.8 | 0.8 |
| | containing organic Name/Product name | — | — | — | — | — | CMC 1390 |
| | polymer compound (parts) (solid content) | — | — | — | — | — | 0.2 |
| | Bio-nanofiber Product name-abbreviation | CEL-KY | CEL-KY | CEL-KY | CEL-KY | CEL-NF | CEL-KY |
| | (parts) | 0.1 | 0.05 | 0.3 | 0.4 | 0.2 | 0.2 |
| | 2-Pyrrolidone (parts) | 8 | 8 | 8 | 8 | 8 | 8 |
| | Triethylene glycol | 8 | 8 | 8 | 8 | 8 | 8 |
| | Glycerin (parts) | 3 | 3 | 3 | 3 | 3 | 3 |
| | Triethylene glycol (parts) | 4 | 4 | 4 | 4 | 4 | 4 |
| | Surfynol 440(parts) | 0.5 | 0.5 | 0.5 | 0.5 | 0.5 | 0.5 |
| | Pure water | Balance | Balance | Balance | Balance | Balance | Balance |
| | Total (parts) | 100 | 100 | 100 | 100 | 100 | 100 |
| Physical properties | pH | 9.5 | 9.4 | 9.4 | 9.5 | 9.5 | 9.4 |
| | Average particle diameter D50/nm | 96 | 97 | 95 | 93 | 92 | 94 |
| | Initial viscosity (mPa · s) | 4.8 | 3.2 | 16.8 | 29.3 | 4.5 | 6.9 |
| Optical density | Measured value | 1.00 | 0.99 | 1.04 | 1.10 | 1.05 | 1.01 |
| | Improvement rate | 106% | 105% | 111% | 117% | 112% | 107% |
| | Determination | G | G | G | G | G | G |
| | Rubfastness | G | G | G | G | G | G |
| | Maker resistance | G | G | G | G | G | G |
| | Ink jet adaptability | G | G | M | M | G | G |

TABLE 11

| Aqueous black ink (Type2) | | | Example 55 | Example 56 | Example 57 | Example 58 | Example 59 |
|---|---|---|---|---|---|---|---|
| Dispersion method (US: ultrasonic dispersion method PLM: kneading method) | | | PLM | PLM | PLM | PLM | PLM |
| Composition | Black pigment | Product name | #960 | #960 | #960 | #960 | #960 |
| | | (parts) (solid content) | 4 | 4 | 4 | 4 | 4 |
| | Anionic group-containing organic polymer compound | Name/Product name | Resin A | Resin A | Resin A | Resin A | Resin A |
| | | (parts) (solid content) | 0.8 | 0.8 | 0.8 | 0.8 | 0.8 |
| | | Name/Product name | DN-800H | DN-800H | DN-100L | DN-10L | CMC 1390 |
| | | (parts) (solid content) | 0.2 | 0.15 | 0.15 | 0.15 | 0.1 |
| | Bio-nanofiber | Product name-abbreviation | CEL-KY | CHI-NF | CHI-NF | CHI-NF | CHI-NF |
| | | (parts) | 0.2 | 0.15 | 0.15 | 0.15 | 0.15 |
| | 2-Pyrrolidone (parts) | | 8 | 8 | 8 | 8 | 8 |
| | Triethylene glycol | | 8 | 8 | 8 | 8 | 8 |
| | Glycerin (parts) | | 3 | 3 | 3 | 3 | 3 |
| | Triethylene glycol (parts) | | 4 | 4 | 4 | 4 | 4 |
| | Surfynol 440(parts) | | 0.5 | 0.5 | 0.5 | 0.5 | 0.5 |
| | Pure water | | Balance | Balance | Balance | Balance | Balance |
| | Total (parts) | | 100 | 100 | 100 | 100 | 100 |
| Physical properties | pH | | 9.3 | 9.4 | 9.4 | 9.5 | 9.4 |
| | Average particle diameter D50/nm | | 95 | 89 | 89 | 87 | 85 |
| | Initial viscosity (mPa · s) | | 5.9 | 6.0 | 5.6 | 4.7 | 15.5 |
| | Optical density | Measured value | 1.00 | 1.08 | 1.02 | 1.01 | 1.05 |
| | | Improvement rate | 106% | 115% | 109% | 107% | 112% |
| | | Determination | G | G | G | G | G |
| | Rubfastness | | G | G | G | G | G |
| | Maker resistance | | G | G | G | G | G |
| | Ink jet adaptability | | G | G | G | G | M |

| Aqueous black ink (Type2) | | | Example 60 | Comparative Example 9 | Comparative Example 10 | Comparative Example 11 |
|---|---|---|---|---|---|---|
| Dispersion method (US: ultrasonic dispersion method PLM: kneading method) | | | PLM | PLM | PLM | PLM |
| Composition | Black pigment | Product name | #960 | #960 | #960 | #960 |
| | | (parts) (solid content) | 4 | 4 | 4 | 4 |
| | Anionic group-containing organic polymer compound | Name/Product name | Resin A | Resin A | Resin A | Resin A |
| | | (parts) (solid content) | 0.8 | 0.8 | 0.8 | 0.8 |
| | | Name/Product name | DN-800H | CMC 1390 | DN-800H | — |
| | | (parts) (solid content) | 0.15 | 0.2 | 0.2 | — |
| | Bio-nanofiber | Product name-abbreviation | CHI-NF | — | — | — |
| | | (parts) | 0.4 | — | — | — |
| | 2-Pyrrolidone (parts) | | 8 | 8 | 8 | 8 |
| | Triethylene glycol | | 8 | 8 | 8 | 8 |
| | Glycerin (parts) | | 3 | 3 | 3 | 3 |
| | Triethylene glycol (parts) | | 4 | 4 | 4 | 4 |
| | Surfynol 440(parts) | | 0.5 | 0.5 | 0.5 | 0.5 |
| | Pure water | | Balance | Balance | Balance | Balance |
| | Total (parts) | | 100 | 100 | 100 | 100 |
| Physical properties | pH | | 9.5 | 9.6 | 9.4 | 9.5 |
| | Average particle diameter D50/nm | | 97 | 97 | 103 | 97 |
| | Initial viscosity (mPa · s) | | 18.6 | 4.2 | 3.9 | 2.8 |
| | Optical density | Measured value | 1.15 | 0.97 | 0.97 | 0.94 |
| | | Improvement rate | 122% | 103% | 103% | (Reference) |
| | | Determination | G | G | G | — |
| | Rubfastness | | G | N | N | N |
| | Maker resistance | | G | N | N | N |
| | Ink jet adaptability | | M | G | G | G |

TABLE 12

| Aqueous black ink (Type2) | Example 61 | Example 62 | Example 63 | Example 64 | Comparative Example 12 | Comparative Example 13 |
|---|---|---|---|---|---|---|
| Dispersion method (US: ultrasonic dispersion method PLM: kneading method) | Self-dispersion type | Self-dispersion type | Self-dispersion type | Self-dispersion type | Self-dispersion type | Self-dispersion type |

TABLE 12-continued

| Composition | Black pigment | Product name | CAB-O-JET 400 | CAB-O-JET 400 | CAB-O-JET 400 | CAB-O-JET 400 | CAB-O-JET 400 | CAB-O-JET 400 |
|---|---|---|---|---|---|---|---|---|
| | | (parts) (solid content) | 4 | 4 | 4 | 4 | 4 | 4 |
| | Anionic group-containing organic polymer compound | Name/Product name | — | — | — | — | — | — |
| | | (parts) (solid content) | — | — | — | — | — | — |
| | | Name/Product name | CMC 1390 | DN-800H | CMC 1390 | DN-800H | — | DN-800H |
| | | (parts) (solid content) | 0.2 | 0.2 | 0.2 | 0.2 | — | 0.2 |
| | Bio-nanofiber | Product name-abbreviation | CEL-NF | CEL-NF | CEL-KY | CEL-KY | CEL-NF | — |
| | | (parts) | 0.2 | 0.2 | 0.2 | 0.2 | 0.5 | — |
| | 2-Pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 1 | 1 | 1 | 1 | 1 | 1 |
| | Surfynol 440(parts) | | 0.5 | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 8.3 | 8.0 | 8.2 | 8.1 | 8.4 | 8.2 |
| | Average particle diameter D50/nm | | 131 | 148 | 131 | 139 | 386 | 139 |
| | Initial viscosity (mPa · s) | | 6.6 | 4.9 | 8.3 | 7.2 | 88.3 | 6.9 |
| | Optical density | Measured value | 1.32 | 1.29 | 1.22 | 1.20 | 1.58 | 1.10 |
| | | Improvement rate | 126% | 123% | 116% | 114% | 150% | 105% |
| | | Determination | G | G | G | G | G | G |
| | Rubfastness | | G | G | G | G | G | N |
| | Maker resistance | | G | G | G | G | G | N |
| | Ink jet adaptability | | G | G | G | G | N | G |

| Aqueous black ink (Type2) | | | Comparative Example 14 | Example 65 | Example 66 | Comparative Example 12 |
|---|---|---|---|---|---|---|
| Dispersion method (US: ultrasonic dispersion method PLM: kneading method) | | | Self-dispersion type | Self-dispersion type | Self-dispersion type | Self-dispersion type |
| Composition | Black pigment | Product name | CAB-O-JET 400 | SENSI JET Black SDP 100 | SENSI JET Black SDP 100 | SENSI JET Black SDP 100 |
| | | (parts) (solid content) | 4 | 4 | 4 | 4 |
| | Anionic group-containing organic polymer compound | Name/Product name | — | — | — | — |
| | | (parts) (solid content) | — | — | — | — |
| | | Name/Product name | — | CMC 1390 | CMC 1390 | — |
| | | (parts) (solid content) | — | 0.2 | 0.2 | — |
| | Bio-nanofiber | Product name-abbreviation | — | CEL-NF | CEL-KY | — |
| | | (parts) | — | 0.2 | 0.2 | — |
| | 2-Pyrrolidone (parts) | | 8 | 8 | 8 | 8 |
| | Triethylene glycol | | 8 | 8 | 8 | 8 |
| | Glycerin (parts) | | 3 | 3 | 3 | 3 |
| | Triethylene glycol (parts) | | 1 | 1 | 1 | 1 |
| | Surfynol 440(parts) | | 0.5 | 0.5 | 0.5 | 0.5 |
| | Pure water | | Balance | Balance | Balance | Balance |
| | Total (parts) | | 100 | 100 | 100 | 100 |
| Physical properties | pH | | 8.3 | 8.1 | 8.1 | 7.9 |
| | Average particle diameter D50/nm | | 131 | 118 | 121 | 117 |
| | Initial viscosity (mPa · s) | | 2.1 | 8.8 | 8.8 | 2.1 |
| | Optical density | Measured value | 1.05 | 1.29 | 1.25 | 1.15 |
| | | Improvement rate | (Reference) | 112% | 109% | (Reference) |
| | | Determination | — | G | G | — |
| | Rubfastness | | N | G | G | N |
| | Maker resistance | | N | G | G | N |
| | Ink jet adaptability | | G | G | G | G |

TABLE 13

| Aqueous cyan ink (Type1) | | | Production Example 2 US Dispersion | Example 67 | Example 68 | Example 69 | Example 70 | Example 71 |
|---|---|---|---|---|---|---|---|---|
| Dispersion method (US: ultrasonic dispersion method PLM: kneading method) | | | US | US | US | US | US | US |
| Composition | Cyan pigment | Product name | FASTOGEN Blue TGR | FASTOGEN Blue TGR | FASTOGEN Blue TGR | FASTOGEN Blue TGR | FASTOGEN Blue TGR | FASTOGEN Blue TGR |
| | | (parts) (solid content) | 8 | 6 | 6 | 6 | 6 | 6 |
| | Anionic group-containing organic polymer compound | Name/Product name | SA-1 | SA-1 | SA-1 | SA-1 | SA-1 | SA-1 |
| | | (parts) (solid content) | 1.6 | 1.2 | 1.2 | 1.2 | 1.2 | 1.2 |
| | | Name/Product name | — | — | — | — | CMC 1390 | DN-800H |
| | | (parts) (solid content) | — | — | — | — | 0.3 | 0.225 |
| | Bio-nanofiber | Product name (abbreviation) | CHI-NF | CHI-NF | CEL-KY | CEL-NF | CEL-NF | CHI-NF |
| | | (parts) (solid content) | 0.1 | 0.075 | 0.3 | 0.15 | 0.3 | 0.6 |
| | Triethylene glycol (parts) | | 8 | 6 | 6 | 6 | 6 | 6 |
| | Pure water | | Balance | Balance | Balance | Balance | Balance | Balance |
| | Total (parts) | | 100 | 100 | 100 | 100 | 100 | 100 |
| Physical properties | pH | | 9.6 | 9.4 | 9.5 | 9.6 | 9.5 | 9.6 |
| | Average particle diameter D50/nm | | 96 | 93 | 94 | 93 | 94 | 91 |
| | Initial viscosity (mPa · s) | | — | 3.9 | 13.8 | 5.2 | 18.1 | 63.4 |
| | Optical density | Measured value | — | 1.27 | 1.26 | 1.23 | 1.28 | 1.36 |
| | | Improvement rate | — | 108% | 107% | 105% | 109% | 115% |
| | | Determination | — | G | G | G | G | G |
| | Rubfastness | | — | G | G | G | G | G |

| Aqueous cyan ink (Type1) | | | Comparative Example 13 | Example 72 | Example 73 | Example 74 | Example 75 | Comparative Example 14 |
|---|---|---|---|---|---|---|---|---|
| Dispersion method (US: ultrasonic dispersion method PLM: kneading method) | | | US | US | US | US | US | US |
| Composition | Cyan pigment | Product name | FASTOGEN Blue TGR | FASTOGEN Blue TGR | FASTOGEN Blue TGR | FASTOGEN Blue TGR | FASTOGEN Blue TGR | FASTOGEN Blue TGR |
| | | (parts) (solid content) | 6 | 6 | 6 | 6 | 6 | 6 |
| | Anionic group-containing organic polymer compound | Name/Product name | SA-1 | UR-1 | UR-1 | UR-1 | UR-1 | UR-1 |
| | | (parts) (solid content) | 1.2 | 1.2 | 1.2 | 1.2 | 1.2 | 1.2 |
| | | Name/Product name | — | — | DN-800H | DN-100L | — | — |
| | | (parts) (solid content) | — | — | 0.225 | 0.225 | — | — |
| | Bio-nanofiber | Product name (abbreviation) | | CHI-NF | CHI-NF | CHI-NF | CEL-KY | |
| | | (parts) (solid content) | — | 0.225 | 0.225 | 0.6 | 0.3 | — |
| | Triethylene glycol (parts) | | 6 | 6 | 6 | 6 | 6 | 6 |
| | Pure water | | Balance | Balance | Balance | Balance | Balance | Balance |
| | Total (parts) | | 100 | 100 | 100 | 100 | 100 | 100 |
| Physical properties | pH | | 9.6 | 8.9 | 8.8 | 8.9 | 8.9 | 9.6 |
| | Average particle diameter D50/nm | | 91 | 120 | 125 | 121 | 99 | 91 |
| | Initial viscosity (mPa · s) | | 1.8 | 6.2 | 9.4 | 59.1 | 19.3 | 2.4 |
| | Optical density | Measured value | 1.17 | 1.23 | 1.28 | 1.34 | 1.21 | 1.09 |
| | | Improvement rate | (Reference) | 113% | 118% | 123% | 111% | (Reference) |
| | | Determination | — | G | G | G | G | — |
| | Rubfastness | | N | G | G | G | G | N |

TABLE 14

| Aqueous cyan ink (Type1) | | | Production Example 6 PLM Dispersion | Example 76 | Example 77 | Comparative Example 15 | Example 78 |
|---|---|---|---|---|---|---|---|
| Dispersion method (US: ultrasonic dispersion method PLM: kneading method) | | | PLM | PLM | PLM | PLM | Self-dispersion type |
| Composition | Cyan pigment | Product name | FASTOGEN Blue TGR | FASTOGEN Blue TGR | FASTOGEN Blue TGR | FASTOGEN Blue TGR | CAB-O-JET 450C |
| | | (parts) (solid content) | 8 | 6 | 6 | 6 | 6 |
| | Anionic group-containing organic polymer compound | Name/Product name | Resin A | Resin A | Resin A | Resin A | — |
| | | (parts) (solid content) | 2.4 | 1.8 | 1.8 | 1.8 | — |
| | | Name/Product name | DN-800H | DN-800H | DN-800H | — | CMC 1390 |
| | | (parts) (solid content) | 0.4 | 0.3 | 0.225 | — | 0.3 |
| | Bio-nanofiber | Product name (abbreviation) | CHI-NF | CHI-NF | CHI-NF | | CEL-NF |
| | | (parts) (solid content) | 0.3 | 0.225 | 0.6 | — | 0.3 |
| | Triethylene glycol (parts) | | 3 | 2.25 | 2.25 | 2.25 | 1.5 |
| | Pure water | | Balance | Balance | Balance | Balance | Balance |
| | Total (parts) | | 100 | 100 | 100 | 100 | 100 |
| Physical properties | pH | | 9.9 | 9.8 | 9.9 | 9.9 | 9.8 |
| | Average particle diameter D50/nm | | 95 | 90 | 95 | 89 | 86 |
| | Initial viscosity (mPa · s) | | — | 13.6 | 52.8 | 1.5 | 35.1 |
| | Optical density | Measured value | — | 1.25 | 1.32 | 1.16 | 1.39 |
| | | Improvement rate | — | 107% | 114% | (Reference) | 115% |
| | | Determination | — | G | G | — | G |
| | Rubfastness | | — | G | G | N | G |

| Aqueous cyan ink (Type1) | | | Example 79 | Example 80 | Example 81 | Comparative Example 16 |
|---|---|---|---|---|---|---|
| Dispersion method (US: ultrasonic dispersion method PLM: kneading method) | | | Self-dispersion type | Self-dispersion type | Self-dispersion type | Self-dispersion type |
| Composition | Cyan pigment | Product name | CAB-O-JET 450C | CAB-O-JET 450C | CAB-O-JET 450C | CAB-O-JET 450C |
| | | (parts) (solid content) | 6 | 6 | 6 | 6 |
| | Anionic group-containing organic polymer compound | Name/Product name | — | — | — | — |
| | | (parts) (solid content) | — | — | — | — |
| | | Name/Product name | DN-800H | CMC 1390 | DN-800H | — |
| | | (parts) (solid content) | 0.3 | 0.3 | 0.3 | — |
| | Bio-nanofiber | Product name (abbreviation) | CEL-NF | CEL-NF | CEL-KY | — |
| | | (parts) (solid content) | 0.3 | 0.3 | 0.3 | — |
| | Triethylene glycol (parts) | | 1.5 | 1.5 | 1.5 | 1.5 |
| | Pure water | | Balance | Balance | Balance | Balance |
| | Total (parts) | | 100 | 100 | 100 | 100 |
| Physical properties | pH | | 9.4 | 9.8 | 9.5 | 9.7 |
| | Average particle diameter D50/nm | | 83 | 89 | 90 | 84 |
| | Initial viscosity (mPa · s) | | 15.2 | 23.5 | 9.9 | 1.2 |
| | Optical density | Measured value | 1.34 | 1.29 | 1.28 | 1.21 |
| | | Improvement rate | 111% | 107% | 106% | (Reference) |
| | | Determination | G | G | G | — |
| | Rubfastness | | G | G | G | N |

TABLE 15

| Aqueous cyan ink (Type2) | | | Production Example 2 US Dispersion | Example 82 | Example 83 | Example 84 | Example 85 | Example 86 |
|---|---|---|---|---|---|---|---|---|
| Dispersion method (US: ultrasonic dispersion method PLM: kneading method) | | | US | US | US | US | US | US |
| Composition | Cyan pigment | Product name | FASTOGEN Blue TGR | FASTOGEN Blue TGR | FASTOGEN Blue TGR | FASTOGEN Blue TGR | FASTOGEN Blue TGR | FASTOGEN Blue TGR |
| | | (parts) (solid content) | 8 | 4 | 4 | 4 | 4 | 4 |

TABLE 15-continued

|  |  |  |  |  |  |  |  |  |
|---|---|---|---|---|---|---|---|---|
|  | Anionic group-containing organic polymer compound | Name/Product name | SA-1 | SA-1 | SA-1 | SA-1 | SA-1 | SA-1 |
|  |  | (parts) (solid content) | 1.6 | 0.8 | 0.8 | 0.8 | 0.8 | 0.8 |
|  |  | Name/Product name | — | — | — | — | CMC 1390 | DN-800H |
|  |  | (parts) (solid content) | — | — | — | — | 0.2 | 0.2 |
|  | Bio-nanofiber | Product name (abbreviation) | CHI-NF | CHI-NF | CEL-KY | CEL-KY | CEL-KY | CEL-KY |
|  |  | (parts) (solid content) | 0.1 | 0.05 | 0.2 | 0.1 | 0.2 | 0.2 |
|  | 2-Pyrrolidone (parts) |  | — | 8 | 8 | 8 | 8 | 8 |
|  | Triethylene glycol |  | — | 8 | 8 | 8 | 8 | 8 |
|  | Glycerin (parts) |  | — | 3 | 3 | 3 | 3 | 3 |
|  | Triethylene glycol (parts) |  | 8 | 4 | 4 | 4 | 4 | 4 |
|  | Surfynol 440(parts) |  | — | 0.5 | 0.5 | 0.5 | 0.5 | 0.5 |
|  | Pure water |  | Balance | Balance | Balance | Balance | Balance | Balance |
|  | Total (parts) |  | 100 | 100 | 100 | 100 | 100 | 100 |
| Physical properties | pH |  | 9.6 | 8.8 | 8.9 | 9.0 | 8.9 | 8.9 |
|  | Average particle diameter D50/nm |  | 96 | 95 | 96 | 95 | 96 | 96 |
|  | Initial viscosity (mPa · s) |  | — | 4.5 | 9.7 | 5.1 | 8.8 | 9.7 |
|  | Optical density | Measured value | — | 1.05 | 1.04 | 1.02 | 1.06 | 1.04 |
|  |  | Improvement rate | — | 108% | 107% | 105% | 109% | 107% |
|  |  | Determination | — | G | G | G | G | G |
|  | Rubfastness |  | — | G | G | G | G | G |
|  | Ink jet adaptability |  | — | G | G | G | G | G |

| Aqueous cyan ink (Type2) |  |  | Example 87 | Example 88 | Example 89 | Example 90 | Example 91 | Example 92 |
|---|---|---|---|---|---|---|---|---|
| Dispersion method (US: ultrasonic dispersion method PLM: kneading method) |  |  | US | US | US | US | US | US |
| Composition | Cyan pigment | Product name | FASTOGEN Blue TGR | FASTOGEN Blue TGR | FASTOGEN Blue TGR | FASTOGEN Blue TGR | FASTOGEN Blue TGR | FASTOGEN Blue TGR |
|  |  | (parts) (solid content) | 4 | 4 | 4 | 4 | 4 | 4 |
|  | Anionic group-containing organic polymer compound | Name/Product name | SA-1 | SA-1 | SA-1 | SA-1 | SA-1 | SA-1 |
|  |  | (parts) (solid content) | 0.8 | 0.8 | 0.8 | 0.8 | 0.8 | 0.8 |
|  |  | Name/Product name | — | DN-800H | DN-10L | DN-100L | CMC 1390 | DN-100L |
|  |  | (parts) (solid content) | — | 0.15 | 0.15 | 0.2 | 0.1 | 0.15 |
|  | Bio-nanofiber | Product name (abbreviation) | CHI-NF | HI-NF | CHI-NF | CHI-NF | CHI-NF | CHI-NF |
|  |  | (parts) (solid content) | 0.15 | 0.15 | 0.15 | 0.1 | 0.15 | 0.3 |
|  | 2-Pyrrolidone (parts) |  | 8 | 8 | 8 | 8 | 8 | 8 |
|  | Triethylene glycol |  | 8 | 8 | 8 | 8 | 8 | 8 |
|  | Glycerin (parts) |  | 3 | 3 | 3 | 3 | 3 | 3 |
|  | Triethylene glycol (parts) |  | 4 | 4 | 4 | 4 | 4 | 4 |
|  | Surfynol 440(parts) |  | 0.5 | 0.5 | 0.5 | 0.5 | 0.5 | 0.5 |
|  | Pure water |  | Balance | Balance | Balance | Balance | Balance | Balance |
|  | Total (parts) |  | 100 | 100 | 100 | 100 | 100 | 100 |
| Physical properties | pH |  | 8.8 | 9.2 | 9.3 | 9.0 | 9.0 | 9.0 |
|  | Average particle diameter D50/nm |  | 95 | 92 | 93 | 95 | 95 | 95 |
|  | Initial viscosity (mPa · s) |  | 16.8 | 7.9 | 7.8 | 8.3 | 15.2 | 11.7 |
|  | Optical density | Measured value | 1.10 | 1.07 | 1.05 | 1.08 | 1.08 | 1.10 |
|  |  | Improvement rate | 113% | 110% | 108% | 111% | 111% | 113% |
|  |  | Determination | G | G | G | G | G | G |
|  | Rubfastness |  | G | G | G | G | G | G |
|  | Ink jet adaptability |  | M | G | G | G | M | G |

TABLE 16

| Aqueous cyan ink (Type2) |  |  | Example 93 | Comparative Example 17 | Example 94 | Example 95 | Example 96 |
|---|---|---|---|---|---|---|---|
| Dispersion method (US: ultrasonic dispersion method PLM: kneading method) |  |  | US | US | US | US | US |
| Composition | Cyan pigment | Product name | FASTOGEN Blue TGR | FASTOGEN Blue TGR | FASTOGEN Blue TGR | FASTOGEN Blue TGR | FASTOGEN Blue TGR |
|  |  | (parts) (solid content) | 4 | 4 | 4 | 4 | 4 |

TABLE 16-continued

|  |  |  |  |  |  |  |  |
|---|---|---|---|---|---|---|---|
|  | Anionic group-containing organic polymer compound | Name/Product name | SA-1 | SA-1 | UR-1 | UR-1 | UR-1 |
|  |  | (parts) (solid content) | 0.8 | 0.8 | 0.8 | 0.8 | 0.8 |
|  |  | Name/Product name | DN-800H | — | — | — | DN-800H |
|  |  | (parts) (solid content) | 0.15 | — | — | — | 0.15 |
|  | Bio-nanofiber | Product name (abbreviation) | CHI-NF | — | CEL-KY | CHI-NF | CHI-NF |
|  |  | (parts) (solid content) | 0.4 | — | 0.2 | 0.15 | 0.15 |
|  | 2-Pyrrolidone (parts) |  | 8 | 8 | 8 | 8 | 8 |
|  | Triethylene glycol |  | 8 | 8 | 8 | 8 | 8 |
|  | Glycerin (parts) |  | 3 | 3 | 3 | 3 | 3 |
|  | Triethylene glycol (parts) |  | 4 | 4 | 4 | 4 | 4 |
|  | Surfynol 440(parts) |  | 0.5 | 0.5 | 0.5 | 0.5 | 0.5 |
|  | Pure water |  | Balance | Balance | Balance | Balance | Balance |
|  | Total (parts) |  | 100 | 100 | 100 | 100 | 100 |
| Physical properties | pH |  | 9.0 | 9.0 | 8.3 | 8.3 | 8.2 |
|  | Average particle diameter D90/nm |  | 93 | 93 | 101 | 122 | 127 |
|  | Initial viscosity (mPa · s) |  | 17.3 | 2.1 | 8.9 | 7.7 | 18.8 |
|  | Optical density | Measured value | 1.12 | 0.97 | 1.00 | 1.02 | 1.06 |
|  |  | Improvement rate | 115% | (Reference) | 111% | 113% | 118% |
|  |  | Determination | G | — | G | G | G |
|  | Rubfastness |  | G | N | G | G | G |
|  | Ink jet adaptability |  | M | G | G | G | M |

| Aqueous cyan ink (Type2) |  |  | Example 97 | Example 98 | Example 99 | Comparative Example 18 |
|---|---|---|---|---|---|---|
| Dispersion method (US: ultrasonic dispersion method PLM: kneading method) |  |  | US | US | US | US |
| Composition | Cyan pigment | Product name | FASTOGEN Blue TGR | FASTOGEN Blue TGR | FASTOGEN Blue TGR | FASTOGEN Blue TGR |
|  |  | (parts) (solid content) | 4 | 4 | 4 | 4 |
|  | Anionic group-containing organic polymer compound | Name/Product name | UR-1 | UR-1 | UR-1 | UR-1 |
|  |  | (parts) (solid content) | 0.8 | 0.8 | 0.8 | 0.8 |
|  |  | Name/Product name | DN-10L | CMC 1390 | DN-100L | — |
|  |  | (parts) (solid content) | 0.15 | 0.1 | 0.15 | — |
|  | Bio-nanofiber | Product name (abbreviation) | CHI-NF | CHI-NF | CHI-NF | — |
|  |  | (parts) (solid content) | 0.15 | 0.15 | 0.4 | — |
|  | 2-Pyrrolidone (parts) |  | 8 | 8 | 8 | 8 |
|  | Triethylene glycol |  | 8 | 8 | 8 | 8 |
|  | Glycerin (parts) |  | 3 | 3 | 3 | 3 |
|  | Triethylene glycol (parts) |  | 4 | 4 | 4 | 4 |
|  | Surfynol 440(parts) |  | 0.5 | 0.5 | 0.5 | 0.5 |
|  | Pure water |  | Balance | Balance | Balance | Balance |
|  | Total (parts) |  | 100 | 100 | 100 | 100 |
| Physical properties | pH |  | 8.4 | 8.3 | 8.3 | 9.0 |
|  | Average particle diameter D90/nm |  | 121 | 122 | 123 | 93 |
|  | Initial viscosity (mPa · s) |  | 12.4 | 5.8 | 17.1 | 2.5 |
|  | Optical density | Measured value | 1.04 | 1.01 | 1.11 | 0.90 |
|  |  | Improvement rate | 116% | 112% | 123% | (Reference) |
|  |  | Determination | G | G | G | — |
|  | Rubfastness |  | G | G | G | N |
|  | Ink jet adaptability |  | G | G | M | G |

TABLE 17

| | | Production Example 6 PLM Dispersion | Example 100 | Example 101 | Example 102 | Example 103 | Example 104 | Example 105 | Example 106 | Example 107 | Example 108 | Comparative Example 19 | Comparative Example 20 |
|---|---|---|---|---|---|---|---|---|---|---|---|---|---|
| Aqueous cyan ink (Type2) | | PLM | PLM | PLM | PLM | PLM | PLM | PLM | PLM | PLM | PLM | PLM | PLM |
| Dispersion method (US: ultrasonic dispersion method PLM: kneading method) | | | | | | | | | | | | | |
| Composition | Cyan pigment Product name (parts) (solid content) | FASTOGEN Blue TGR 8 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 | FASTOGEN Blue TGR 4 |
| | Anionic group-containing organic polymer compound Name/Product name (parts) (solid content) | Resin A 2.4 | Resin A 1.2 | Resin A 1.2 | Resin A 1.2 | Resin A 1.2 | Resin A 1.2 | Resin A 1.2 | Resin A 1.2 | Resin A 1.2 | Resin A 1.2 | Resin A 1.2 | Resin A 1.2 |
| | Name/Product name (parts) (solid content) | DN-800H 0.4 | DN-800H 0.2 | — — | — — | DN-800H 0.2 | CMC 1390 0.1 | DN-100L 0.15 | CMC 1390 0.1 | DN-100L 0.15 | DN-800H 0.15 | DN-800H 0.2 | — — |
| | Bio-nanofiber Product name (abbreviation) (parts) (solid content) | CHI-NF 0.3 | CHI-NF 0.15 | CEL-KY 0.2 | CEL-KY 0.1 | CEL-KY 0.2 | CEL-KY 0.1 | CHI-NF 0.2 | CHI-NF 0.15 | CHI-NF 0.3 | CHI-NF 0.4 | — — | — — |
| | 2-Pyrrolidone (parts) | — | 8 | 8 | 8 | 8 | 8 | 8 | 8 | 8 | 8 | 8 | 8 |
| | Triethylene glycol (parts) | — | 8 | 8 | 8 | 8 | 8 | 8 | 8 | 8 | 8 | 8 | 8 |
| | Glycerin (parts) | — | 3 | 3 | 3 | 3 | 3 | 3 | 3 | 3 | 3 | 3 | 3 |
| | Triethylene glycol (parts) | 3 | 1.5 | 1.5 | 1.5 | 1.5 | 1.5 | 1.5 | 1.5 | 1.5 | 1.5 | 1.5 | 1.5 |
| | Surfynol 440(parts) | — | 0.5 | 0.5 | 0.5 | 0.5 | 0.5 | 0.5 | 0.5 | 0.5 | 0.5 | 0.5 | 0.5 |
| | Pure water | Balance | Balance | Balance | Balance | Balance | Balance | Balance | Balance | Balance | Balance | Balance | Balance |
| | Total (parts) | 100 | 100 | 100 | 100 | 100 | 100 | 100 | 100 | 100 | 100 | 100 | 100 |
| | pH | 9.9 | 9.2 | 9.3 | 9.3 | 9.1 | 9.1 | 9.3 | 9.0 | 8.8 | 9.3 | 9.1 | 9.3 |
| Physical properties | Average particle diameter D50/nm | 95 | 92 | 92 | 92 | 93 | 93 | 93 | 96 | 96 | 97 | 90 | 91 |
| | Initial viscosity (mPa·s) | — | 9.9 | 6.6 | 3.9 | 25.6 | 14.8 | 7.9 | 9.1 | 16.1 | 17.4 | 12.8 | 2.5 |
| | Optical density Measured value | — | 1.03 | 1.00 | 0.98 | 0.99 | 0.99 | 1.02 | 1.01 | 1.06 | 1.09 | 0.97 | 0.95 |
| | Improvement rate | — | 108% | 105% | 103% | 104% | 104% | 107% | 106% | 112% | 115% | 102% | (Reference) |
| | Determination | — | G | G | G | G | G | G | G | G | G | N | — |
| | Rubfastness | — | G | G | G | G | G | G | G | G | G | N | N |
| | Ink jet adaptability | — | G | G | G | M | G | G | G | M | M | G | G |

TABLE 18

| Aqueous cyan ink (Type 2) | | | Example 109 | Example 110 | Example 111 | Example 112 | Comparative Example 21 | Comparative Example 22 | Comparative Example 23 |
|---|---|---|---|---|---|---|---|---|---|
| Dispersion method (US: ultrasonic dispersion method PLM: kneading method) | | | Self-dispersion type | Self-dispersion type | Self-dispersion type | Self-dispersion type | Self-dispersion type | Self-dispersion type | Self-dispersion type |
| Composition | Cyan pigment | Product name | CAB-O-JET 450C | CAB-O-JET 450C | CAB-O-JET 450C | CAB-O-JET 450C | CAB-O-JET 450C | CAB-O-JET 450C | CAB-O-JET 450C |
| | | (parts) (solid content) | 4 | 4 | 4 | 4 | 4 | 4 | 4 |
| | Anionic group-containing organic polymer compound | Name/Product name | — | — | — | — | — | — | — |
| | | (parts) (solid content) | — | — | — | — | — | — | — |
| | | Name/Product name | CMC 1390 | DN-800H | CMC 1390 | DN-800H | — | CMC 1390 | — |
| | | (parts) (solid content) | 0.2 | 0.2 | 0.2 | 0.2 | — | 0.2 | — |
| | Bio-nanofiber | Product name (abbreviation) | CEL-NF | CEL-NF | CEL-KY | CEL-KY | CEL-NF | — | — |
| | | (parts) (solid content) | 0.2 | 0.2 | 0.2 | 0.2 | 0.5 | — | — |
| | 2-Pyrrolidone (parts) | | 8 | 8 | 8 | 8 | 8 | 8 | 8 |
| | Triethylene glycol | | 8 | 8 | 8 | 8 | 8 | 8 | 8 |
| | Glycerin (parts) | | 3 | 3 | 3 | 3 | 3 | 3 | 3 |
| | Triethylene glycol (parts) | | 1 | 1 | 1 | 1 | 1 | 1 | 1 |
| | Surfynol 440 (parts) | | 0.5 | 0.5 | 0.5 | 0.5 | 0.5 | 0.5 | 0.5 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 9.2 | 8.8 | 9.2 | 8.9 | 9.2 | 9.0 | 9.1 |
| | Average particle diameter D50/nm | | 88 | 85 | 91 | 92 | 203 | 86 | 86 |
| | Initial viscosity (mPa·s) | | 13.4 | 9.7 | 10.7 | 9.9 | 456.0 | 6.9 | 2.0 |
| | Optical density | Measured value | 1.15 | 1.11 | 1.07 | 1.06 | 1.40 | 1.01 | 1.00 |
| | | Improvement rate | 115% | 111% | 107% | 106% | 140% | 101% | (Reference) |
| | | Determination | G | G | G | G | G | N | — |
| | Rubfastness | | G | G | G | G | G | N | N |
| | Ink jet adaptability | | M | G | G | G | N | G | G |

TABLE 19

| Aqueous magenta ink (Type 1) | | | Production Example 3 US Dispersion | Example 113 | Example 114 | Example 115 | Example 116 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 8 | 6 | 6 | 6 | 6 |
| | Anionic group-containing organic polymer compound | Name/Product name | SA-1 | SA-1 | SA-1 | SA-1 | SA-1 |
| | | (parts) (solid content) | 2.4 | 1.8 | 1.8 | 1.8 | 1.8 |
| | | Name/Product name | — | — | — | CMC 1390 | DN-800H |
| | | (parts) (solid content) | — | — | — | 0.3 | 0.3 |
| | Bio-nanofiber | Product name (abbreviation) | CHI-NF | CHI-NF | CEL-NF | CEL-NF | CEL-KY |
| | | (parts) (solid content) | 0.1 | 0.075 | 0.15 | 0.15 | 0.15 |
| | Triethylene glycol (parts) | | 8 | 6 | 6 | 6 | 6 |
| | Pure water | | Balance | Balance | Balance | Balance | Balance |
| | Total (parts) | | 100 | 100 | 100 | 100 | 100 |
| Physical properties | pH | | 9.9 | 9.6 | 9.9 | 10.0 | 10.0 |
| | Average particle diameter D50/nm | | 96 | 90 | 105 | 105 | 104 |
| | Initial viscosity (mPa·s) | | — | 3.1 | 34.5 | 11.7 | 17.1 |
| | Optical density | Measured value | — | 1.20 | 1.19 | 1.35 | 1.32 |
| | | Improvement rate | — | 104% | 103% | 117% | 115% |
| | | Determination | — | G | G | G | G |
| | Rubfastness | | — | G | G | G | G |

TABLE 19-continued

| Aqueous magenta ink (Type 1) | | | Example 117 | Comparative Example 24 | Example 118 | Example 119 | Comparative Example 25 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 6 | 6 | 6 | 6 | 6 |
| | Anionic group-containing organic polymer compound | Name/Product name | SA-1 | SA-1 | UR-1 | UR-1 | UR-1 |
| | | (parts) (solid content) | 1.8 | 1.8 | 1.8 | 1.8 | 1.8 |
| | | Name/Product name | DN-800H | — | DN-10L | DN-100L | — |
| | | (parts) (solid content) | 0.225 | — | 0.15 | 0.225 | — |
| | Bio-nanofiber | Product name (abbreviation) | CHI-NF | — | CHI-NF | CHI-NF | — |
| | | (parts) (solid content) | 0.6 | — | 0.225 | 0.6 | — |
| | | Triethylene glycol (parts) | 6 | 6 | 6 | 6 | 6 |
| | | Pure water | Balance | Balance | Balance | Balance | Balance |
| | | Total (parts) | 100 | 100 | 100 | 100 | 100 |
| Physical properties | | pH | 9.8 | 10.1 | 9.3 | 9.2 | 8.6 |
| | | Average particle diameter D50/nm | 94 | 104 | 96 | 103 | 105 |
| | | Initial viscosity (mPa·s) | 49.3 | 1.4 | 11.6 | 56.6 | 2.3 |
| | Optical density | Measured value | 1.34 | 1.15 | 1.16 | 1.19 | 1.07 |
| | | Improvement rate | 117% | (Reference) | 109% | 111% | (Reference) |
| | | Determination | G | — | G | G | — |
| | | Rubfastness | G | N | G | G | G |

TABLE 20

| Aqueous magenta ink (Type 1) | | | Production Example 7 PLM Dispersion | Example 120 | Example 121 | Example 122 | Example 123 | Comparative Example 26 |
|---|---|---|---|---|---|---|---|---|
| Dispersion method (US: ultrasonic dispersion method PLM: kneading method) | | | PLM | PLM | PLM | PLM | PLM | PLM |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 8 | 6 | 6 | 6 | 6 | 6 |
| | Anionic group-containing organic polymer compound | Name/Product name | Resin A | Resin A | Resin A | Resin A | Resin A | Resin A |
| | | (parts) (solid content) | 1.6 | 1.2 | 1.2 | 1.2 | 1.2 | 1.2 |
| | | Name/Product name | — | — | CMC 1390 | DN-100L | CMC 1390 | — |
| | | (parts) (solid content) | — | — | 0.15 | 0.225 | 0.15 | — |
| | Bio-nanofiber | Product name (abbreviation) | CEL-KY | CEL-KY | CEL-NF | CHI-NF | CHI-NF | — |
| | | (parts) (solid content) | 0.2 | 0.15 | 0.15 | 0.3 | 0.225 | — |
| | | Triethylene glycol (parts) | 5.4 | 4.05 | 4.05 | 4.05 | 4.05 | 4.05 |
| | | Pure water | Balance | Balance | Balance | Balance | Balance | Balance |
| | | Total (parts) | 100 | 100 | 100 | 100 | 100 | 100 |
| Physical properties | | pH | 10.3 | 10.0 | 10.0 | 10.1 | 9.8 | 10.0 |
| | | Average particle diameter D50/nm | 101 | 96 | 98 | 88 | 91 | 101 |
| | | Initial viscosity (mPa·s) | — | 47.8 | 27.6 | 9.5 | 5.0 | 1.5 |
| | Optical density | Measured value | — | 1.16 | 1.17 | 1.20 | 1.19 | 1.12 |
| | | Improvement rate | — | 104% | 104% | 107% | 106% | (Reference) |
| | | Determination | — | G | G | G | G | — |
| | | Rubfastness | — | G | G | G | G | N |

TABLE 21

| Aqueous magenta ink (Type 1) | | | Example 124 | Example 125 | Example 126 | Example 127 | Comparative Example 27 | Comparative Example 28 | Comparative Example 29 |
|---|---|---|---|---|---|---|---|---|---|
| Dispersion method (US: ultrasonic dispersion method PLM: kneading method) | | | Self-dispersion type | Self-dispersion type | Self-dispersion type | Self-dispersion type | Self-dispersion type | Self-dispersion type | Self-dispersion type |
| Composition | Magenta pigment | Product name | CAB-O-JET 465M | CAB-O-JET 465M | CAB-O-JET 465M | CAB-O-JET 465M | CAB-O-JET 465M | CAB-O-JET 465M | CAB-O-JET 465M |
| | | (parts) (solid content) | 6 | 6 | 6 | 6 | 6 | 6 | 6 |
| | Anionic group-containing organic polymer compound | Name/Product name | — | — | — | — | — | — | — |
| | | Name/Product name | CMC 1390 | DN-800H | CMC 1390 | DN-800H | DN-800H | — | — |
| | | (parts) (solid content) | 0.3 | 0.3 | 0.3 | 0.3 | 0.3 | — | — |
| | Bio-nanofiber | Product name (abbreviation) | CEL-NF | CEL-NF | CEL-KY | CEL-KY | — | CEL-NF | — |
| | | (parts) (solid content) | 0.3 | 0.3 | 0.3 | 0.3 | — | 0.75 | — |
| | Triethylene glycol (parts) | | 1.5 | 1.5 | 1.5 | 1.5 | 1.5 | 1.5 | 1.5 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 9.5 | 9.3 | 9.7 | 9.7 | 9.5 | 10.0 | 9.7 |
| | Average particle diameter D50/nm | | 74 | 69 | 75 | 71 | 84 | 193 | 73 |
| | Initial viscosity (mPa·s) | | 24.1 | 18.2 | 20.9 | 16.5 | 5.5 | 158.0 | 2.4 |
| | Optical density | Measured value | 1.37 | 1.31 | 1.16 | 1.15 | 1.10 | 1.65 | 1.08 |
| | | Improvement rate | 127% | 121% | 107% | 106% | 101% | 152% | (Reference) |
| | | Determination | G | G | G | G | N | G | — |
| | Rubfastness | | G | G | G | G | N | N | N |

TABLE 22

| Aqueous magenta ink (Type 2) | | | Production Example 3 US Dispersion | Example 128 | Example 129 | Example 130 | Example 131 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 8 | 4 | 4 | 4 | 4 |
| | Anionic: group-containing organic polymer compound | Name/Product name | SA-1 | SA-1 | SA-1 | SA-1 | SA-1 |
| | | (parts) (solid content) | 2.4 | 1.2 | 1.2 | 1.2 | 1.2 |
| | | Name/Product name | — | — | — | — | CMC1390 |
| | | (parts) (solid content) | — | — | — | — | 0.2 |
| | Bio-nanofiber | Product name (abbreviation) | CHI-NF | CHI-NF | CEL-KY | CEL-KY | CEL-KY |
| | | (parts) (solid content) | 0.1 | 0.05 | 0.2 | 0.1 | 0.1 |
| | 2-Pyrrolidone (parts) | | — | 8 | 8 | 8 | 8 |
| | Triethylene glycol | | — | — | — | — | — |
| | Glycerin (parts) | | — | 3 | 3 | 3 | 3 |
| | Triethylene glycol (parts) | | 8 | 4 | 4 | 4 | 4 |
| | Surfynol 440 (parts) | | — | 0.5 | 0.5 | 0.5 | 0.5 |
| | Pure water | | Balance | Balance | Balance | Balance | Balance |
| | Total (parts) | | 100 | 100 | 100 | 100 | 100 |
| Physical properties | pH | | 9.9 | 8.8 | 9.0 | 9.1 | 9.2 |
| | Average particle diameter D50/nm | | 96 | 95 | 102 | 110 | 110 |
| | Initial viscosity (mPa·s) | | — | 3.3 | 16.2 | 10.9 | 13.2 |
| | Optical density | Measured value | — | 0.91 | 0.97 | 0.96 | 0.98 |
| | | Improvement rate | — | 105% | 111% | 110% | 113% |
| | | Determination | — | G | G | G | G |
| | Rubfastness | | — | G | G | G | G |
| | Ink jet adaptability | | — | G | M | G | G |

| Aqueous magenta ink (Type 2) | | | Example 132 | Example 133 | Example 134 | Example 135 | Example 136 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 4 | 4 | 4 | 4 | 4 |
| | Anionic: group- | Name/Product name | SA-1 | SA-1 | SA-1 | SA-1 | SA-1 |

TABLE 22-continued

| | | | | | | |
|---|---|---|---|---|---|---|
| | containing organic polymer compound | (parts) (solid content) | 1.2 | 1.2 | 1.2 | 1.2 | 1.2 |
| | | Name/Product name | DN-800H | — | DN-800H | DN-100L | DN-10L |
| | | (parts) (solid content) | 0.2 | — | 0.15 | 0.2 | 0.1 |
| | Bio-nanofiber | Product name (abbreviation) | CEL-KY | CHI-NF | CHI-NF | CHI-NF | CHI-NF |
| | | (parts) (solid content) | 0.1 | 0.15 | 0.15 | 0.2 | 0.2 |
| | 2-Pyrrolidone (parts) | | 8 | 8 | 8 | 8 | 8 |
| | Triethylene glycol | | 8 | 8 | 8 | 8 | 8 |
| | Glycerin (parts) | | 3 | 3 | 3 | 3 | 3 |
| | Triethylene glycol (parts) | | 4 | 4 | 4 | 4 | 4 |
| | Surfynol 440 (parts) | | 0.5 | 0.5 | 0.5 | 0.5 | 0.5 |
| | Pure water | | Balance | Balance | Balance | Balance | Balance |
| | Total (parts) | | 100 | 100 | 100 | 100 | 100 |
| Physical properties | pH | | 9.2 | 8.8 | 9.2 | 9.3 | 9.0 |
| | Average particle diameter D50/nm | | 109 | 95 | 92 | 93 | 95 |
| | Initial viscosity (mPa · s) | | 9.8 | 16.1 | 9.1 | 9.3 | 7.2 |
| | Optical density | Measured value | 0.98 | 0.92 | 0.92 | 0.94 | 0.91 |
| | | Improvement rate | 113% | 106% | 106% | 108% | 105% |
| | | Determination | G | G | G | G | G |
| | Rubfastness | | G | G | G | G | G |
| | Ink jet adaptability | | G | M | G | G | G |

TABLE 23

| | Aqueous magenta ink (Type 2) | | Example 137 | Example 138 | Comparative Example 30 | Example 139 | Example 140 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 4 | 4 | 4 | 4 | 4 |
| | Anionic group-containing organic polymer compound | Name/Product name | SA-1 | SA-1 | SA-1 | UR-1 | UR-1 |
| | | (parts) (solid content) | 1.2 | 1.2 | 1.2 | 1.2 | 1.2 |
| | | Name/Product name | DN-100L | DN-800H | — | — | — |
| | | (parts) (solid content) | 0.15 | 0.15 | — | — | — |
| | Bio-nanofiber | Product name (abbreviation) | CHI-NF | CHI-NF | — | CEL-KY | CHI-NF |
| | | (parts) (solid content) | 0.25 | 0.4 | — | 0.1 | 0.15 |
| | 2-Pyrrolidone (parts) | | 8 | 8 | 8 | 8 | 8 |
| | Triethylene glycol | | 8 | 8 | 8 | 8 | 8 |
| | Glycerin (parts) | | 3 | 3 | 3 | 3 | 3 |
| | Triethylene glycol (parts) | | 4 | 4 | 4 | 4 | 4 |
| | Surfynol 440 (parts) | | 0.5 | 0.5 | 0.5 | 0.5 | 0.5 |
| | Pure water | | Balance | Balance | Balance | Balance | Balance |
| | Total (parts) | | 100 | 100 | 100 | 100 | 100 |
| Physical properties | pH | | 8.8 | 9.0 | 9.3 | 8.0 | 8.4 |
| | Average particle diameter D50/nm | | 95 | 99 | 109 | 108 | 102 |
| | Initial viscosity (mPa · s) | | 17.8 | 18.5 | 2.3 | 12.2 | 7.7 |
| | Optical density | Measured value | 0.92 | 0.98 | 0.87 | 0.90 | 0.87 |
| | | Improvement rate | 106% | 113% | (Reference) | 111% | 107% |
| | | Determination | G | G | — | G | G |
| | Rubfastness | | G | G | N | G | G |
| | Ink jet adaptability | | M | M | G | G | G |

| | Aqueous magenta ink (Type 2) | | Example 141 | Example 142 | Example 143 | Example 144 | Comparative Example 31 |
|---|---|---|---|---|---|---|---|
| Dispersion method (US: ultrasonic dispersion method) | | | US | US | US | US | US |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
| | | (parts) (solid content) | 4 | 4 | 4 | 4 | 4 |
| | Anionic group-containing organic polymer compound | Name/Product name | UR-1 | UR-1 | UR-1 | UR-1 | UR-1 |
| | | (parts) (solid content) | 1.2 | 1.2 | 1.2 | 1.2 | 1.2 |
| | | Name/Product name | DN-800H | DN-10L | CMC 1390 | DN-100L | — |
| | | (parts) (solid content) | 0.15 | 0.1 | 0.2 | 0.15 | — |
| | Bio-nanofiber | Product name (abbreviation) | CHI-NF | CHI-NF | CHI-NF | CHI-NF | — |
| | | (parts) (solid content) | 0.15 | 0.15 | 0.1 | 0.4 | — |
| | 2-Pyrrolidone (parts) | | 8 | 8 | 8 | 8 | 8 |
| | Triethylene glycol | | 8 | 8 | 8 | 8 | 8 |

TABLE 23-continued

|  |  | | | | | |
|---|---|---|---|---|---|---|
|  | Glycerin (parts) | 3 | 3 | 3 | 3 | 3 |
|  | Triethylene glycol (parts) | 4 | 4 | 4 | 4 | 4 |
|  | Surfynol 440 (parts) | 0.5 | 0.5 | 0.5 | 0.5 | 0.5 |
|  | Pure water | Balance | Balance | Balance | Balance | Balance |
|  | Total (parts) | 100 | 100 | 100 | 100 | 100 |
| Physical | pH | 8.1 | 8.5 | 7.4 | 8.4 | 7.9 |
| properties | Average particle diameter D50/nm | 107 | 101 | 102 | 108 | 110 |
|  | Initial viscosity (mPa · s) | 9.3 | 9 | 7.8 | 18.2 | 2.9 |
|  | Optical density    Measured value | 0.87 | 0.88 | 0.85 | 0.90 | 0.81 |
|  | Improvement rate | 107% | 109% | 105% | 111% | (Reference) |
|  | Determination | G | G | G | G | — |
|  | Rubfastness | G | G | G | G | N |
|  | Ink jet adaptability | G | G | G | M | G |

TABLE 24

| Aqueous magenta ink (Type 2) | | | Production Example 7 PLM Dispersion | Example 145 | Example 146 | Example 147 | Example 148 |
|---|---|---|---|---|---|---|---|
| Dispersion method (US: ultrasonic dispersion method PLM: kneading method) | | | PLM | PLM | PLM | PLM | PLM |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
|  |  | (parts) (solid content) | 8 | 4 | 4 | 4 | 4 |
|  | Anionic group- containing organic polymer compound | Name/Product name | Resin A | Resin A | Resin A | Resin A | Resin A |
|  |  | (parts) (solid content) | 1.6 | 0.8 | 0.8 | 0.8 | 0.8 |
|  |  | Name/Product name | — | — | — | CMC 1390 | — |
|  |  | (parts) (solid content) | — | — | — | 0.1 | — |
|  | Bio-nanofiber | Product name (abbreviation) | CEL-KY | CEL-KY | CEL-KY | CEL-KY | CHI-NF |
|  |  | (parts) (solid content) | 0.2 | 0.1 | 0.2 | 0.1 | 0.15 |
|  | 2-Pyrrolidone (parts) | | — | 8 | 8 | 8 | 8 |
|  | Triethylene glycol | | — | 8 | 8 | 8 | 8 |
|  | Glycerin (parts) | | — | 3 | 3 | 3 | 3 |
|  | Triethylene glycol (parts) | | 5.4 | 2.7 | 2.7 | 2.7 | 2.7 |
|  | Surfynol 440 (parts) | | — | 0.5 | 0.5 | 0.5 | 0.5 |
|  | Pure water | | Balance | Balance | Balance | Balance | Balance |
|  | Total (parts) | | 100 | 100 | 100 | 100 | 100 |
| Physical | pH | | 10.3 | 9.2 | 9.2 | 9.2 | 8.8 |
| properties | Average particle diameter D50/nm | | 101 | 101 | 104 | 103 | 96 |
|  | Initial viscosity (mPa · s) | | — | 3.8 | 8.8 | 18.9 | 16.1 |
|  | Optical density    Measured value | | — | 0.88 | 0.89 | 0.92 | 0.88 |
|  | Improvement rate | | — | 104% | 105% | 108% | 104% |
|  | Determination | | — | G | G | G | G |
|  | Rubfastness | | — | G | G | G | G |
|  | Ink jet adaptability | | — | G | G | G | M |

| Aqueous magenta ink (Type 2) | | | Example 149 | Example 150 | Example 151 | Comparative Example 32 | Comparative Example 33 |
|---|---|---|---|---|---|---|---|
| Dispersion method (US: ultrasonic dispersion method PLM: kneading method) | | | PLM | PLM | PLM | PLM | PLM |
| Composition | Magenta pigment | Product name | FASTOGEN Super Magenta RY | FASTOGEN Super Magenta RY | FASTOGEN Super Magenta RY | FASTOGEN Super Magenta RY | FASTOGEN Super Magenta RY |
|  |  | (parts) (solid content) | 4 | 4 | 4 | 4 | 4 |
|  | Anionic group- containing organic polymer compound | Name/Product name | Resin A | Resin A | Resin A | Resin A | Resin A |
|  |  | (parts) (solid content) | 0.8 | 0.8 | 0.8 | 0.8 | 0.8 |
|  |  | Name/Product name | DN-800H | DN-100L | CMC 1390 | CMC 1390 | — |
|  |  | (parts) (solid content) | 0.15 | 0.2 | 0.1 | 0.1 | — |
|  | Bio-nanofiber | Product name (abbreviation) | CHI-NF | CHI-NF | CHI-NF | — | — |
|  |  | (parts) (solid content) | 0.1 | 0.2 | 0.15 | — | — |
|  | 2-Pyrrolidone (parts) | | 8 | 8 | 8 | 8 | 8 |
|  | Triethylene glycol | | 8 | 8 | 8 | 8 | 8 |

TABLE 24-continued

|  |  | | | | | |
|---|---|---|---|---|---|---|
|  | Glycerin (parts) | 3 | 3 | 3 | 3 | 3 |
|  | Triethylene glycol (parts) | 2.7 | 2.7 | 2.7 | 2.7 | 2.7 |
|  | Surfynol 440 (parts) | 05 | 0.5 | 0.5 | 0.5 | 0.5 |
|  | Pure water | Balance | Balance | Balance | Balance | Balance |
|  | Total (parts) | 100 | 100 | 100 | 100 | 100 |
| Physical | pH | 9.2 | 9.3 | 9.0 | 9.2 | 9.2 |
| properties | Average particle diameter D50/nm | 92 | 93 | 96 | 106 | 106 |
|  | Initial viscosity (mPa·s) | 9.8 | 11.3 | 8.8 | 9.9 | 2.6 |
| Optical density | Measured value | 0.88 | 0.91 | 0.90 | 0.86 | 0.85 |
|  | Improvement rate | 104% | 107% | 106% | 101% | (Reference) |
|  | Determination | G | G | G | N | — |
|  | Rubfastness | G | G | G | N | N |
|  | Ink jet adaptability | G | M | G | G | G |

TABLE 25

| Aqueous magenta ink (Type 2) | | | Example 152 | Example 153 | Example 154 | Example 155 | Comparative Example 34 | Comparative Example 35 | Comparative Example 36 |
|---|---|---|---|---|---|---|---|---|---|
| Dispersion method (US: ultrasonic dispersion method PLM: kneading method) | | | Self-dispersion type | Self-dispersion type | Self-dispersion type | Self-dispersion type | Self-dispersion type | Self-dispersion type | Self-dispersion type |
| Composition | Magenta pigment | Product name | CAB-O-JET 465M | CAB-O-JET 465M | CAB-O-JET 465M | CAB-O-JET 465M | CAB-O-JET 465M | CAB-O-JET 465M | CAB-O-JET 465M |
|  |  | (parts) (solid content) | 4 | 4 | 4 | 4 | 4 | 4 | 4 |
|  | Anionic group-containing organic polymer compound | Name/Product name | — | — | — | — | — | — | — |
|  |  | (parts) (solid content) | — | — | — | — | — | — | — |
|  |  | Name/Product name | CMC 1390 | DN-800H | CMC 1390 | DN-800H | — | CMC 1390 | — |
|  |  | (parts) (solid content) | 0.2 | 0.2 | 0.2 | 0.2 | — | 0.2 | — |
|  | Bio-nanofiber | Product name (abbreviation) | CEL-NF | CEL-NF | CEL-KY | CEL-KY | CEL-KY | — | — |
|  |  | (parts) (solid content) | 0.2 | 0.2 | 0.2 | 0.2 | 0.5 | — | — |
|  | 2-Pyrrolidone (parts) | | 8 | 8 | 8 | 8 | 8 | 8 | 8 |
|  | Triethylene glycol | | 8 | 8 | 8 | 8 | 8 | 8 | 8 |
|  | Glycerin (parts) | | 3 | 3 | 3 | 3 | 3 | 3 | 3 |
|  | Triethylene glycol (parts) | | 1 | 1 | 1 | 1 | 1 | 1 | 1 |
|  | Surfynol 440 (parts) | | 0.5 | 0.5 | 0.5 | 0.5 | 0.5 | 0.5 | 0.5 |
|  | Pure water | | Balance | Balance | Balance | Balance | Balance | Balance | Balance |
|  | Total (parts) | | 100 | 100 | 100 | 100 | 100 | 100 | 100 |
| Physical | pH | | 8.7 | 8.5 | 8.9 | 8.9 | 9.1 | 9.0 | 8.9 |
| properties | Average particle diameter D50/nm | | 78 | 73 | 79 | 75 | 98 | 86 | 77 |
|  | Initial viscosity (mPa·s) | | 13 | 9.3 | 11.5 | 8.8 | 298 | 6.9 | 2 |
| Optical density | Measured value | | 0.99 | 0.96 | 0.88 | 0.87 | 1.34 | 0.84 | 0.82 |
|  | Improvement rate | | 121% | 117% | 107% | 106% | 163% | 102% | (Reference) |
|  | Determination | | G | G | G | G | G | N | — |
|  | Rubfastness | | G | G | G | G | G | N | N |
|  | Ink jet adaptability | | G | G | G | G | N | G | G |

TABLE 26

| Aqueous yellow ink (Type 1) | | | Production Example 4 US Dispersion | Example 156 | Example 157 | Example 158 | Example 159 |
|---|---|---|---|---|---|---|---|
| Dispersion method (US: ultrasonic dispersion method PLM: kneading method) | | | US | US | US | US | US |
| Composition | Yellow pigment | Product name | Fast Yellow 7413 | Fast Yellow 7413 | Fast Yellow 7413 | Fast Yellow 7413 | Fast Yellow 7413 |
|  |  | (parts) (solid content) | 8 | 6 | 6 | 6 | 6 |
|  | Anionic group-containing organic polymer compound | Name/Product name | SA-1 | SA-1 | SA-1 | SA-1 | SA-1 |
|  |  | (parts) (solid content) | 1.6 | 1.2 | 1.2 | 1.2 | 1.2 |
|  |  | Name/Product name | — | — | — | CMC 1390 | DN-800H |
|  |  | (parts) (solid content) | — | — | — | 0.15 | 0.3 |

TABLE 26-continued

| | | | | | | | |
|---|---|---|---|---|---|---|---|
| | Bio-nanofiber | Product name (abbreviation) | CEL-NF | CEL-NF | CEL-KY | CEL-NF | CEL-NF |
| | | (parts) (solid content) | 0.4 | 0.3 | 0.3 | 0.15 | 0.3 |
| | Triethylene glycol (parts) | | 8 | 6 | 6 | 6 | 6 |
| | Pure water | | Balance | Balance | Balance | Balance | Balance |
| | Total (parts) | | 100 | 100 | 100 | 100 | 100 |
| Physical properties | pH | | 9.9 | 9.9 | 9.8 | 9.8 | 9.5 |
| | Average particle diameter D50/nm | | 99 | 99 | 87 | 104 | 102 |
| | Initial viscosity (mPa · s) | | — | 17.7 | 30.1 | 51.1 | 72.2 |
| | Optical density | Measured value | — | 1.30 | 1.22 | 1.36 | 1.34 |
| | | Improvement rate | — | 111% | 104% | 116% | 114% |
| | | Determination | — | G | G | G | G |
| | Rubfastness | | — | G | G | G | G |

| | | | Example 160 | Example 161 | Example 167 | Example 163 | Comparative Example 37 |
|---|---|---|---|---|---|---|---|
| Aqueous yellow ink (Type 1) | | | | | | | |
| Dispersion method (US: ultrasonic dispersion method PLM: kneading method) | | | US | US | US | US | US |
| Composition | Yellow pigment | Product name | Fast Yellow 7413 | Fast Yellow 7413 | Fast Yellow 7413 | Fast Yellow 7413 | Fast Yellow 7413 |
| | | (parts) (solid content) | 6 | 6 | 6 | 6 | 6 |
| | Anionic group-containing organic polymer compound | Name/Product name | SA-1 | SA-1 | SA-1 | SA-1 | SA-1 |
| | | (parts) (solid content) | 1.2 | 1.2 | 1.2 | 1.2 | 1.2 |
| | | Name/Product name | — | — | DN-800H | DN-800H | — |
| | | (parts) (solid content) | — | — | 0.15 | 0.3 | — |
| | Bio-nanofiber | Product name (abbreviation) | CHI-NF | CHI-NF | CHI-NF | CHI-NF | — |
| | | (parts) (solid content) | 0.075 | 0.225 | 0.375 | 0.45 | — |
| | Triethylene glycol (parts) | | 6 | 6 | 6 | 6 | 6 |
| | Pure water | | Balance | Balance | Balance | Balance | Balance |
| | Total (parts) | | 100 | 100 | 100 | 100 | 100 |
| Physical properties | pH | | 9.6 | 10.0 | 9.6 | 9.8 | 9.5 |
| | Average particle diameter D50/nm | | 96 | 102 | 104 | 102 | 90 |
| | Initial viscosity (mPa · s) | | 3.4 | 5.1 | 14.2 | 28.9 | 1.5 |
| | Optical density | Measured value | 1.21 | 1.29 | 1.35 | 1.33 | 1.17 |
| | | Improvement rate | 103% | 110% | 115% | 113% | (Reference) |
| | | Determination | G | G | G | G | — |
| | Rubfastness | | G | G | G | G | N |

TABLE 27

| | | | Production Example 8 PLM Dispersion | Example 164 | Example 165 | Example 166 | Example 167 | Example 168 | Comparative Example 38 |
|---|---|---|---|---|---|---|---|---|---|
| Aqueous yellow ink (Type 1) | | | | | | | | | |
| Dispersion method (US: ultrasonic dispersion method PLM: kneading method) | | | PLM | PLM | PLM | PLM | PLM | PLM | PLM |
| Composition | Yellow pigment | Product name | Fast Yellow 7413 | Fast Yellow 7413 | Fast Yellow 7413 | Fast Yellow 7413 | Fast Yellow 7413 | Fast Yellow 7413 | Fast Yellow 7413 |
| | | (parts) (solid content) | 8 | 6 | 6 | 6 | 6 | 6 | 6 |
| | Anionic group-containing organic polymer compound | Name/Product name | Resin A | Resin A | Resin A | Resin A | Resin A | Resin A | Resin A |
| | | (parts) (solid content) | 2.4 | 1.8 | 1.8 | 1.8 | 1.8 | 1.8 | 1.8 |
| | | Name/Product name | — | — | — | CMC 1390 | — | DN-800H | — |
| | | (parts) (solid content) | — | — | — | 0.15 | — | 0.225 | — |
| | Bio-nanofiber | Product name (abbreviation) | CHI-NF | CHI-NF | CEL-KY | CEL-KY | CHI-NF | CHI-NF | — |
| | | (parts) (solid content) | 0.1 | 0.075 | 0.15 | 0.15 | 0.225 | 0.6 | — |
| | Triethylene glycol (parts) | | 4.4 | 3.3 | 3.3 | 3.3 | 3.3 | 3.3 | 3.3 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 10.1 | 10.1 | 10.2 | 10.1 | 10.1 | 10.1 | 10.1 |
| | Average particle diameter D50/nm | | 86 | 86 | 62 | 73 | 87 | 89 | 76 |
| | Initial viscosity (mPa · s) | | — | 3.5 | 149.1 | 31.2 | 6.2 | 23.9 | 1.6 |
| | Optical density | Measured value | — | 1.08 | 1.10 | 1.15 | 1.20 | 1.22 | 1.03 |
| | | Improvement rate | — | 105% | 106% | 111% | 116% | 118% | (Reference) |
| | | Determination | — | G | G | G | G | G | — |
| | Rubfastness | | — | G | G | G | G | G | N |

TABLE 28

| Aqueous yellow ink (Type 1) | | | Example 169 | Example 170 | Example 171 | Example 172 | Comparative Example 39 | Comparative Example 40 | Comparative Example 41 |
|---|---|---|---|---|---|---|---|---|---|
| Dispersion method (US: ultrasonic dispersion method PLM: kneading method) | | | Self-dispersion type | Self-dispersion type | Self-dispersion type | Self-dispersion type | Self-dispersion type | Self-dispersion type | Self-dispersion type |
| Composition | Yellow pigment | Product name | CAB-O-JET 470Y | CAB-O-JET 470Y | CAB-O-JET 470Y | CAB-O-JET 470Y | CAB-O-JET 470Y | CAB-O-JET 470Y | CAB-O-JET 470Y |
| | | (parts) (solid content) | 6 | 6 | 6 | 6 | 6 | 6 | 6 |
| | Anionic group-containing | Name/Product name | — | — | — | — | — | — | — |
| | organic | (parts) (solid content) | — | — | — | — | — | — | — |
| | polymer compound | Name/Product name | CMC 1390 | DN-800H | CMC 1390 | DN-800H | CMC 1390 | — | — |
| | | (parts) (solid content) | 0.3 | 0.3 | 0.3 | 0.3 | 0.3 | — | — |
| | Bio-nanofiber | Product name (abbreviation) | CEL-NF | CEL-NF | CEL-KY | CEL-KY | — | CEL-NF | — |
| | | (parts) (solid content) | 0.3 | 0.3 | 0.3 | 0.3 | — | 0.75 | — |
| | Triethylene glycol (parts) | | 1.5 | 1.5 | 1.5 | 1.5 | 1.5 | 1.5 | 1.5 |
| | Pure water | | Balance | Balance | Balance | Balance | Balance | Balance | Balance |
| Physical properties | Total (parts) | | 100 | 100 | 100 | 100 | 100 | 100 | 100 |
| | pH | | 8.9 | 8.8 | 9.0 | 8.9 | 9.9 | 10.1 | 9.0 |
| | Average particle diameter D50/nm | | 132 | 137 | 126 | 123 | 80 | 189 | 113 |
| | Initial viscosity (mPa·s) | | 14.2 | 9.3 | 11.8 | 8.1 | 3.9 | 611 | 1.2 |
| | Optical density | Measured value | 1.22 | 1.19 | 1.10 | 1.07 | 1.05 | 1.58 | 1.03 |
| | | Improvement rate | 118% | 116% | 107% | 105% | 102% | 153% | (Reference) |
| | | Determination | G | G | G | G | N | G | — |
| | Rubfastness | | G | G | G | G | N | N | N |

TABLE 29

| Aqueous yellow ink (Type 2) | | | Production Example 4 US Dispersion | Example 173 | Example 174 | Example 175 | Example 176 | Example 177 |
|---|---|---|---|---|---|---|---|---|
| Dispersion method (US: ultrasonic dispersion method PLM: kneading method) | | | US | US | US | US | US | US |
| Composition | Yellow pigment | Product name | Fast Yellow 7413 | Fast Yellow 7413 | Fast Yellow 7413 | Fast Yellow 7413 | Fast Yellow 7413 | Fast Yellow 7413 |
| | | (parts) (solid content) | 8 | 4 | 4 | 4 | 4 | 4 |
| | Anionic group-containing organic | Name/Product name | SA-1 | SA-1 | SA-1 | SA-1 | SA-1 | SA-1 |
| | | (parts) (solid content) | 1.6 | 0.8 | 0.8 | 0.8 | 0.8 | 0.8 |
| | | Name/Product name | — | — | — | — | CMC 1390 | DN-800H |
| | polymer compound | (parts) (solid content) | — | — | — | — | 0.1 | 0.1 |
| | Bio-nanofiber | Product name (abbreviation) | CEL-NF | CEL-NF | CEL-KY | CEL-KY | CEL-KY | CEL-KY |
| | | (parts) (solid content) | 0.4 | 0.2 | 0.2 | 0.1 | 0.1 | 0.1 |
| | 2-Pyrrolidone (parts) | | — | 8 | 8 | 8 | 8 | 8 |
| | Triethylene glycol | | — | 8 | 8 | 8 | 8 | 8 |
| | Glycerin (parts) | | — | 3 | 3 | 3 | 3 | 3 |
| | Triethylene glycol (parts) | | 8 | 4 | 4 | 4 | 4 | 4 |
| | Surfynol 440 (parts) | | — | 0.5 | 0.5 | 0.5 | 0.5 | 0.5 |
| | Pure water | | Balance | Balance | Balance | Balance | Balance | Balance |
| Physical properties | Total (parts) | | 100 | 100 | 100 | 100 | 100 | 100 |
| | pH | | 9.9 | 9.0 | 8.9 | 9.2 | 8.9 | 8.6 |
| | Average particle diameter D50/nm | | 99 | 106 | 94 | 110 | 112 | 120 |
| | Initial viscosity (mPa·s) | | — | 2.7 | 18.7 | 10.8 | 19.5 | 17.6 |
| | Optical density | Measured value | — | 1.07 | 1.01 | 1.00 | 1.03 | 1.04 |
| | | Improvement rate | — | 110% | 104% | 103% | 106% | 107% |
| | | Determination | — | G | G | G | G | G |
| | Rubfastness | | — | G | G | G | G | G |
| | Ink jet adaptability | | — | G | M | G | M | M |

| Aqueous yellow ink (Type 2) | Example 178 | Example 179 | Example 180 | Example 181 | Example 182 | Example 183 |
|---|---|---|---|---|---|---|
| Dispersion method (US: ultrasonic dispersion method PLM: kneading method) | US | US | US | US | US | US |

TABLE 29-continued

| Composition | Yellow pigment | Product name | Fast Yellow 7413 | Fast Yellow 7413 | Fast Yellow 7413 | Fast Yellow 7413 | Fast Yellow 7413 | Fast Yellow 7413 |
|---|---|---|---|---|---|---|---|---|
| | | (parts) (solid content) | 4 | 4 | 4 | 4 | 4 | 4 |
| | Anionic group-containing organic polymer compound | Name/Product name | SA-1 | SA-1 | SA-1 | SA-1 | SA-1 | SA-1 |
| | | (parts) (solid content) | 0.8 | 0.8 | 0.8 | 0.8 | 0.8 | 0.8 |
| | | Name/Product name | DN-10L | CMC 1390 | DN-800H | DN-10L | — | — |
| | | (parts) (solid content) | 0.1 | 0.2 | 0.2 | 0.2 | — | — |
| | Bio-nanofiber | Product name (abbreviation) | CEL-KY | CEL-NF | CEL-NF | CEL-NF | CHI-NF | CHI-NF |
| | | (parts) (solid content) | 0.1 | 0.2 | 0.7 | 0.2 | 0.05 | 0.15 |
| | 2-Pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 4 | 4 | 4 | 4 | 4 | 4 |
| | Surfynol 440 (parts) | | 0.5 | 0.5 | 0.5 | 0.5 | 0.5 | 0.5 |
| | Pure water | | Balance | Balance | Balance | Balance | Balance | Balance |
| | Total (parts) | | 100 | 100 | 100 | 100 | 100 | 100 |
| Physical properties | pH | | 8.8 | 8.8 | 8.6 | 8.8 | 8.7 | 9.1 |
| | Average particle diameter D50/nm | | 119 | 109 | 110 | 133 | 103 | 110 |
| | Initial viscosity (mPa · s) | | 11.2 | 5.4 | 2.7 | 19.9 | 3.6 | 11.8 |
| | Optical density | Measured value | 1.05 | 1.10 | 1.10 | 1.08 | 1.00 | 1.06 |
| | | Improvement rate | 108% | 113% | 113% | 111% | 103% | 109% |
| | | Determination | G | G | G | G | G | G |
| | Rubfastness | | G | G | G | G | G | G |
| | Ink jet adaptability | | G | G | G | M | G | G |

TABLE 30

| | Aqueous yellow ink (Type 2) | | Example 184 | Example 185 | Example 186 | Example 187 | Example 188 | Example 189 | Comparative Example 42 |
|---|---|---|---|---|---|---|---|---|---|
| Dispersion method (US: ultrasonic dispersion method PLM: kneading method) | | | US | US | US | US | US | US | US |
| Composition | Yellow pigment | Product name | Fast Yellow 7413 | Fast Yellow 7413 | Fast Yellow 7413 | Fast Yellow 7413 | Fast Yellow 7413 | Fast Yellow 7413 | Fast Yellow 7413 |
| | | (parts) (solid content) | 4 | 4 | 4 | 4 | 4 | 4 | 4 |
| | Anionic group-containing organic polymer compound | Name/Product name | SA-1 | SA-1 | SA-1 | SA-1 | SA-1 | SA-1 | SA-1 |
| | | (parts) (solid content) | 0.8 | 0.8 | 0.8 | 0.8 | 0.8 | 0.8 | 0.8 |
| | | Name/Product name | DN-800H | CMC 1390 | DN-100L | DN-10L | DN-800H | DN-800H | — |
| | | (parts) (solid content) | 0.1 | 0.1 | 0.15 | 0.2 | 0.1 | 0.2 | — |
| | Bio-nanofiber | Product name (abbreviation) | CHI-NF | CHI-NF | CHI-NF | CHI-NF | CHI-NF | CHI-NF | — |
| | | (parts) (solid content) | 0.15 | 0.15 | 0.15 | 0.1 | 0.25 | 0.3 | — |
| | 2-Pyrrolidone (parts) | | 8 | 8 | 8 | 8 | 8 | 8 | 8 |
| | Triethylene glycol | | 8 | 8 | 8 | 8 | 8 | 8 | 8 |
| | Glycerin (parts) | | 3 | 3 | 3 | 3 | 3 | 3 | 3 |
| | Triethylene glycol (parts) | | 4 | 4 | 4 | 4 | 4 | 4 | 4 |
| | Surfynol 440 (parts) | | 0.5 | 0.5 | 0.5 | 0.5 | 0.5 | 0.5 | 0.5 |
| | Pure water | | Balance | Balance | Balance | Balance | Balance | Balance | Balance |
| | Total (parts) | | 100 | 100 | 100 | 100 | 100 | 100 | 100 |
| Physical properties | pH | | 8.9 | 9.0 | 8.7 | 8.6 | 8.7 | 8.9 | 8.6 |
| | Average particle diameter D50/nm | | 111 | 113 | 108 | 106 | 101 | 110 | 97 |
| | Initial viscosity (mPa · s) | | 5.5 | 18.9 | 5.1 | 11.2 | 19.8 | 12.5 | 2.8 |
| | Optical density | Measured value | 1.01 | 1.03 | 1.03 | 1.03 | 1.09 | 1.05 | 0.97 |
| | | Improvement rate | 104% | 106% | 106% | 106% | 112% | 108% | (Reference) |
| | | Determination | G | G | G | G | G | G | — |
| | Rubfastness | | G | G | G | G | G | G | G |
| | Ink jet adaptability | | G | M | G | G | M | G | G |

TABLE 31

| Aqueous yellow ink (Type 2) | | | Production Example 8 PLM Dispersion | Example 190 | Example 191 | Example 192 | Example 193 | Example 194 |
|---|---|---|---|---|---|---|---|---|
| Dispersion method (US: ultrasonic dispersion method PLM: kneading method) | | | PLM | PLM | PLM | PLM | PLM | PLM |
| Composition | Yellow pigment | Product name | Fast Yellow 7413 | Fast Yellow 7413 | Fast Yellow 7413 | Fast Yellow 7413 | Fast Yellow 7413 | Fast Yellow 7413 |
| | | (parts) (solid content) | 8 | 4 | 4 | 4 | 4 | 4 |
| | Anionic group-containing organic polymer compound | Name/Product name | Resin A | Resin A | Resin A | Resin A | Resin A | Resin A |
| | | (parts) (solid content) | 2.4 | 1.2 | 1.2 | 1.2 | 1.2 | 1.2 |
| | | Name/Product name | — | — | — | — | CMC 1390 | — |
| | | (parts) (solid content) | — | — | — | — | 0.1 | — |
| | Bio-nanofiber | Product name (abbreviation) | CHI-NF | CHI-NF | CEL-KY | CEL-KY | CEL-KY | CHI-NF |
| | | (parts) (solid content) | 0.1 | 0.05 | 0.2 | 0.1 | 0.1 | 0.15 |
| | 2-Pyrrolidone (parts) | | — | 8 | 8 | 8 | 8 | 8 |
| | Triethylene glycol | | — | 8 | 8 | 8 | 8 | 8 |
| | Glycerin (parts) | | — | 3 | 3 | 3 | 3 | 3 |
| | Triethylene glycol (parts) | | 4.4 | 2.2 | 2.2 | 2.2 | 2.2 | 2.2 |
| | Surfynol 440 (parts) | | — | 0.5 | 0.5 | 0.5 | 0.5 | 0.5 |
| | Pure water | | Balance | | Balance | Balance | Balance | Balance |
| | Total (parts) | | 100 | 100 | 100 | 100 | 100 | 100 |
| Physical properties | pH | | 10.1 | 9.2 | 9.3 | 9.3 | 9.2 | 9.2 |
| | Average particle diameter D50/nm | | 86 | 82 | 78 | 67 | 79 | 82 |
| | Initial viscosity (mPa · s) | | — | 3.1 | 15.6 | 4.3 | 19.6 | 16.1 |
| | Optical density | Measured value | — | 0.90 | 0.92 | 0.91 | 0.95 | 0.99 |
| | | Improvement rate | — | 105% | 107% | 106% | 110% | 115% |
| | | Determination | — | G | G | G | G | G |
| | Rubfastness | | — | G | G | G | G | G |
| | Ink jet adaptability | | — | G | G | G | M | M |

| Aqueous yellow ink (Type 2) | | | Example 195 | Example 196 | Example 197 | Example 198 | Example 199 | Example 200 |
|---|---|---|---|---|---|---|---|---|
| Dispersion method (US: ultrasonic dispersion method PLM: kneading method) | | | PLM | PLM | PLM | PLM | PLM | PLM |
| Composition | Yellow pigment | Product name | Fast Yellow 7413 | Fast Yellow 7413 | Fast Yellow 7413 | Fast Yellow 7413 | Fast Yellow 7413 | Fast Yellow 7413 |
| | | (parts) (solid content) | 4 | 4 | 4 | 4 | 4 | 4 |
| | Anionic group-containing organic polymer compound | Name/Product name | Resin A | Resin A | Resin A | Resin A | Resin A | Resin A |
| | | (parts) (solid content) | 1.2 | 1.2 | 1.2 | 1.2 | 1.2 | 1.2 |
| | | Name/Product name | DN-800H | CMC 1390 | DN-100L | DN-10L | DN-800H | DN-800H |
| | | (parts) (solid content) | 0.15 | 0.1 | 0.15 | 0.2 | 0.1 | 0.15 |
| | Bio-nanofiber | Product name (abbreviation) | CHI-NF | CHI-NF | CHI-NF | CHI-NF | CHI-NF | CHI-NF |
| | | (parts) (solid content) | 0.15 | 0.15 | 0.15 | 0.1 | 0.25 | 0.4 |
| | 2-Pyrrolidone (parts) | | 8 | 8 | 8 | 8 | 8 | 8 |
| | Triethylene glycol | | 8 | 8 | 8 | 8 | 8 | 8 |
| | Glycerin (parts) | | 3 | 3 | 3 | 3 | 3 | 3 |
| | Triethylene glycol (parts) | | 2.2 | 2.2 | 2.2 | 2.2 | 2.2 | 2.2 |
| | Surfynol 440 (parts) | | 0.5 | 0.5 | 0.5 | 0.5 | 0.5 | 0.5 |
| | Pure water | | | Balance | Balance | Balance | Balance | Balance |
| | Total (parts) | | 100 | 100 | 100 | 100 | 100 | 100 |
| Physical properties | pH | | 9.2 | 9.2 | 9.2 | 9.2 | 9.2 | 9.2 |
| | Average particle diameter D50/nm | | 82 | 82 | 82 | 82 | 82 | 85 |
| | Initial viscosity (mPa · s) | | 8.4 | 10.9 | 8.8 | 7.2 | 9.9 | 17.9 |
| | Optical density | Measured value | 0.91 | 0.92 | 0.96 | 0.94 | 0.99 | 1.01 |
| | | Improvement rate | 106% | 107% | 112% | 109% | 115% | 117% |
| | | Determination | G | G | G | G | G | G |
| | Rubfastness | | G | G | G | G | G | G |
| | Ink jet adaptability | | G | G | G | G | G | M |

TABLE 32

| Aqueous yellow ink (Type 2) | | | Comparative Example 43 | Comparative Example 44 | Example 201 | Example 202 | Example 203 |
|---|---|---|---|---|---|---|---|
| Dispersion method (US: ultrasonic dispersion method PLM: kneading method) | | | PLM | PLM | Self-dispersion type | Self-dispersion type | Self-dispersion type |
| Composition | Yellow pigment | Product name | Fast Yellow 7413 | Fast Yellow 7413 | CAB-O-JET 470Y | CAB-O-JET 470Y | CAB-O-JET 470Y |
| | | (parts) (solid content) | 4 | 4 | 4 | 4 | 4 |
| | Anionic group-containing organic polymer compound | Name/Product name | Resin A | Resin A | — | — | — |
| | | (parts) (solid content) | 1.2 | 1.2 | — | — | — |
| | | Name/Product name | CMC 1390 | — | CMC 1390 | DN-800H | CMC 1390 |
| | | (parts) (solid content) | 0.1 | — | 0.2 | 0.2 | 0.2 |
| | Bio-nanofiber | Product name (abbreviation) | — | — | CEL-NF | CEL-NF | CEL-KY |
| | | (parts) (solid content) | — | — | 0.2 | 0.2 | 0.2 |
| | 2-Pyrrolidone (parts) | | 8 | 8 | 8 | 8 | 8 |
| | Triethylene glycol | | 8 | 8 | 8 | 8 | 8 |
| | Glycerin (parts) | | 3 | 3 | 3 | 3 | 3 |
| | Triethylene glycol (parts) | | 2.2 | 2.2 | 1 | 1 | 1 |
| | Surfynol 440 (parts) | | 0.5 | 0.5 | 0.5 | 0.5 | 0.5 |
| | Pure water | | | | | | |
| | Total (parts) | | 100 | 100 | 100 | 100 | 100 |
| Physical properties | pH | | 9.2 | 9.2 | 8.1 | 8.0 | 8.2 |
| | Average particle diameter D50/nm | | 82 | 82 | 142 | 147 | 135 |
| | Initial viscosity (mPa · s) | | 10.2 | 2.7 | 13.2 | 11.2 | 10.9 |
| | Optical density | Measured value | 0.87 | 0.86 | 1.09 | 1.07 | 0.99 |
| | | Improvement rate | 101% | (Reference) | 117% | 118% | 109% |
| | | Determination | N | — | G | G | G |
| | Rubfastness | | N | N | G | G | G |
| | Ink jet adaptability | | G | G | G | G | G |

| Aqueous yellow ink (Type 2) | | | Example 204 | Comparative Example 45 | Comparative Example 46 | Comparative Example 47 |
|---|---|---|---|---|---|---|
| Dispersion method (US: ultrasonic dispersion method PLM: kneading method) | | | Self-dispersion type | Self-dispersion type | Self-dispersion type | Self-dispersion type |
| Composition | Yellow pigment | Product name | CAB-O-JET 470Y | CAB-O-JET 470Y | CAB-O-JET 470Y | CAB-O-JET 470Y |
| | | (parts) (solid content) | 4 | 4 | 4 | 4 |
| | Anionic group-containing organic polymer compound | Name/Product name | — | — | — | — |
| | | (parts) (solid content) | — | — | — | — |
| | | Name/Product name | DN-800H | — | DN-800H | — |
| | | (parts) (solid content) | 0.2 | — | 0.2 | — |
| | Bio-nanofiber | Product name (abbreviation) | CEL-KY | CEL-NF | — | — |
| | | (parts) (solid content) | 0.2 | 0.5 | — | — |
| | 2-Pyrrolidone (parts) | | 8 | 8 | 8 | 8 |
| | Triethylene glycol | | 8 | 8 | 8 | 8 |
| | Glycerin (parts) | | 3 | 3 | 3 | 3 |
| | Triethylene glycol (parts) | | 1 | 1 | 1 | 1 |
| | Surfynol 440 (parts) | | 0.5 | 0.5 | 0.5 | 0.5 |
| | Pure water | | | | | |
| | Total (parts) | | 100 | 100 | 100 | 100 |
| Physical properties | pH | | 8.1 | 9.2 | 8.7 | 8.2 |
| | Average particle diameter D50/nm | | 132 | 203 | 88 | 121 |
| | Initial viscosity (mPa · s) | | 9.2 | 456.0 | 5.5 | 2.0 |
| | Optical density | Measured value | 0.97 | 1.40 | 0.94 | 0.93 |
| | | Improvement rate | 107% | 154% | 103% | (欠墨) |
| | | Determination | G | G | N | — |
| | Rubfastness | | G | G | N | N |
| | Ink jet adaptability | | G | N | G | G |

The results indicate that an aqueous ink of each color using an aqueous pigment dispersion containing an anionic group-containing organic polymer compound and bio-nanofibers having an average diameter of 1 nm or more and 100 nm or less and an aspect ratio of 100 or more is excellent in optical density, rubfastness, etc. of resultant images.

The invention claimed is:

1. A method of performing printing on a recording material, the method comprising:
    applying to the recording material an aqueous ink composition comprising a pigment, an anionic group-containing organic polymer compound, and unmodified bio-nanofibers having an average diameter of 1 nm or more and 50 nm or less and an aspect ratio of 100 or more; and
    drying the aqueous ink composition on the recording material.

2. The method according to claim 1, wherein the aspect ratio of the unmodified bio-nanofibers is 2000 or less.

3. The method according to claim 1, which said printing is ink jet printing.

* * * * *